US012729247B2

(12) United States Patent
You et al.

(10) Patent No.: US 12,729,247 B2
(45) Date of Patent: Sep. 8, 2026

(54) INHIBITED POROUS GRANULAR STARCHES AND METHODS OF MAKING AND USING THEM

(71) Applicant: Tate & Lyle Solutions USA LLC, Hoffman Estates, IL (US)

(72) Inventors: Zheng You, Hoffman Estates, IL (US); Weichang Liu, Hoffman Estates, IL (US); Saravanan Suppiah Singaram, Hoffman Estates, IL (US); Jarred Lawson, Hoffman Estates, IL (US)

(73) Assignee: Tate & Lyle Solutions USA LLC, Hoffman Estates, IL (US)

( * ) Notice: Subject to any disclaimer, the term of this patent is extended or adjusted under 35 U.S.C. 154(b) by 822 days.

(21) Appl. No.: 17/913,934

(22) PCT Filed: Mar. 24, 2021

(86) PCT No.: PCT/US2021/023895
§ 371 (c)(1),
(2) Date: Sep. 23, 2022

(87) PCT Pub. No.: WO2021/195216
PCT Pub. Date: Sep. 30, 2021

(65) Prior Publication Data

US 2024/0002548 A1 Jan. 4, 2024

Related U.S. Application Data

(60) Provisional application No. 62/994,179, filed on Mar. 24, 2020.

(51) Int. Cl.
*C08B 30/00* (2006.01)
*A23L 29/212* (2016.01)
*A23L 29/219* (2016.01)

(52) U.S. Cl.
CPC ............ *C08B 30/00* (2013.01); *A23L 29/212* (2016.08); *A23L 29/219* (2016.08)

(58) Field of Classification Search
CPC ....... C08B 30/00; A23L 29/212; A23L 29/219
See application file for complete search history.

(56) References Cited

U.S. PATENT DOCUMENTS 3,578,498 A 5/1971 Kite et al.
4,985,082 A 1/1991 Whistler
(Continued)

FOREIGN PATENT DOCUMENTS

CN 109400941 A 3/2019
CN 109457004 A 3/2019
(Continued)

OTHER PUBLICATIONS

Zheng et al. "Effect of cross-linking and esterification of hygroscopicity and surface activity of cassava maltodextrins", Food Chemistry, 2007, vol. 103, No. 4, pp. 1375-1379.
(Continued)

*Primary Examiner* — Katherine D Leblanc
(74) *Attorney, Agent, or Firm* — McDonnell Boehnen Hulbert & Berghoff LLP

(57) ABSTRACT

The present disclosure relates to inhibited porous granular starches having desirably high porosity. One aspect thereof is a method for making an inhibited porous granular starch product, that includes hydrolyzing a granular starch feed to a degree of hydrolysis of 20-75% using one or more enzymes including one or more of a glucoamylase and an alpha-amylase; wherein the inhibited porous granular starch product has a porosity of 10%~50% as measured by change in water uptake as compared to the granular starch feed and a sedimentation volume in the range of 20 mL/g to SO mL/g. Another aspect of the disclosure is inhibited porous granular
(Continued)

starch product having a water uptake of at least 1.0 g water/g starch and a sedimentation volume in the range of 20-80 mL/g. inhibited porous granular starches can be advantaged over conventional starches in that they can have increased viscosity at lower mass loadings.

19 Claims, 32 Drawing Sheets

(56) References Cited

U.S. PATENT DOCUMENTS

| | | | |
|---|---|---|---|
| 5,670,490 | A | 9/1997 | Whistler |
| 5,904,940 | A | 5/1999 | Senkeleski et al. |
| 2019/0230966 | A1 | 8/2019 | Patton |
| 2019/0380370 | A1 | 12/2019 | Whaley et al. |
| 2020/0157251 | A1 | 5/2020 | Smoot et al. |
| 2021/0115162 | A1 | 4/2021 | Smoot et al. |
| 2021/0392930 | A1 | 12/2021 | Whaley et al. |

FOREIGN PATENT DOCUMENTS

| | | | |
|---|---|---|---|
| EP | 0897673 | A2 | 2/1999 |
| WO | 2013/173161 | A1 | 11/2013 |

OTHER PUBLICATIONS

Xie et al. "Effects of cross-linking with sodium trimetaphosphate on structural and absorptive properties of porous wheat starche." Food Chemistry, 2019, vol. 289, pp. 187-194.

Gao et al. "Preparation and characterization of starch crosslinked with sodium trimetaphosphate and hydrolysed by enzymes" Carbohydrate Polymer, 2014, vol. 103, pp. 310-318.

Guo et al. "Adsorptive decolorization of methylene blue by cross-linked porous starch" Carbohydrate Polymer, 2012 vol. 93, pp. 374-379.

International Search Report and Written Opinion of International Application No. PCT/US2021/023895, mailed Jun. 17, 2021, p. 8.

Combined Search and Examination Report of UK Patent Application No. GB2006298.0, mailed Oct. 30, 2020, p. 8.

20 µm

FIG. 32
Reaction 5
Reaction 4
Reaction 3
Reaction 2
Reaction 1
Feed

INHIBITED POROUS GRANULAR STARCHES AND METHODS OF MAKING AND USING THEM

CROSS-REFERENCE TO RELATED APPLICATIONS

This is a U.S. national phase application of International Patent Application no. PCT/US2021/023895 filed on Mar. 24, 2021, which application claims the benefit of priority of U.S. Provisional Patent Application No. 62/994,179, filed Mar. 24, 2020, each of which is hereby incorporated by reference in its entirety.

BACKGROUND OF THE DISCLOSURE

Field of the Disclosure

The present disclosure relates generally to starch products. More particularly, the present disclosure relates to inhibited porous granular starches having desirably high porosity, and to methods relating to them, including methods for making and using them.

Technical Background

Starch products are often added to food and beverage products in order to adjust texture and thickness. An active area of research is the development of starches that provide high viscosity solutions with relatively low mass loading. Such super-thickening starches are applicable in a wide range of food, beverage, and non-food applications where particular rheological properties are desired with a low amount of added starch product.

One strategy towards achieving this combination is the development of highly-porous, inhibited starches. Highly-porous starches are theorized to provide high viscosity at low mass loadings, and also may possess enhanced absorption or adsorption properties, due to their high void volume. But a common problem among porous starches is their low stability to heat treatment. When starch is cooked in water, the individual granules hydrate and swell, and reach a peak viscosity, which desirably can provide thickness and texture to food products. With additional cooking and/or agitation, however, the starch granules can come apart, causing a loss of viscosity. In many contexts, it is desirable for a starch to resist degranularization upon cooking. Such starches are known as inhibited starches, and are useful in a wide variety of food products. However, methods to produce highly-porous, granular starches are not well established and there exists an ongoing need for inhibited starches which can effectively contribute to texture and thickness of food and beverage products even after cooking or other processing.

SUMMARY OF THE DISCLOSURE

One aspect of the disclosure is a method for making an inhibited porous granular starch product, the method comprising:

providing a granular starch feed; and hydrolyzing the granular starch feed to a degree of hydrolysis in the range of 20-75% using one or more enzymes including a glucoamylase, an alpha amylase, or a combination thereof;

wherein the inhibited porous granular starch product has a porosity as measured by change in water uptake as compared to the granular starch feed in the range of 10%-50% and a sedimentation volume in the range of 20 mL/g to 70 mL/g.

Another aspect of the disclosure is a method for making an inhibited porous granular starch product, the method comprising:

providing a granular starch feed; and hydrolyzing the granular starch feed to a degree of hydrolysis in the range of 20-75% using one or more enzymes including a glucoamylase, an alpha amylase, or a combination thereof;

wherein the inhibited porous granular starch product has a porosity as measured by water uptake of at least 1.2 g water/g starch (e.g., in the range of 1.2 g water/g starch to 1.8 g water/g starch) and a sedimentation volume in the range of 20 mL/g to 80 mL/g.

Another aspect of the disclosure is a inhibited porous granular starch product having a water uptake (i.e., at a temperature of 23° C.) of at least 1.2 g water/g starch (e.g., in the range of 1.2 g water/g starch to 1.8 g water/g starch) and a sedimentation volume in the range of 20-80 mL/g. In certain desirable embodiments, the porous granular starch product has substantially no fatty acid residues.

Another aspect of the disclosure is a method for making a food product comprising providing a inhibited porous granular starch product as otherwise described herein and including the inhibited porous granular starch product in the food product.

Other aspects of the disclosure will be evident from the detailed description provided herein.

DETAILED DESCRIPTION

Figure 1:
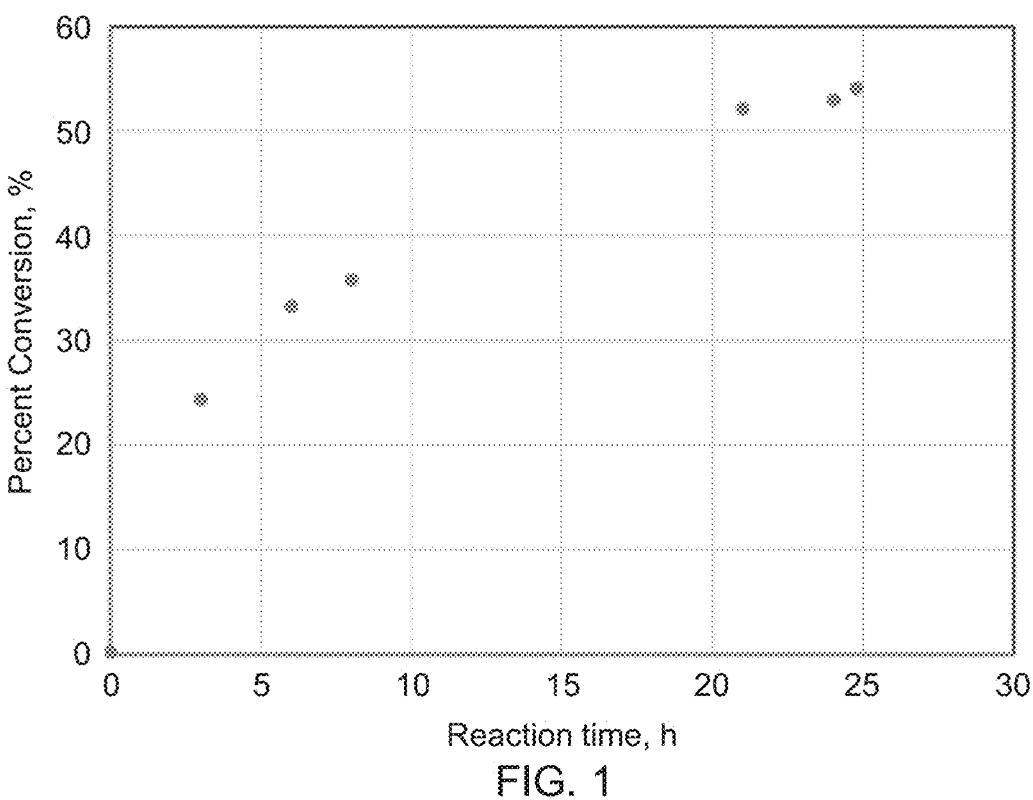
FIG. 1 is a graph showing the relationship between hydrolysis reaction time and degree of conversion according to an embodiment of the disclosure.

The present inventors have unexpectedly determined that inhibited porous granular starch products can be made hydrolyzing the granular starch feed using one or more enzymes including a glucoamylase, an alpha amylase, or a combination thereof. Based on the disclosure herein, the person of ordinary skill in the art can perform the hydrolysis to a sufficient degree to provide a desired porosity to the starch. The starch can be inhibited before the hydrolysis (i.e., by provision of an inhibited starch as feed to the hydrolysis), or, in other embodiments, a porous granular starch can first be formed, then inhibited.

Without wishing to be bound by theory, it is believed by the present inventors that the hydrolysis introduces significant pores into the starch granule body without grossly affecting the shape or size distribution. Such porosity creates a lower density starch that retains much of its inter-granule interactions (e.g., through hydrogen bonding). Thus, for equivalent mass loadings as a suspension in water, the hydrolyzed starch possesses enhanced characteristics typical of higher mass loadings of the unhydrolyzed starch starting material, as a result of having a higher effective specific volume.

The degree of hydrolysis is an important parameter in the formation of the porous starches described herein. Degree of hydrolysis is determined by measuring the dextrose content of the filtrate obtained after enzymatic treatment and washing with water. Dextrose content can conveniently be determined using a Brix refractometer (ATAGO™, Pocket PAL-1, Japan) to follow reaction progress, but ultimate degree of hydrolysis is determined using an instrument that measures dextrose per se (YSI). The degree of hydrolysis (DH) is calculated from the dextrose concentration by:

$$DH\ \% = \frac{\text{dextrose \% in the filtrate}}{\text{theoretical dextrose \% at complete conversion}};\ \text{wherein}$$

theoretical dextrose % at complete conversion =

-continued $$\text{starch dry solids content \%} \times \frac{180}{162}$$

In certain aspects of the disclosure, the granular starch feed is hydrolyzed to a degree of hydrolysis in the range of 25-70%. The granular starch feed can be hydrolyzed to a variety of degrees to provide a variety of porosities. For example, in various embodiments as otherwise described herein the degree of hydrolysis is in the range of or 25-65%, or 25-60%, or 25-55%, or 30-70%, or 30-65%, or 30-60%, or 30-55%, or 35-70%, or 35-65%, or or 35-55%, or 40-70%, or 40-65%, or 40-60%, or 40-55%, or 45-70%, or 45-65%, or 45-60%, or 45-55%. The person of ordinary skill in the art will, based on the disclosure herein, select a degree of hydrolysis (in combination with other parameters such as degree of inhibition) that provides a desired porosity to the starch.

The starch hydrolysis can be catalyzed using a wide a variety of enzymes known in the art. In certain embodiments of the disclosure, the starch is hydrolyzed with a glucoamylase. For example, in some embodiments a glucoamylase may be the only enzyme employed. In certain embodiments of the disclosure, the starch is hydrolyzed with an alpha-amylase. For example, in some embodiments an alpha-amylase may be the only enzyme employed. In other embodiments, a combination of enzymes is used. For example, in certain embodiments the hydrolysis is carried out with a glucoamylase in combination with an alpha amylase, in any relative amounts. For example, in certain embodiments, the enzymes are present in a weight ratio in the range of no more than 1:5 alpha amylase:glucoamylase, although other ratios can be used. In certain embodiments, alpha-amylase makes up less than 15 wt % of the total hydrolysis enzyme used, for example, alpha-amylase makes up between 1 wt % and 12 wt % of total hydrolysis enzyme, or between 1 wt % and 10 wt %, or between 1 wt % and 5 wt %. Treatment with glucoamylase and alpha amylase can be performed together, or in either sequence. Other enzymes which may be employed in combination with glucoamylase and/or alpha amylase include beta-amylases, cyclodextrin glycosyltransferase, and branching enzyme. The proportion of enzyme utilized may be adjusted according to the desired degree of hydrolysis of the hydrolyzed starch product, the desired reaction kinetics, and the activity of the enzyme or enzymes utilized. Similarly, if two or more enzymes are used, the proportions of the enzymes may be tailored to optimize the characteristics of the hydrolyzed product. Examples of reaction conditions are provided in the Example section below.

Notably, the starch products of the disclosure are inhibited. As the person of ordinary skill in the art will appreciate, inhibition can help to provide process tolerance. Process-tolerant starches resist breaking down into fragments and resist dissolution when processed. Thus, the inhibited starches described herein can resist degranularization upon cooking. This may be advantageous for a granular starch designed to increase viscosity, as the properties of the starch granules will not be lost upon cooking. Inhibited starches may vary with respect to their degree-of-inhibition, as characterized by their observed microscopy and/or sedimentation volume as described below.

In certain embodiments as otherwise described herein, the granular starch feed is an inhibited granular starch feed. The person of ordinary skill in the art can select a commercial inhibited starch, e.g., chemically-modified inhibited starch (for example, via crosslinking, e.g., with acrolein, phosphate, adipate or epichlorohydrin) or a clean-label inhibited starch (for example, inhibited by heat treatment). In other embodiments, a native starch can be selected and inhibited in process steps before the hydrolysis.

However, in other embodiments as otherwise described herein, the granular starch feed of the disclosure is not inhibited. In such cases, after the hydrolysis, the porous granular starch can be inhibited to a desired degree of inhibition (e.g., to provide a sedimentation volume in the range of 20 mL/g to 70 mL/g as described above). The porous granular starch need not be formally isolated or dried before inhibition, but it can be highly desirable to substantially wash away soluble saccharides created by the hydrolysis together with the enzyme before proceeding with the inhibition process.

A variety of inhibition processes can be used to inhibit the starches as described herein, be it before the hydrolysis or after the hydrolysis. For example, in certain embodiments as otherwise described herein, conventional chemical modification can be used to inhibit the starch by reaction with a crosslinking agent. Crosslinking agents suitable for this purpose include acrolein, phosphate (e.g., using $POCl_3$), adipate and epichlorohydrin. An example of a crosslinking process is using $POCl_3$ as crosslinking agent to provide a phosphate-crosslinked starch. The person of ordinary skill in the art can adapt conventional chemical modification processes for inhibiting the starches described herein.

In other embodiments, the starch is inhibited using a thermal process, for example, by adjusting the pH of the starch to neutral or greater (e.g., 8-9.5), then dehydrating the starch and heat treating it for a time and temperature sufficient to inhibit the starch, e.g., 120-180° C. for up to 20 hours). Such thermal processes for inhibition are familiar to the person of ordinary skill in the art.

In other embodiments as otherwise described herein, the starch is inhibited using a method as described in International Patent Application Publication no. WO 2013/173161, which is hereby incorporated herein by reference in its entirety. Thus, a method for inhibiting starch for use in the methods described herein can include a) heating a non-pregelatinized granular starch in an alcoholic (e.g., ethanolic) medium in the presence of a base at a temperature of at least 35° C.;
b) neutralizing the base with an acid;
c) separating the inhibited starch from the alcoholic medium; and
d) removing alcohol solvent from the inhibited starch, e.g., by heating or with steam.

The alcoholic medium generally comprises at least one alcohol, particularly a C1-C4 monoalcohol such as methanol, ethanol, n-propanol, isopropanol, n-butanol, t-butyl alcohol and the like. One or more other substances may also be present in the alcoholic medium, such as a non-alcoholic organic solvent (particularly those that are miscible with the alcohol) and/or water. However, in one embodiment of the method the alcoholic medium does not contain any solvent other than alcohol and, optionally, water. Aqueous alcohols, for example, may be used to advantage. The alcoholic medium may comprise, for instance, 30% to 100% by weight alcohol (e.g., ethanol) and from 0% to 70% by weight water. In one embodiment, the alcoholic medium contains from 80% to 96% by weight alcohol (e.g., ethanol) and from 4% to 20% by weight water, the total amount of alcohol and water equaling 100%. In another embodiment, the alcoholic medium contains 90% to 100% by weight alcohol (e.g., ethanol) and from 0% to 10% by weight water, the total amount of alcohol and water equaling 100%. In other embodiments, not more than 10% or not more than 15% by weight water is present in the alcoholic medium. The quantity of alcoholic medium relative to starch is not considered to be critical, but typically for the sake of convenience and ease of processing sufficient alcoholic medium is present to provide a stirrable and/or pumpable slurry. For example, the weight ratio of starch:alcoholic medium may be from about 1:2 to about 1:6.

In certain methods, at least some amount of treatment agent (e.g., base and/or salt) is present when the starch is heated in the alcoholic medium. However, it is advantageous that large amounts of treatment agent (relative to starch) need not be used in order to achieve effective inhibition of the starch, in contrast to previously known starch modification processes. This simplifies the subsequent processing of the inhibited starch and lowers potential production costs. Typically, at least 0.5% by weight of treatment agent (based on the dry weight of starch used) is employed, although in other embodiments at least 1%, at least 2%, at least 3%, at least 4% or at least 5% by weight of treatment agent is present. For economic reasons, generally no more than 10% or 15% by weight of treatment agent is present.

Typically, the mixture of starch, alcoholic medium and treatment agent is in the form of a slurry. In certain embodiments, it may be desirable to adjust the pH of the slurry to a particular value. It can be difficult to measure the pH of such a slurry due to the presence of the alcohol. In an embodiment where it is desired to make the slurry basic by adding a base, a suitable amount of base can be determined as if the slurry is a slurry of starch in de-ionized water alone and then scaled up to the actual amount while keeping the same ratio of base and starch.

The slurry may, for example, be neutral (pH 6 to 8) or basic (pH greater than 8). In one embodiment, the pH of the slurry is at least 6. In another embodiment, the pH of the slurry is at least 7. The slurry pH in another embodiment is not more than 12. In other embodiments, the pH of the slurry is 6-10, 7.5-10.5 or 8-10. In still other embodiments, the pH of the slurry is 5-8 or 6-7.

The treatment of the starch may be effected by first placing the starch in the alcoholic medium and then adding treatment agent (e.g., base and/or salt). Alternatively, the treatment agent may be first combined with the alcoholic medium and then contacted with the starch. The treatment agent may be formed in situ, such as by separately adding a base and an acid which react to form the salt which functions as the treatment agent.

Suitable bases for use in the process include, but are not limited to, alkali metal and alkaline earth metal hydroxides such as potassium hydroxide, calcium hydroxide and sodium hydroxide.

Suitable salts for use in these methods include water-soluble substances that ionize in aqueous solution to provide a substantially neutral solution (i.e., a solution having a pH of from 6 to 8). Alkali metal-containing salts are particularly useful, as are salts of organic acids (e.g., a sodium or potassium salt) such as itaconic acid, malonic acid, lactic acid, tartaric acid, citric acid, oxalic acid, fumaric acid, aconitic acid, succinic acid, oxalosuccinic acid, glutaric acid, ketoglutaric acid, malic acid, fatty acids and combinations thereof.

Mixtures of different treatment agents may be used. For example, the starch may be heated in the alcoholic medium in the presence of both at least one base and at least one salt.

The starch, alcoholic medium and treatment agent are heated for a time and at a temperature effective to inhibit the starch to the desired extent. Generally speaking, temperatures in excess of room temperature (i.e., 35° C. or greater) will be necessary. At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours. In general, a desired level of starch inhibition may be achieved more rapidly if the heating temperature is increased.

When the temperature selected for the heating step exceeds the boiling point of one or more components of the alcoholic medium, it will be advantageous to carry out the heating step in a vessel or other apparatus capable of being pressurized. The treatment may be conducted within a confined zone in order to maintain the alcoholic medium in a liquid state. Additional positive pressure could be employed, but is generally not necessary. The starch may be slurried in the alcoholic medium together with the treatment agent under conditions of elevated temperature and pressure and treated for a time sufficient to change the starch's viscosity characteristics. Such treatment may be conducted in a stirred tank reactor on a batch basis or in a tubular reactor on a continuous basis, although other suitable processing techniques will be apparent to those skilled in the art. In another embodiment, the starch may be in the form of a bed within a tubular reactor and a mixture of the alcoholic medium and treatment agent passed through such bed (optionally, on a continuous basis), with the bed being maintained at the desired temperature to effect inhibition of the starch.

In embodiments in which a base has been utilized as a treatment agent, the mixture of starch, alcoholic medium and base may be combined with one or more acids, once the heating step is completed, for the purpose of neutralizing the base. Suitable acids for use in such neutralization step include, but are not limited to, carboxylic acids such as itaconic acid, malonic acid, lactic acid, tartaric acid, oxalic acid, fumaric acid, aconitic acid, succinic acid, oxalosuccinic acid, glutaric acid, ketoglutaric acid, malic acid, citric acid, fatty acids and combinations thereof, as well as other types of acids such as uric acid. If the inhibited starch is intended for use as a food ingredient, the acid generally should be selected to be one that is permitted for such use under applicable regulations. Typically, sufficient acid is added to lower the pH of the mixture to about neutral to slightly acidic, e.g., a pH of from about 5 to about 7 or from about 6 to about 6.5.

The neutralization with acid may be carried out at any suitable temperature. In one embodiment, the slurry of starch, base and alcoholic medium is cooled from the heating temperature used to approximately room temperature (e.g., about 15° C. to about 30° C.) prior to being combined with the acid to be used for neutralization. The neutralized mixture may thereafter be further processed as described below to separate the inhibited starch from the alcoholic medium. In another embodiment, however, neutralization of the base is followed by further heating of the starch slurry. Such further heating has been found to be capable of modifying the rheological properties of the inhibited starch obtained, as compared to the viscosity characteristics of an analogously prepared starch that has not been subjected to heating after neutralization of the base.

Generally speaking, such further heating step is advantageously carried out at temperatures in excess of room temperature (i.e., 35° C. or greater). At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours.

The mixture of starch and alcoholic medium may be processed so as to separate the starch from the alcoholic medium. Conventional methods for recovering particulate solids from liquids such as filtration, decantation, sedimentation or centrifugation may be adapted for such purpose. The separated starch may optionally be washed with additional alcoholic medium and/or alcohol and/or water to remove any undesired soluble impurities. In one embodiment, neutralization of residual base is accomplished by washing the recovered starch with an acidified liquid medium. Drying of the separated starch will provide an inhibited non-pregelatinized granular starch in accordance with the disclosure. For example, drying may be performed at a moderately elevated temperature (e.g., 30° C. to 60° C.) in a suitable apparatus such as an oven or a fluidized bed reactor or drier or mixer. Vacuum and/or a gas purge (e.g., a nitrogen sweep) may be applied to facilitate removal of volatile substances (e.g., water, alcohol) from the starch. The resulting dried inhibited non-pregelatinized granular starch may be crushed, ground, milled, screened, sieved or subjected to any other such technique to attain a particular desired particle size. In one embodiment, the inhibited starch is in the form of a free-flowing, granular material.

In one embodiment, however, the starch is subjected to a desolventization step at a significantly higher temperature (e.g., greater than 80° C. or greater than 100° C. or greater than 120° C.). Excessively high temperatures should be avoided, however, since degradation or discoloration of the starch may result. Such a step not only reduces the amount of residual solvent (alcohol) in the product but also provides the additional unexpected benefit of enhancing the degree of inhibition exhibited by the starch. Desolventization temperatures can, for example, be about 100° C. to about 200° C. Typical temperatures are 120° C. to 180° C. or 150° C. to 170° C. The desolventization may be carried out in the presence or in the absence of steam. Steam treatment has been found to be advantageous in that it helps to minimize the extent of starch discoloration which may otherwise occur at such an elevated temperature. In one embodiment, steam is passed through a bed or cake of the inhibited porous starch. The starch desolventization methods of U.S. Pat. No. 3,578,498, incorporated herein by reference in its entirety for all purposes, may be adapted for use. Following steam treatment, the inhibited porous starch may be dried to reduce the residual moisture content (e.g., by heating in an oven at a temperature of from about 30° C. to about 70° C. or in a fluidized bed reactor).

In one embodiment, the treated starch, which has been recovered from the alcoholic medium, is first brought to a total volatiles content of not more than about 35% by weight or not more than about 15% by weight. This can be accomplished, for example, by first air or oven drying the recovered starch at moderate temperature (e.g., 20° C. to 70° C.) to the desired initial volatiles content. Live steam is then passed through the dried starch, the system being maintained at a temperature above the condensation point of the steam. A fluid bed apparatus may be used to perform such a steam desolventization step.

In general, it will be desirable to carry out desolventization under conditions effective to result in a residual alcohol content in the inhibited starch of less than 1 weight or less than 0.5 weight % or less than 0.1 weight %.

Following desolventization, the inhibited starch may be washed with water and then re-dried to further improve color and/or flavor and/or reduce the moisture content.

Of course, the person of ordinary skill in the art can use other methodologies to inhibit the starches described herein. The starch can, for example, be subjected to a pH adjustment and then heated. The pH adjustment can be performed by contacting a pH-adjusting agent with the starch; examples of pH-adjusting agents include acids (e.g., an organic acid or and inorganic acid). Examples of acids that may be suitable for use according to the present disclosure include sulfuric acid, phosphoric acid, hydrochloric acid, itaconic acid, aconitic acid, malonic acid, lactic acid, tartaric acid, oxalic acid, fumaric acid, aconitic acid, succinic acid, acetic acid, oxalosuccinic acid, glutaric acid, ketoglutaric acid, malic acid, citric acid, fatty acids and carbonic acid, as well as salts thereof (e.g., potassium and/or sodium salts, which can be generated in situ by neutralization of the acid) and combinations thereof. The pH-adjusting agent can be contacted with the starch in any convenient fashion, e.g., as a slurry in liquid (e.g., water, alcohol (e.g., as described above, including ethanol or isopropanol), including aqueous alcohol such as aqueous ethanol, or another solvent); in dry form; in damp form (e.g., in a mist in a solvent (such as water, aqueous ethanol, or another solvent); or in the form of a damp dough of the starch (e.g., with water, aqueous ethanol, or another solvent). And when an alkali metal salt of an acid is to be used, it can be formed in situ, e.g., by adding the acid and an alkali metal hydroxide or carbonate in separate steps.

The pH adjustment can be performed to yield a variety of pH values. For example, in certain embodiments, and as described in WO 2013/173161, the pH adjustment can be performed to yield a pH in the range of 7-10. In other, alternative embodiments, the pH adjustment can be performed to yield a pH in the range of 2-7, e.g., in the range of 2-6, or 2-5, or 2-4, or 2-3, or 3-7, or 3-6, or 3-5, or 3-4, or 4-7, or 4-6, or 4.5-7, or 4.5-6, or 5-7, or 5-6, or about 2.5, or about 3, or about 3.5, or about 4, or about 4.5, or about 5, or about 5.5, or about 6, or about 6.5, or about 7. When the pH adjustment is performed in a slurry, the pH of the slurry is the relevant pH. When the pH adjustment is performed in a substantially non-liquid form (e.g., a dough, or in damp solid), the pH of the solid material at 38% in water is the relevant pH. The amount of the pH-adjusting agent relative to the starch can vary, for example, from 0.05-30 wt % on a dry solids basis, e.g., 0.05-20 wt %, 0.05-10 wt %, 0.05-5 wt %, 0.05-2 wt %, 0.05-1 wt %, 0.05-0.5 wt %, 0.2-30 wt %, 0.2-20 wt %, 0.2-10 wt %, 0.2-5 wt %, 0.2-2 wt %, 0.2-1 wt %, 1-30 wt %, 1-20 wt %, 1-10 wt %, 1-5 wt %, 5-30 wt % or 5-20 wt %. Desirably, the pH adjusting agent is mixed thoroughly with the starch feedstock. This will require different process conditions depending on the form in which the pH adjustment is performed. If the pH adjustment is performed in a slurry, simply stirring the slurry for a few minutes may be sufficient. If the pH adjustment is performed in a drier form (e.g., in a damp solid or a dough), more substantial contacting procedures may be desirable. For example, if a solution of the pH-adjusting agent is sprayed onto dry starch feedstock, it can be desirable to mix for about 30 minutes then store for at least a few hours. It is desirable to provide for uniform distribution of the pH-adjusting agent throughout the starch, i.e., on a granular level, in order to provide uniform inhibition.

After the pH-adjusting agent is contacted with the starch, the starch can be heated (i.e. while still in contact with pH-adjusting agent). The starch can be heated in a variety of forms. For example, the starch can be heated in alcohol or non-aqueous solvent slurry (e.g., under pressure if the boiling point of the solvent not sufficiently above the heating temperature); as a dough of starch, water, and non-water solvent to suppress granular swelling (e.g., as disclosed in WO 2013/173161), or in a substantially dry state, e.g., at a moisture level of less than 5%, less than 4%, or less than 3% (solvent can be removed using conventional techniques such as filtration, centrifugation and/or heat-drying, e.g. as described above with respect WO 2013/173161). The starch can be, for example, dried to a moisture level of less than 5% before further heating, in order to suppress gelatinization of the starch. Relatively low temperatures, e.g., 40-80° C., or 40-60° C., or about 50° C., can be used for such drying. Vacuum can also be used in the drying process. The starch can be dried as a result of the heating process (see below); a separate drying step is not necessary.

The dried starch can be heated at a variety of temperatures for a variety of times in order to inhibit it to a desired degree. One suitable temperature range is the range of 100-200° C. For example, in certain methods, the heating temperature is 120-160° C. In other various methods, the heating temperature is 120-200° C., 120-180° C., or 120-160° C., or 120-140° C., or 140-200° C., or 140-180° C., or 140-160° C., or 160-200° C., or 160-180° C., or 180-200° C. The starch can be heated for a time in the range of, for example, 20 seconds to 20 hours. Typical heating times are in the range of 10 minutes to two hours. Longer heating times and/or higher heat-treatment temperatures can be used to provide more inhibition. The material is desirably uniformly heated. As examples, the starch can be heated under pressure to maintain a desired moisture content, or it can be heated in a mass flow bin or similar device.

Certain methods described herein can be practiced, for example, using no alcohol in the liquid medium for the contacting with the pH adjustment. In certain particularly desirable methods, water is used as the medium for the pH adjustment. Accordingly, in certain desirable embodiments, the inhibited porous starch comprises less than 500 ppm of alcohol solvent, e.g., less than 500 ppm ethanol. For example, in various embodiments, the inhibited porous starch comprises less than 100 ppm, less than 50 ppm, less than 10 ppm, less than 5 ppm, or less than 1 ppm of alcohol solvent, e.g., less than 100 ppm, less than 50 ppm, less than 10 ppm, less than 5 ppm, or less than 1 ppm ethanol.

The heated starch can be allowed to cool then used as-is, or further treated as is conventional in the art. For example, the starch can be washed to provide even whiter color and more pleasant flavor. If a non-aqueous solvent is used, it can be desirable to remove as much solvent as possible. But if relatively low levels of the pH-adjusting agent are used, the final product can meet reasonable pH and ash targets without further washing.

The heat treatments described herein are desirably performed to avoid substantially gelatinizing the starch. Thus, the specific conditions of time of treatment, temperature of treatment, and proportions of the components of the mixture of starch, solvent and treatment agent are generally selected such that the starch is not gelatinized to a significant extent. That is, the starch remains substantially non-pregelatinized as described above.

In certain embodiments as otherwise described herein, the starch product is not crosslinked by acrolein, phosphate, adipate or epichlorohydrin, e.g., the starch product is inhibited via a heat treatment.

There are a variety of starch sources that may be utilized according to the present disclosure. For example, in certain embodiments as otherwise described herein, the granular starch feed comprises a maize starch (e.g., waxy or non-waxy). In other embodiments as otherwise described herein, the granular starch feed comprises a tapioca starch (e.g., waxy or non-waxy). In other embodiments as otherwise described herein, the granular starch feed comprises a wheat starch, a rice starch, a potato starch, an oat starch, a barley starch or a sago starch. Additionally, the granular starch feed may be a mixture of one or more starch types or grades.

While, as described below, it can in certain embodiments be preferable for the starches of the disclosure to not be chemically modified, in certain other embodiments chemical modification of the starches can be useful to further modify starch properties. Suh starches can be chemically modified, for example, by ethereal substitution (e.g., ethyl, hydroxypropyl) or ester substitution (e.g., acetate, octenyl succinic anhydride).

As the person of ordinary skill in the art will appreciate, the starch may be purified, e.g., by conventional methods, to reduce undesirable flavors, odors, or colors, e.g., that are native to the starch or are otherwise present. For example, methods such as washing (e.g., alkali washing), steam stripping, ion exchange processes, dialysis, filtration, bleaching such as by chlorites, enzyme modification (e.g., to remove proteins), and/or centrifugation can be used to reduce impurities. The person of ordinary skill in the art will appreciate that such purification operations may be performed at a variety of appropriate points in the process.

Inhibited starches may vary with respect to their degree-of-inhibition, as characterized by their observed microscopy and sedimentation volume. Degree-of-inhibition can be assessed by cooking the starch in water (typically cook at 95° C. for 30 mins with hand stirring in the first 6 mins) and then observing the cook under microscope. Starches that have not been inhibited will have few granules and fragments, as they tend to dissolve in water during cooking. Starches that have been inhibited will show swollen intact particles under microscope, with starches that have been highly inhibited exhibit small and dark particles and starches that have been slightly inhibited exhibit large and light particles. Alternatively, degree-of-inhibition can be assessed through the measurement of sedimentation volume of the starch. In certain embodiments as otherwise described herein, the inhibited porous granular starch has a sedimentation volume in the range of 20-80 mL/g. For example, in various embodiments as otherwise described herein the sedimentation volume is in the range of 20-70 mL/g, or 20-60 mL/g, or 20-50 mL/g, or 20-40 mL/g, or 30-80 mL/g, or 30-70 mL/g, or 30-60 mL/g, or 30-50 mL/g, or 40-80 mL/g, or 40-70 mL/g, or 40-60 mL/g, or 50-80 mL/g, or 50-80 mL/g, or 20-40 mL/g, or 25-35 mL/g.

As used herein, sedimentation volume is the volume occupied by one gram of cooked starch (dry basis) in 100 grams (i.e. total, including the starch) of salted buffer solution. This value is also known in the art as "swelling volume." As used herein, the "salted buffer solution" refers to a solution prepared according to the following steps:

a) Using a top loader balance, weigh out 20 grams of sodium chloride into a 2 liter volumetric flask containing a stir bar;
b) To this add RVA pH 6.5 buffer (purchased from Ricca Chemical Company) so that the flask is at least half full;
c) Stir to mix until sodium chloride is dissolved;
d) Add additional RVA pH 6.5 buffer to a final volume of 2 liters;

Sedimentation volumes as described herein are determined by first cooking the starch at 5% solids in the salted buffer solution by suspending a container containing the slurry in a 95° C. water bath and stirring with a glass rod or metal spatula for 6 minutes, then covering the container and allowing the paste to remain at 95° C. for an additional 20 minutes. The container is removed from the bath and allowed to cool on the bench. The resulting paste is brought back to the initial weight by addition of water (i.e. to replace any evaporated water) and mixed well. 20.0 g of the paste (which contains 1.0 g starch) is weighted into a 100 mL graduated cylinder containing salted buffer solution, and the total weight of the mixture in the cylinder is brought to 100 g using the buffer. The cylinder is allowed to sit undisturbed for 24 hours. The volume occupied by the starch sediment (i.e., as read in the cylinder) is the sedimentation volume for 1 g of starch, i.e., in units of mL/g.

An important feature of the inhibited porous granular starch product as otherwise described herein is the porosity of the product. Without wishing to be bound by theory, it is believed that a highly porous product allows for increases in certain attributes, such as sedimentation volume and/or viscosity in solution, at lower mass loadings. One way to quantify porosity is by measuring the water uptake of the porous material as compared to that of the granular starch feed. Accordingly, in certain embodiments as otherwise described herein, the porous granular starch product has a porosity as measured by change in water uptake as compared to the granular starch feed in the range of 10-60%. For example, in certain embodiments as otherwise described herein, the change in water uptake as compared to the granular starch feed may be in the range of 20-60%, or 30-60%, or 40-60%, or 10-50%, or 20-50%, or 30-50%, or 40-50%, or 10-40%, or 20-40%, or 30-40%, or 10-30%, or 20-30%. In certain embodiments as otherwise described herein, the change in water uptake as compared to the granular starch feed is greater than 30%, e.g., greater than 40%, or greater than 50%, or greater than 60%, or greater than 70%.

Another way to measure porosity (as an alternative to or in addition to the percent change as compared to the feed) is absolute porosity. In certain aspects of the disclosure, the inhibited porous granular starch product may have a water uptake of at least 1.2 g water/g starch. For example, in certain embodiments as otherwise described herein, the inhibited porous granular starch product has a water uptake of at least 1.3 g water/g starch, or at least 1.4 g water/g starch, or at least 1.5 g water/g starch. In certain embodiments as otherwise described herein, the water uptake is in the range of 1.2-1.8 g water/g starch. For example, the water uptake may be in the range of 1.25-1.8 g water/g starch, or 1.3-1.8 g water/g starch, or 1.35-1.8 g water/g starch, or 1.4-1.8 g water/g starch, or 1.45-1.8 g water/g starch, or 1.5-1.8 g water/g starch, or 1.55-1.8 g water/g starch, or 1.6-1.8 g water/g starch, or 1.65-1.8 g water/g starch, or 1.65-1.8 g water/g starch, or 1.7-1.8 g water/g starch, or 1.2-1.7 g water/g starch, or 1.25-1.7 g water/g starch, or 1.3-1.7 g water/g starch, or 1.35-1.7 g water/g starch, or 1.4-1.7 g water/g starch, or 1.45-1.7 g water/g starch, or 1.5-1.7 g water/g starch, or 1.55-1.7 g water/g starch, or 1.6-1.7 g water/g starch, or 1.2-1.6 g water/g starch, or 1.25-1.6 g water/g starch, or 1.3-1.6 g water/g starch, or 1.35-1.6 g water/g starch, or 1.4-1.6 g water/g starch, or 1.45-1.6 g water/g starch, or 1.5-1.6 g water/g starch, or 1.2-1.5 g water/g starch, or 1.25-1.5 g water/g starch, or 1.3-1.5 g water/g starch, or 1.35-1.5 g water/g starch, or 1.4-1.5 g water/g starch. In certain embodiments as otherwise described herein, the inhibited porous granular starch product has a water uptake greater than 1.4 g water/g starch, e.g., greater than 1.5 g water/g starch, or greater than 1.55 g water/g starch, or greater than 1.6 g water/g starch, or greater than 1.65 g water/g starch, or greater than 1.7 g water/g starch.

Water uptake can be used to understand the porosity of the starch granules. The water uptake of the starch is determined as follows: 30 g (solids basis) of starch is suspended in 90 g of 20 mM citrate buffer. The mixture is stirred for 30 minutes at 23° C. and filtered through a Buchner funnel five minutes, after which time no water droplets are observed. The filtrate is weighed and the water uptake is calculated as the water retained after these process steps, as follows:

water retained ($g$)=slurry weight ($g$)−filtrate weight ($g$)−starch dry weight($g$)

water holding capacity=water retained ($g$)/starch dry weight ($g$)

Notably, the inhibited porous granular starches described herein can be made without many of the conventional chemical modifiers used in the making of conventional modified and/or inhibited starches. Accordingly, in certain embodiments, the starches as otherwise described herein can be marked or labeled as so-called "clean-label" starches. For example, in certain embodiments as otherwise described herein, the inhibited porous granular starch is not hydroxypropylated. In certain embodiments, the inhibited porous granular starch is not acetylated. In certain embodiments, the inhibited porous granular starch is not carboxymethylated. In certain embodiments, the inhibited porous granular starch is not hydroxyethylated. In certain embodiments, the inhibited porous granular starch is not phosphated. In certain embodiments, the inhibited porous granular starch is not succinated (e.g., not octenylsuccinated). In certain embodiments, the inhibited porous granular starch is not cationic or zwitterionic. In certain embodiments, the inhibited porous granular starch has substantially no fatty acid residues. In certain embodiments, the inhibited porous granular starch product is not crosslinked with phosphate. In certain embodiments, the inhibited porous granular starch product is not crosslinked with adipate. In certain embodiments, the inhibited porous granular starch product is not crosslinked with epichlorohydrin. In certain embodiments, the inhibited porous granular starch product is not crosslinked with acrolein. In certain embodiments, the inhibited porous granular starch product is not bleached or oxidized with peroxide or hypochlorite.

The inhibited porous granular starches of the present disclosure can have a variety of viscosities as measured by a Rapid Visco Analyzer (RVA). For example, in certain embodiments the inhibited porous granular starch as otherwise described herein can have a viscosity as measured by RVA is in the range of 50-1500 cP at 5% solids. In certain such embodiments, the viscosity as measured by RVA at 5% solids is in the range of 50-1000 cP, cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, or 600-850 cP, 700-1500 cP, or 700-1300 cP.

To measure rheological properties, cooked starch at 5% ds is diluted as necessary with RVA buffer with 1% NaCl to obtain samples at particular ds levels (e.g., 4% ds, or 2.5% ds). The viscosity was measured using a stress control (DHR-3) rheometer from TA instruments, equipped with a lower Peltier plate and an upper parallel plate (40 mm diameter) with drawdown road and adaptor. All measurements were carried out at 25° C. using the following procedure:

a. Amplitude sweep at 100 Rad/s from 0.1% to 100%;

b. Frequency sweep from 100 Rad/s to 0.1 Rad/s; and c. Flow curves at shear rates of 0.01 $s^{-1}$ to 100 $s^{-1}$.

The viscosity is measured by RVA at 5% solids in a pH 6.5 phosphate buffer at 1% NaCl at a stir rate of 160 rpm. The initial temperature of the analysis is 50° C.; the temperature is ramped linearly up to 90° C. over 3 minutes, then held at 95° C. for 20 minutes, then ramped linearly down to 50° C. over 3 minutes, then held at 50° C. for 9 minutes, after which time the viscosity is measured. Notably, when a pasting peak is displayed at times of about 2-5 minutes, the final viscosity measured is higher than the pasting peak viscosity. When the pasting peak is absent, the viscosity during the 95° C. hold is flat, or increases.

A notable feature of certain embodiments of inhibited porous granular starch according to the present disclosure is higher viscosities at low solids loading. Accordingly, the viscosity can be measured as described above but at 3% solids or at 2.5% solids. At a loading of 3% solids, the inhibited porous granular starch may have a viscosity as measured by RVA in the range of 60-90 cP. In certain such embodiments, the viscosity as measured by RVA is in the range of 62-90 cP, or 64-90 cP, or 66-90 cP, or 68-90 cP, or 70-90 cP, or cP, or 62-85 cP, or 64-85 cP, or 66-85 cP, or 68-85 cP, or 70-85 cP, or 60-80 cP, or 62-80 cP, or 64-80 cP, or 66-80 cP, or 68-80 cP, or 70-80 cP, or 60-75 cP, or 62-75 cP, or 64-75 cP, or 66-75 cP, or 68-75 cP, or 70-75 cP. At a loading of 2.5% solids, the inhibited porous granular starch may have a viscosity as measured by RVA in the range of 38-60 cP. In certain such embodiments, the viscosity as measured by RVA is in the range of 40-60 cP, or 42-60 cP, or 44-60 cP, or 46-60 cP, or 48-60 cP, or 50-60 cP, or 38-56 cP, or 40-56 cP, or 42-56 cP, or 44-56 cP, or 46-56 cP, or 48-56 cP, or 50-56 cP, or 38-54 cP, or 40-54 cP, or 42-54 cP, or 44-54 cP, or 46-54 cP, or 48-54 cP, or 50-54 cP, or 38-52 cP, or 40-52 cP, or 42-52 cP, or 44-52 cP, or 46-52 cP, or 48-52 cP.

The inhibited porous granular starches described herein can be made with relatively little color. For example, certain embodiments of the inhibited porous starches as otherwise described herein are relatively low in color, i.e., have a Yellowness Index of no more than 10, for example, in the range of 3-10 or 5-10. In certain desirable embodiments, the inhibited porous starches described herein are especially low in color, i.e., the Yellowness Index is less than 8 (e.g., 3-8 or 5-8). Yellowness Index is determined via ASTM E313.

Optical microscopy can be used to access how intact the starch granules after cooking. Often, the starch granules are stained with an iodine solution to improve visibility. Typically, the cooked starch is visualized under bright field with or without polarized light. To prepare the starch, a 5% cooked starch paste in RVA buffer with 1% NaCl at pH 6.5 is diluted with an equal volume of the same buffer, and then mixed with a further volume of iodine solution. A drop of this mixture is added to a standard microscope slide and covered with a cover slip. The magnification is often 200×, but can take a range of values as required.

More detailed images of granular starches can be acquired with a scanning electron microscope. Backscattered imaging mode and low vacuum (40 Pa) are most typically used. A typical procedure is as follows: a small amount of sample powder is put on the surface of a double sided adhesive pad mounted on a specimen stub. A dust remover (e.g., Super Friendly AIR'IT™, FisherBrand) is used to blow away excess powder particles. The electron microscopy images are collected at 500× and 1500× magnification, although a range of magnification values can be used as required.

The inhibited porous granular starches of the disclosure desirably have relatively low solubles. Water can be used to wash away a substantial amount of the soluble fraction formed by hydrolysis, but the person of ordinary skill in the art will appreciate that some solubles will typically remain. In certain embodiments as otherwise described herein, the inhibited porous granular starch has no more than 15% solubles, e.g., no more than 12% solubles, no more than 10% solubles, no more than 8% solubles or no more than 5% solubles. Solubles can be determined by measurement of the supernatant in the RVA viscosity test (5% solids) described above.

Another aspect of the disclosure is a inhibited porous granular starch having a water uptake of at least 1.2 g water/g starch and a sedimentation value in the range of 20-80 mL/g, the porous granular starch product having substantially no fatty acid residues (e.g., no more than 0.5 wt %, no more than 0.2 wt %, or even no more than 0.1 wt %).

In certain embodiments, the inhibited porous granular starch has a water uptake of at least 1.3 g water/g starch, or at least 1.4 g water/g starch, or at least 1.5 g water/g starch. In certain embodiments as otherwise described herein, the water uptake is in the range of 1.2-1.8 g water/g starch. For example, in various embodiments as otherwise described herein, the inhibited porous granular starch product has in the range of 1.25-1.8 g water/g starch, or 1.3-1.8 g water/g starch, or 1.35-1.8 g water/g starch, or 1.4-1.8 g water/g starch, or 1.45-1.8 g water/g starch, or 1.5-1.8 g water/g starch, or 1.55-1.8 g water/g starch, or 1.6-1.8 g water/g starch, or 1.65-1.8 g water/g starch, or 1.65-1.8 g water/g starch, or 1.7-1.8 g water/g starch, or 1.2-1.7 g water/g starch, or 1.25-1.7 g water/g starch, or 1.3-1.7 g water/g starch, or 1.35-1.7 g water/g starch, or 1.4-1.7 g water/g starch, or 1.45-1.7 g water/g starch, or 1.5-1.7 g water/g starch, or 1.55-1.7 g water/g starch, or 1.6-1.7 g water/g starch, or 1.2-1.6 g water/g starch, or 1.25-1.6 g water/g starch, or 1.3-1.6 g water/g starch, or 1.35-1.6 g water/g starch, or 1.4-1.6 g water/g starch, or 1.45-1.6 g water/g starch, or 1.5-1.6 g water/g starch, or 1.2-1.5 g water/g starch, or 1.25-1.5 g water/g starch, or 1.3-1.5 g water/g starch, or 1.35-1.5 g water/g starch, or 1.4-1.5 g water/g starch. In certain embodiments as otherwise described herein, the inhibited porous granular starch product has a water uptake greater than 1.4 g water/g starch, e.g., greater than 1.5 g water/g starch, or greater than 1.55 g water/g starch, or greater than 1.6 g water/g starch, or greater than 1.65 g water/g starch, or greater than 1.7 g water/g starch.

The inhibited porous granular starch can have a variety of sedimentation volumes. For example, in various embodiments as otherwise described herein the sedimentation volume is in the range of 20-70 mL/g, or 20-60 mL/g, or 20-50 mL/g, or 20-40 mL/g, or 30-80 mL/g, or 30-70 mL/g, or 30-60 mL/g, or 30-50 mL/g, or 40-80 mL/g, or 40-70 mL/g, or 40-60 mL/g, or 50-80 mL/g, or 50-80 mL/g.

The inhibited porous granular starch can otherwise be as described above.

The inhibited porous granular starches of the disclosure are useful as texturants in food products. Accordingly, another aspect of the disclosure is a method for making a food product. The method includes cooking a starch as described herein the presence of water; and providing the cooked starch in combination with one or more other food ingredients. For example, a starch as described herein can be combined with one or more other food ingredients that include water, and cooking the combination of the starch and the food ingredients. In particular embodiments, the method includes pasteurization, retorting, kettle or batch cooking, or ultra-high temperature processing. The starch can alternatively be cooked separately, and later combined with one or more of the food ingredients. Thus, in certain embodiments of the disclosure, the inhibited porous granular starch is in cooked form in the food product. As used herein, a starch in cooked form is characterized by a lack of the "Maltese cross" pattern indicative of birefringence when viewed under polarized light, as would be understood by the person of ordinary skill in the art.

Notably, the inhibited porous granular starches of the disclosure can be used to provide thickened food products. In certain embodiments as otherwise described herein, the food product has a viscosity of at least 100 cP, e.g., at least 200 cP, or at least 500 cP, measured at 25° C. In certain embodiments as otherwise described herein, the food product has a viscosity of at least 1000 cP, e.g., at least 2000 cP, or at least 5000 cP, measured at ° C. Viscosities of food products are measured by rotational viscometry, and are absolute viscosities.

The use of the starches described herein can provide a substantially greater viscosity to a food product than an otherwise identically-prepared food product lacking the starch. By this it is meant that, other than the starch, the comparative food product contains all the same ingredients in the same amounts and is treated identically to the product with the starch. In certain embodiments as otherwise described herein, the food product has a viscosity of at least 50 cP greater than the viscosity of an otherwise identically-prepared food product lacking the inhibited porous granular starch, e.g., at least 75 cP greater or at least 100 cP greater, measured at 25° C. In certain embodiments as otherwise described herein, the food product has a viscosity of at least 200 cP greater than the viscosity of an otherwise identically-prepared food product lacking the inhibited porous granular starch, e.g., at least 500 cP greater, measured at 25° C.

The inhibited porous granular starches of the disclosure can be used at a variety of usage rates in the food product. For example, in certain embodiments, the inhibited porous granular starch is present in the food product in an amount in the range of 0.1-10 wt %, e.g., 0.1-8 wt %, or 0.1-5 wt %, or 0.5-10 wt %, or 0.5-8 wt %, or 0.5-5 wt %, or 1-10 wt %, or 1-8 wt %, or 1-5 wt %. However, the present inventors have found that the claimed starches can be especially advantaged over non-porous starches at lower use rates. For example, in certain embodiments as otherwise described herein, the inhibited porous granular starch is present in the food product in an amount in the range of 0.1-4 wt %, e.g., 0.1-3 wt %, or 0.1-2.5 wt %, or 0.5-4 wt %, or 0.5-3 wt %, or 0.5-2.5 wt %, or 1-4 wt %, or 1-3 wt %, or 1-2.5 wt %.

The food product can be, for example, a tomato-based product, a gravy, a sauce such as a white sauce or a cheese sauce, a soup, a pudding, a salad dressing (e.g., pourable or spoonable), a yogurt, a sour cream, a pudding, a custard, a cheese product, a fruit filling or topping, a cream filling or topping, a syrup (e.g., a lite syrup), a beverage (e.g., a dairy-based beverage), a glaze, a condiment, a confectionary, a pasta, a frozen food, a cereal, or a soup. A variety of cooking methods can be used, for example, pasteurization, retorting, kettle cooking, batch cooking and ultra-high temperature processing.

The starches described herein can also be used to modify the properties of solid foods, e.g., baked goods, for example, acting as an anti-stalant to provide a softer product that retains a fresher texture after storage. Accordingly, in other embodiments, the food product is a baked good, e.g., a bread, a pastry, a pie crust, a donut, a cake, a biscuit, a cookie, a cracker, or a muffin. In such embodiments, the cooking can include baking. In some embodiments, the use of the starches described herein in a baked good (i.e., in the dough or batter thereof) can help reduce staling. In other embodiments, the starch can be included in, e.g., a filling inside the baked good.

A variety of other food products can advantageously be made using the starches of the present disclosure. For example, food products in which the starches of the present disclosure are useful include thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity. Food products in which the starches of the present disclosure are particularly useful are foods requiring a thermal processing step such as pasteurization, retorting, high-temperature short-time treatment, or ultra high temperature (UHT) processing. The starches of the present disclosure are particularly useful in food applications where stability is required through all processing temperatures including cooling, freezing and heating.

Based on processed food formulations, the practitioner may readily select the amount and type of the starches of the present disclosure required to provide the necessary thickness and gelling viscosity in the finished food product, as well as the desired texture. Typically, the starch is used in an amount of 0.1-35%, e.g., 0.5-6.0%, by weight, of the food product.

Among the food products which may be improved by the use of the starches of the present disclosure are high acid foods (pH<3.7) such as fruit-based pie fillings, baby foods, and the like; acid foods (pH 3.7-4.5) such as tomato-based products; low acid foods (pH >4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying.

In other embodiments, the food product is a confection.

The starches described herein can be used in a wide variety of other foods. For example, in certain embodiments of the starches and methods of the disclosure, the starch is used in a food selected from baked foods, breakfast cereal, anhydrous coatings (e.g., ice cream compound coating, chocolate), dairy products, confections, jams and jellies, beverages, fillings, extruded and sheeted snacks, gelatin desserts, snack bars, cheese and cheese sauces, edible and water-soluble films, soups, syrups, sauces, dressings, creamers, icings, frostings, glazes, tortillas, meat and fish, dried fruit, infant and toddler food, and batters and breadings. The starches described herein can also be used in various medical foods. The starches described herein can also be used in pet foods.

The starches of the present disclosure may also be used in various non-food end use applications where starches have conventionally been utilized, such as cosmetic and personal care products, paper, packaging, pharmaceutical formulations, adhesives, and the like.

Desirably, the starches of the disclosure can provide superior properties, such as freeze-thaw stability, in combination with good digestive tolerance. The present inventors have determined that the starches described herein, unlike many highly modified starches, can be provide desirable properties, such as desirable viscosity properties and desirable freeze-thaw tolerance, even in demanding storage conditions, without becoming indigestible or without otherwise causing digestive intolerance Another aspect of the disclosure is a dry mix comprising a starch as described herein, in admixture with one or more food ingredients. When the dry mix is cooked (i.e. in the presence of water), it can take a longer time to gel, and thus allow for longer times to hold cooked product, to convey cooked product (e.g., by pumping), and to fill cooked product into containers before the product sets to gel. The dry mix can be, for example, a dry mix for a baked good, e.g., a bread, a pastry, a pie crust, a donut, a cake, a biscuit, a cookie, a cracker, or a muffin.

Further description is provided with respect to the Examples, below.

Example 1—Synthesis of a Porous Starch from a Chemically Modified Starch with Lower Crosslinking Levels Step 1: Inhibition of the Granular Starch A round-bottom flask was charged with 260 g dry-solids (294.1 g as-is) of granular starch (native waxy maize starch) and 408.6 g reverse-osmosis water and stirred to form a uniform suspension. The temperature was equilibrated at 30° C. and then 26 g of sodium sulfate was added. The pH was adjusted to 11.6-11.7 using a 5% aqueous solution of NaOH added dropwise while stirring at 600-700 rpm. Next, 2.6 g $POCl_3$ was added and allowed to react for 30 minutes. The reaction was quenched by adjusting the pH to 5.7 using a 4% aqueous solution of HCl. The resulting slurry was filtered and washed with 520 mL of water. Thirty grams of the wet cake was then crumbled onto a piece of paper, let dry at 50° C. overnight, and subsequently ground in a coffee grinder to obtain a phosphate-inhibited granular starch.

Step 2: Treatment of Phosphate-Inhibited Granular Starch with Glucoamylase (AMG 300L)

The phosphate-inhibited granular starch obtained above was slurried with sufficient water to achieve 32% solids. The pH was adjusted to 4.5 using a 4% aqueous solution of HCl and the temperature was equilibrated to 50° C. Glucoamylase (AMG 300L) was added in an amount of 0.008 mL per gram dry solids of starch. 30 mL aliquots were taken at 0 h (before enzyme addition) as well as at 3 h, 6 h, 8 h, 21 h, and 24 h after enzyme addition. The aliquots were filtered without washing and the sugar contents of the filtrates measured using a digital refractometer (ATAGO™, Pocket PAL-1, Japan). After 24 h, the pH of the remaining slurry was adjusted to 7.0 using a 5% aqueous solution of NaOH. The neutralized slurry was filtered and washed with twice an amount of tap water as dry solids (ds) of starch. The remaining wet cake was crumbled on a piece of paper, let dry at 50° C. overnight, and subsequently ground in a coffee grinder to obtain a porous, inhibited granular starch.

Sample Analysis

The aliquots taken during treatment with glucoamylase reveal the enzyme hydrolysis kinetics. The table below displays the relationship between the reaction time, Brix, and conversion (i.e., degree of hydrolysis as calculated from the % dextrose corresponding to the various Brix values):

| Reaction Time (h) | Brix (%) | Conversion (%) |
|---|---|---|
| 0.00 | 0.1 | 0.3 |
| 3.00 | 8.9 | 24.4 |
| 6.00 | 12.0 | 33.3 |
| 8.00 | 12.9 | 35.8 |
| 21.00 | 18.8 | 52.2 |
| 24.00 | 19.1 | 53.1 |
| 24.75 | 19.5 | 54.2 |

The above data are also plotted as FIG. 1. Notably, a conversion of ~53% was achieved in 24 hours, and the reaction was stopped at 24.75 hours with a final conversion of ~54%.

Figure 2:
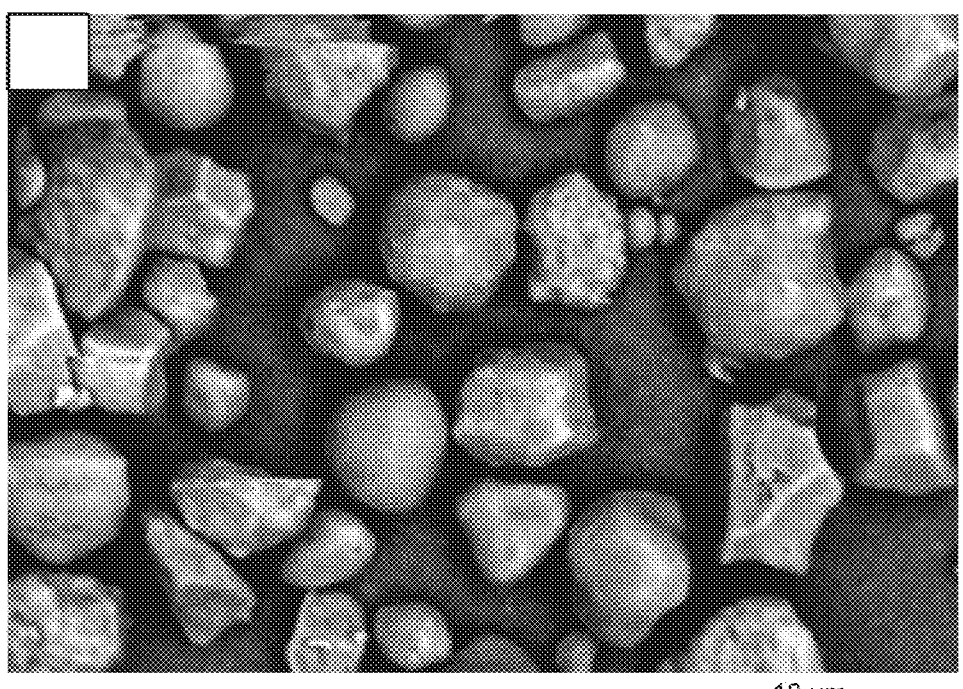
FIGS. 2-4 are SEM images of granular starches according to embodiments of the disclosure.
Figure 3:
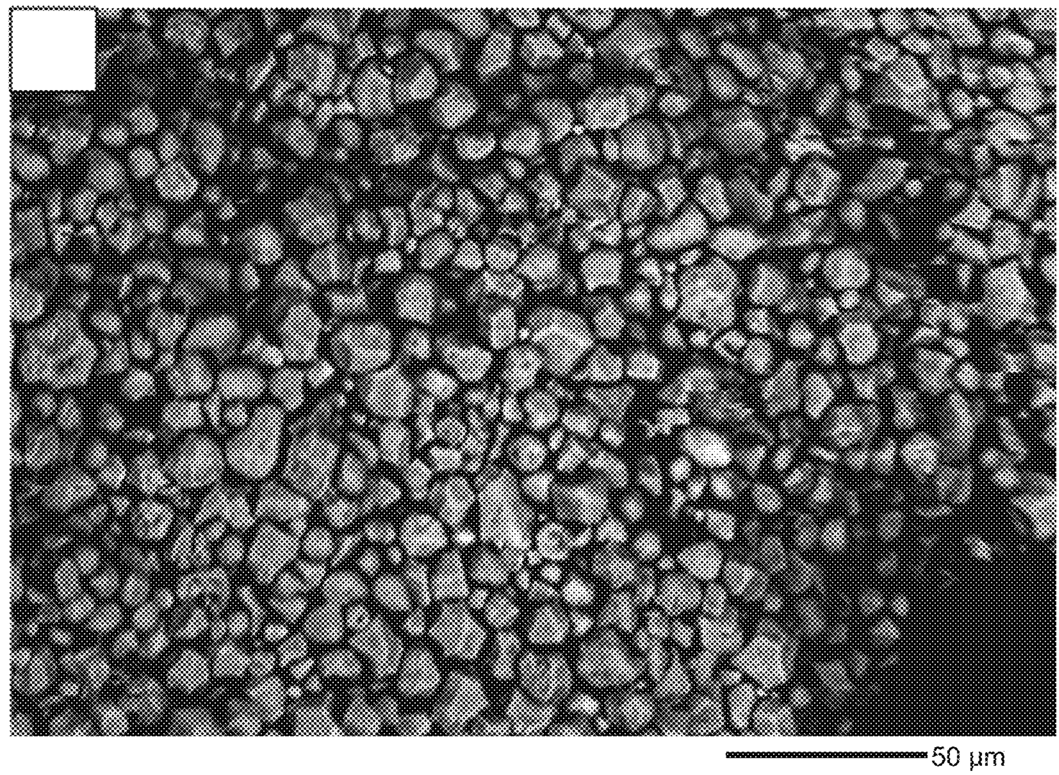
Figure 3:
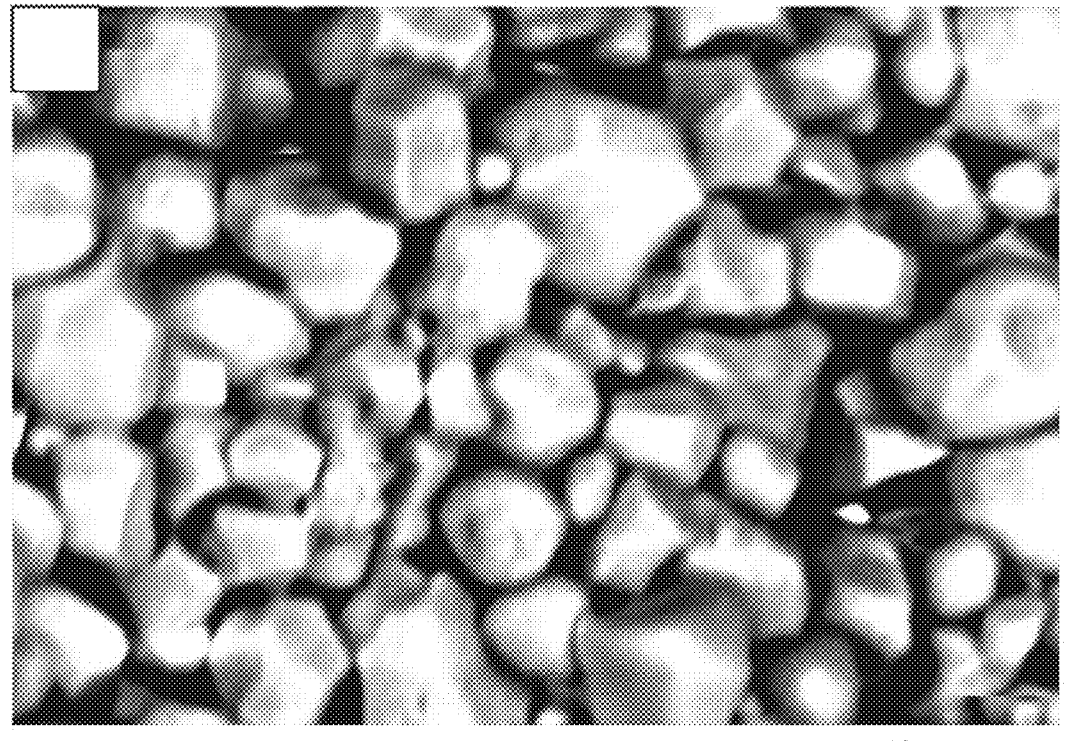
Figure 4:
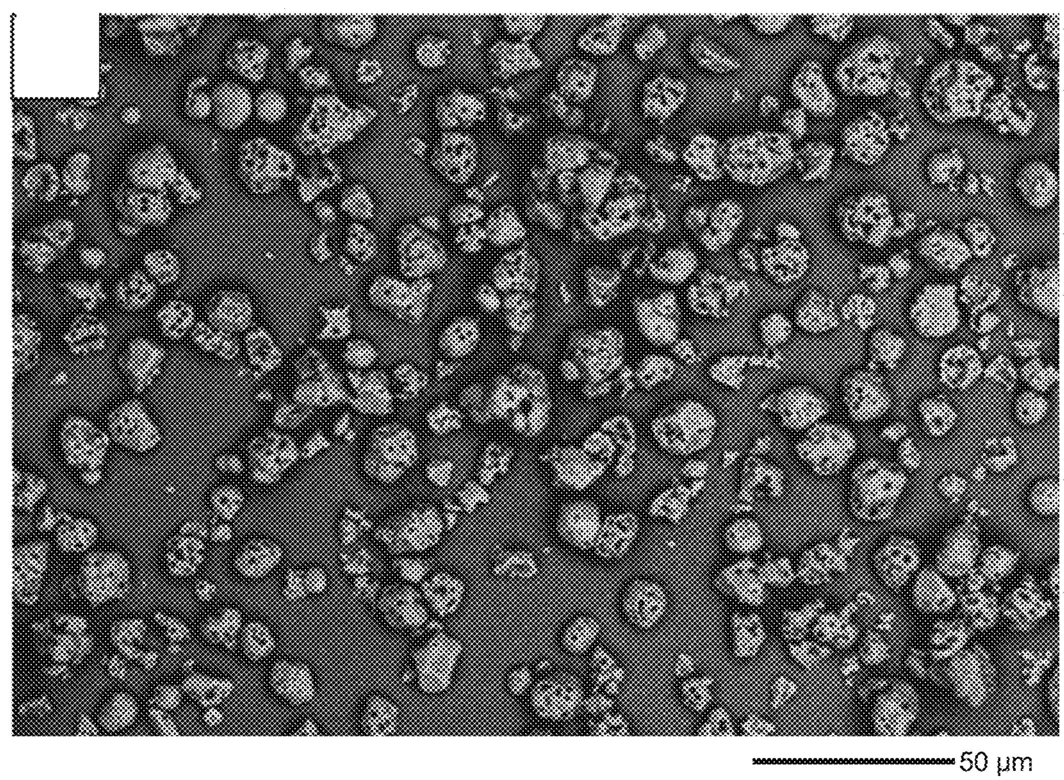
Figure 4:
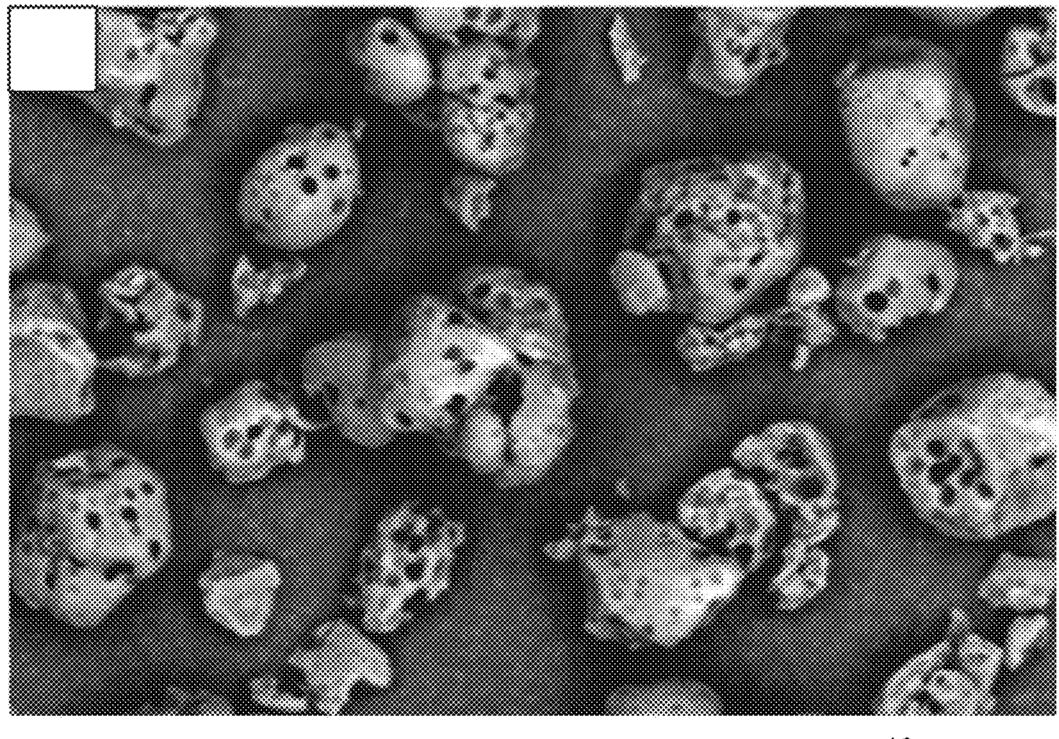

The morphology of the granular starch before and after the crosslinking and enzyme treatment was studied using SEM. FIG. 2 displays the granular starch feed material, clearly displaying a lack of visible porosity (1500× magnification). FIG. 3 displays the inhibited granular starch (i.e., after Step 1 as described above) under 500× magnification (top image) and 1500× magnification (bottom image). Notably, the sample lacks of visible pores at this stage. FIG. 4 displays the inhibited porous starch product of Step 2 under 500× magnification (top image) and 1500× magnification (bottom image). Here, substantial porous are observed in the starch granules, although the granules maintain a similar overall shape and size distribution to the starting material and intermediate inhibited granular starch.

The sedimentation volume (SV) and percent solubles for the inhibited granular starch and inhibited porous granular starch were measured and results given in the table below:

| Sample | SV (mL/g) | Percent Solubles (%) | Degree of Hydrolysis (%) |
|---|---|---|---|
| Inhibited granular starch | 27.5 | 3.9 | 0.2 |
| Inhibited porous granular starch | 44.0 | 8.4 | 54.2 |

It can be clearly observed that the sedimentation volume increased from 27.5 mL/g to 44.0 mL/g after enzyme treatment, an increase of 60%.

Figure 5:
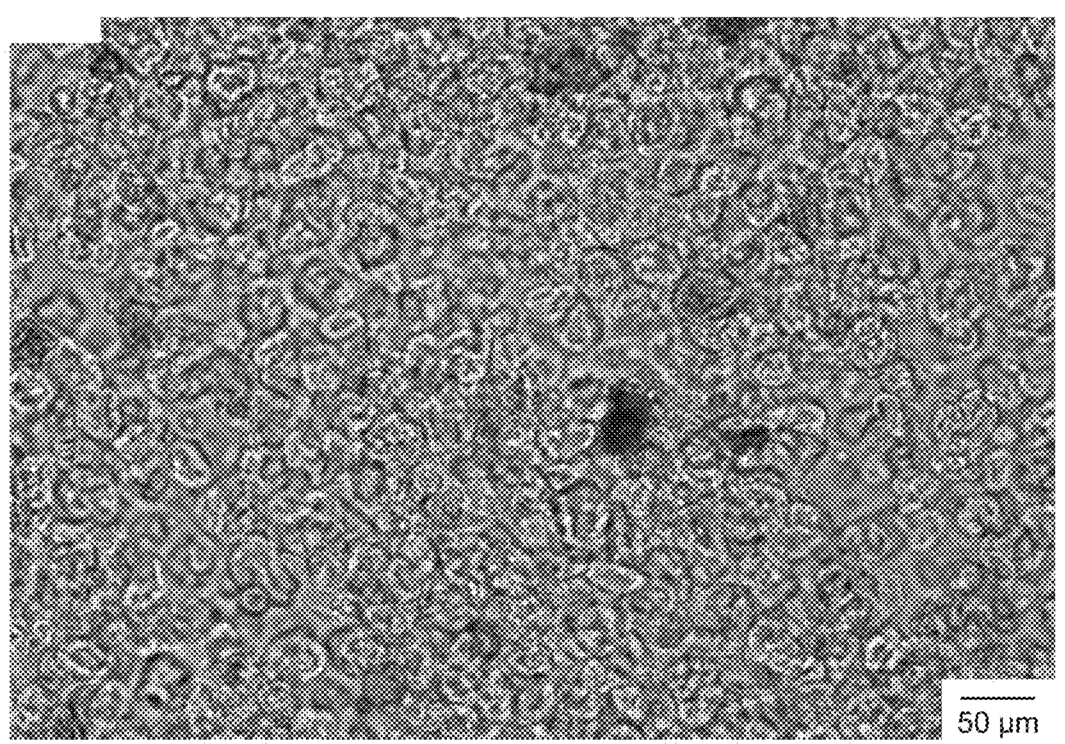
FIG. 5 is two optical micrographs of starches according to embodiments of the disclosure.
Figure 5:
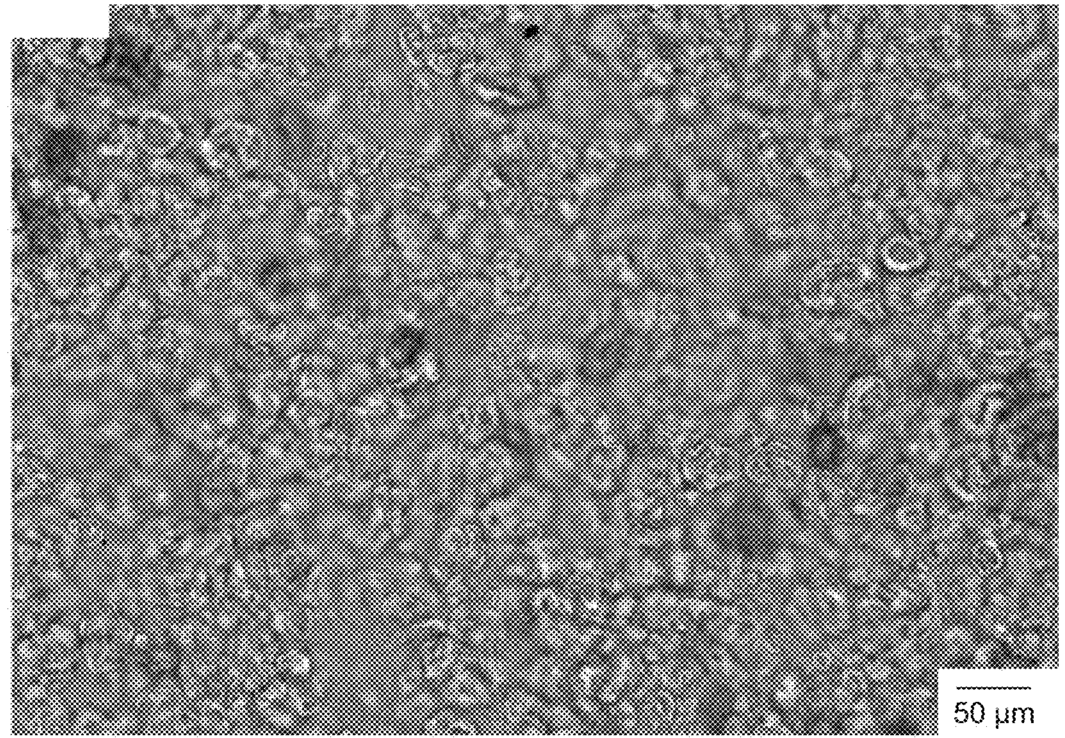

To analyze the thermal stability of the inhibited granular starch and inhibited porous granular starch, the starches were cooked and then examined by optical microscopy. Cooking was performed in a 95° C. water bath with manual stirring by a glass rod for 6 min, followed by 20 min unstirred. FIG. 5 displays the resulting micrographs of the inhibited granular starch (top image) and the inhibited porous granular starch (bottom image), each at 200× magnification. The starches advantageously retain their granularity upon cooking, even after enzymatic hydrolysis.

Figure 6:
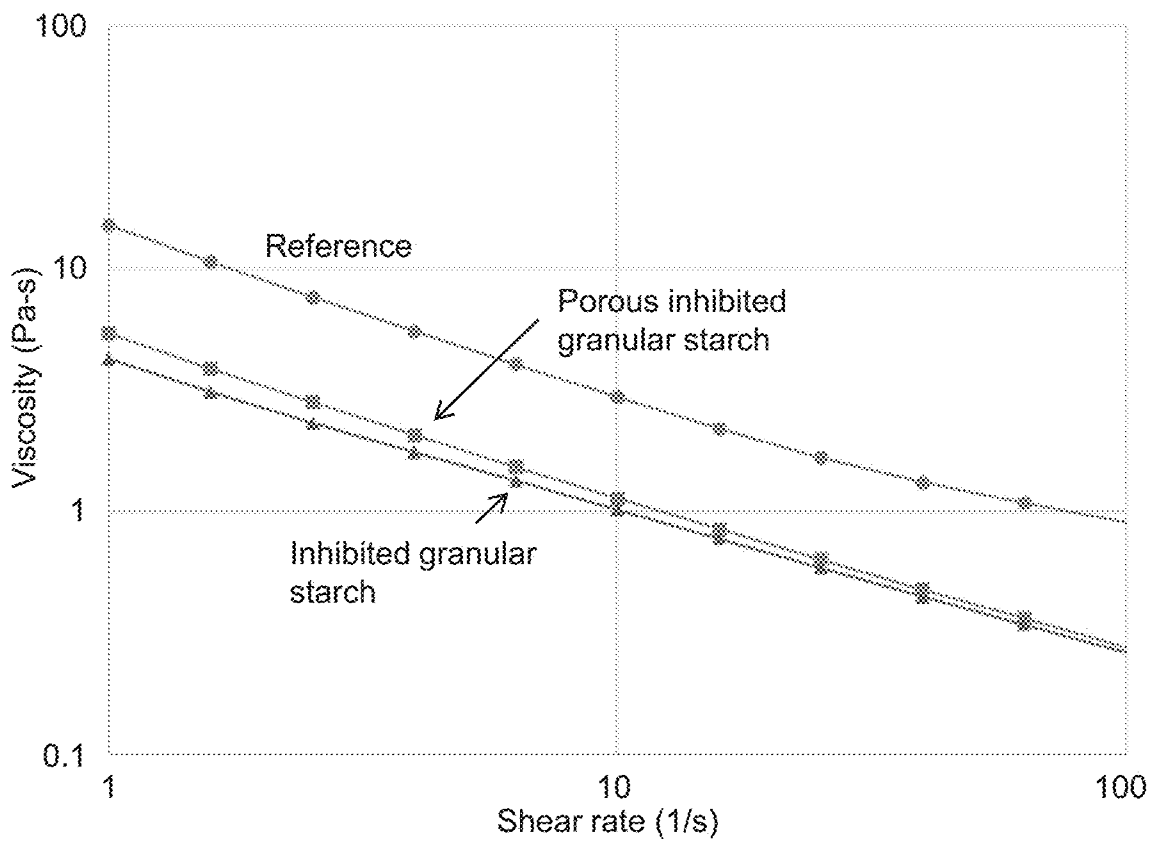
FIG. 6-8 are graphs with several viscosity profiles at various concentrations according to embodiments of the disclosure.
Figure 7:
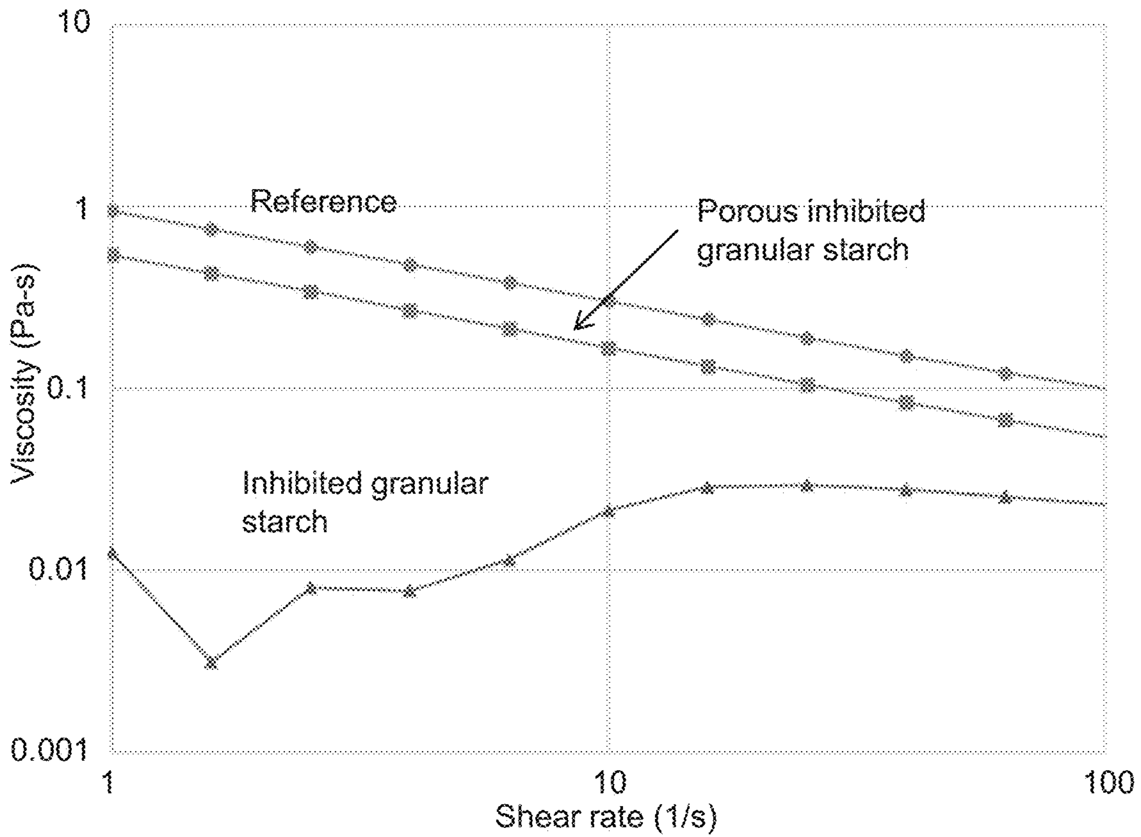
Figure 8:
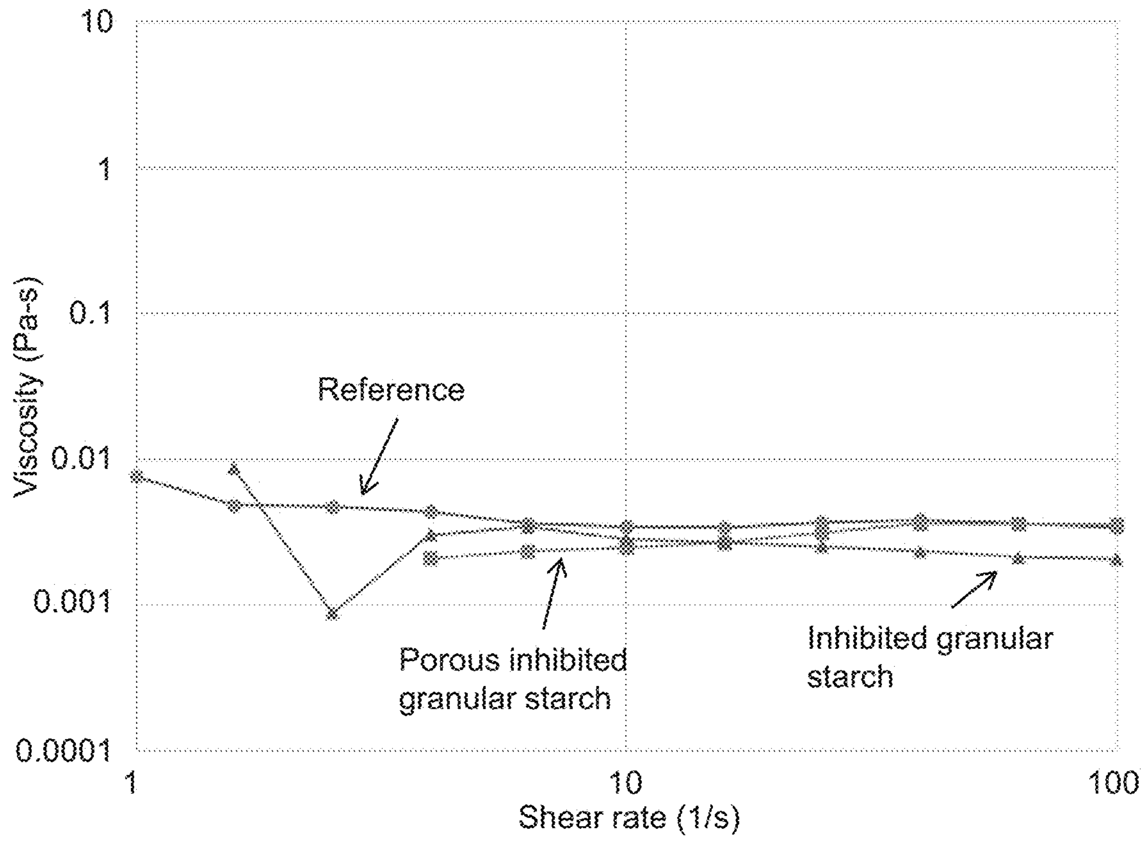

The viscosity profiles of each sample and a reference thickening maize starch sample were measured at concentrations of 4.0% ds, 2.5% ds, and 1.0% ds with shear rates of $10^0$ to $10^2$ $s^{-1}$. FIGS. 6, 7, and 8 display the flow sweeps at 4.0% ds, 2.5% ds, and 1.0% ds, respectively. The inhibited porous granular starch displays higher viscosities than the inhibited granular starch at nearly at all shear rates measured at 4% and 2.5% ds, with the effect especially pronounced at 2.5% ds.

Example 2—Alternative Synthesis of an Inhibited Porous Granular Starch

A round-bottom flask was charged with 1000 g dry-solids (1131.2 gas-is) native waxy maize starch and 1993.8 g reverse-osmosis water with stirring to achieve a uniform suspension of 32% dry solids. The pH was adjusted to 4.5 with a 4% aqueous solution of HCl and the temperature equilibrated to 50° C. To this suspension, 0.008 mL of glucoamylase (AMG 300L) per gram dry solids starch was added. 30 mL aliquots were taken at 0 h (before enzyme addition) as well as 3 h, 6 h, 8 h, 21 h, and 24 h after enzyme addition. The aliquots were filtered without washing and the sugar contents of the filtrates measured using a digital refractometer (ATAGO™, Pocket PAL-1, Japan). After 24 h, the pH of the remaining slurry was adjusted to 7.0 using a 5% aqueous solution of NaOH. The neutralized slurry was filtered and washed with twice an amount of tap water as dry solids (ds) of starch. The remaining wet cake was crumbled on a piece of paper, let dry at 50° C. overnight and subsequently ground in a mill with a hammer grinding head at 6000 rpm and mm screen outlet. The product was inhibited via heat treatment at acidic pH at 150° C. for 0.5 h, 1 h, 2 h, and 3 h.

The dextrose concentration (as converted from Brix) and degree of hydrolysis was measured for each aliquot taken from the hydrolysis reaction as described above. The results are given in the following table:

| Reaction Time (h) | Brix (%) | Conversion (%) |
|---|---|---|
| 0.00 | 0.2 | 0.6 |
| 3.00 | 9.2 | 25.6 |
| 6.00 | 12.9 | 35.8 |
| 8.50 | 14.6 | 40.6 |
| 19.50 | 19.9 | 55.3 |
| 23.66 | 20.6 | 57.2 |
| 27.00 | 20.7 | 57.5 |

Figure 9:
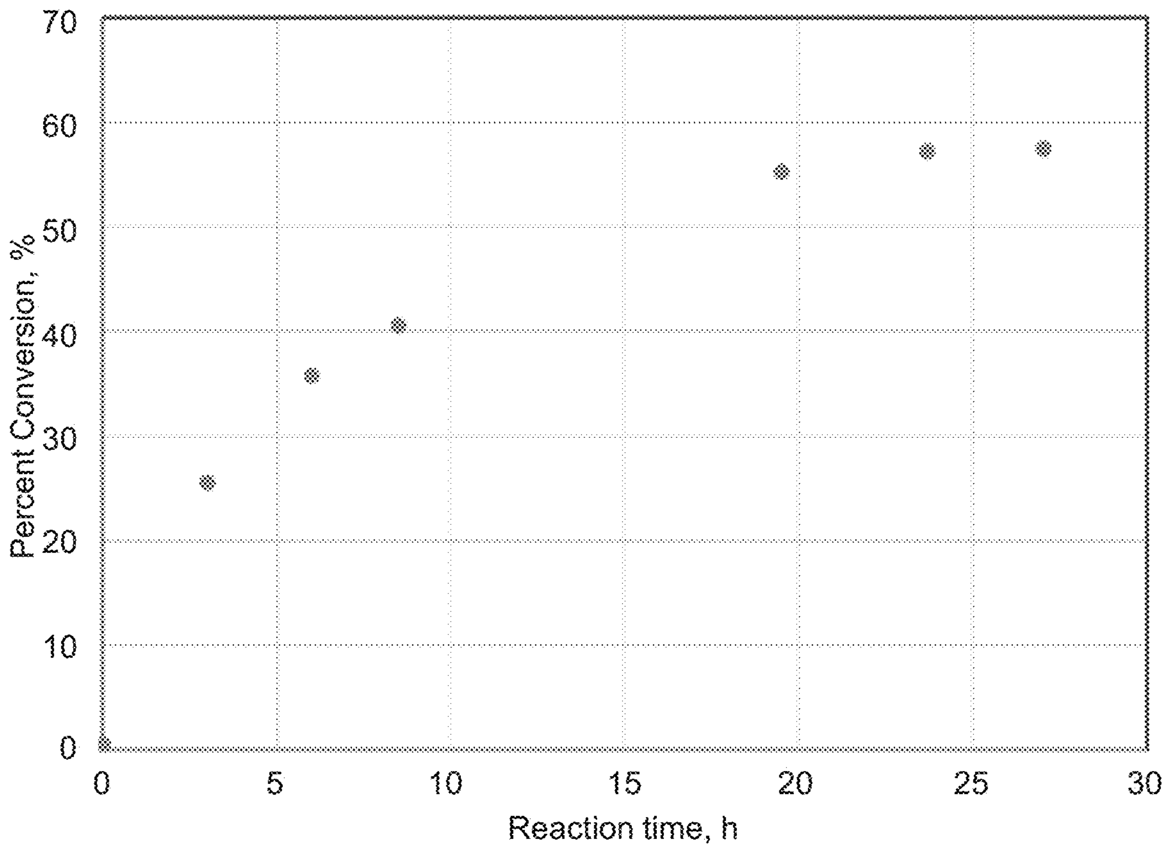
FIG. 9 is a graph showing the relationship between hydrolysis reaction time and degree of conversion according to an embodiment of the disclosure.

The above data are also plotted in FIG. 9. The enzymatic hydrolysis resulted in a conversion % (degree of hydrolysis) of 57.2% after 23.66 hours, and the reaction stopped at 27 hours at a final conversion of 57.5%.

Figure 10:
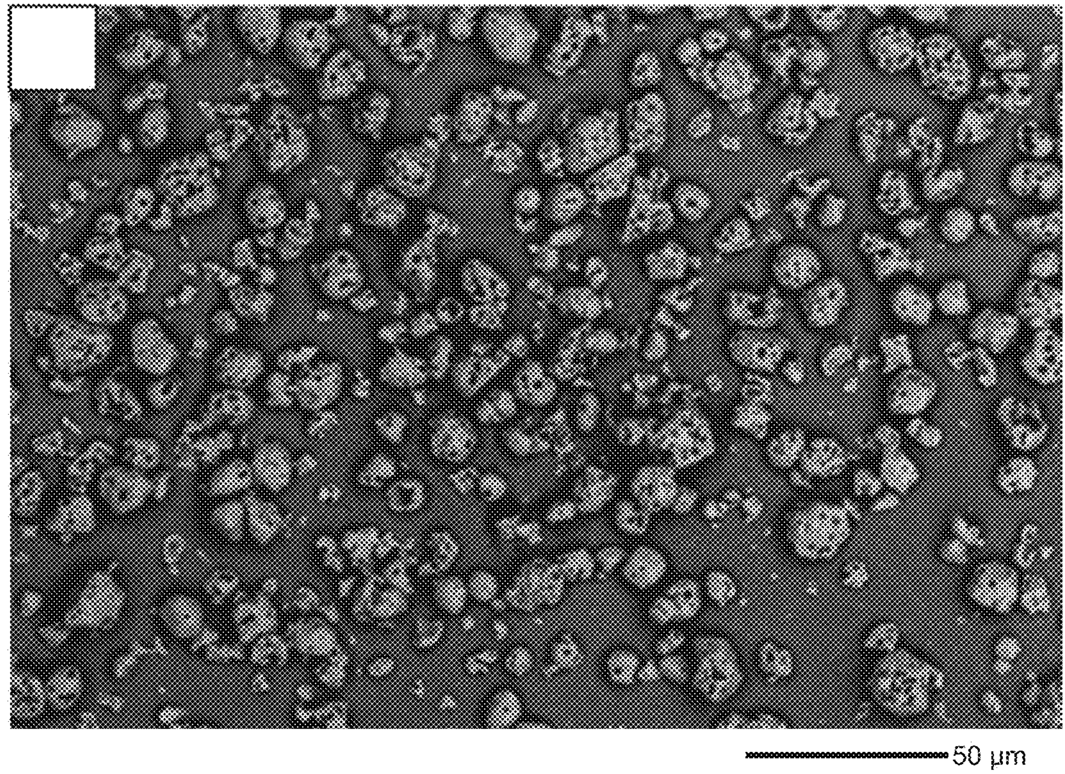
FIG. 10-14 are SEM images of granular starches according to embodiments of the disclosure.
Figure 10:
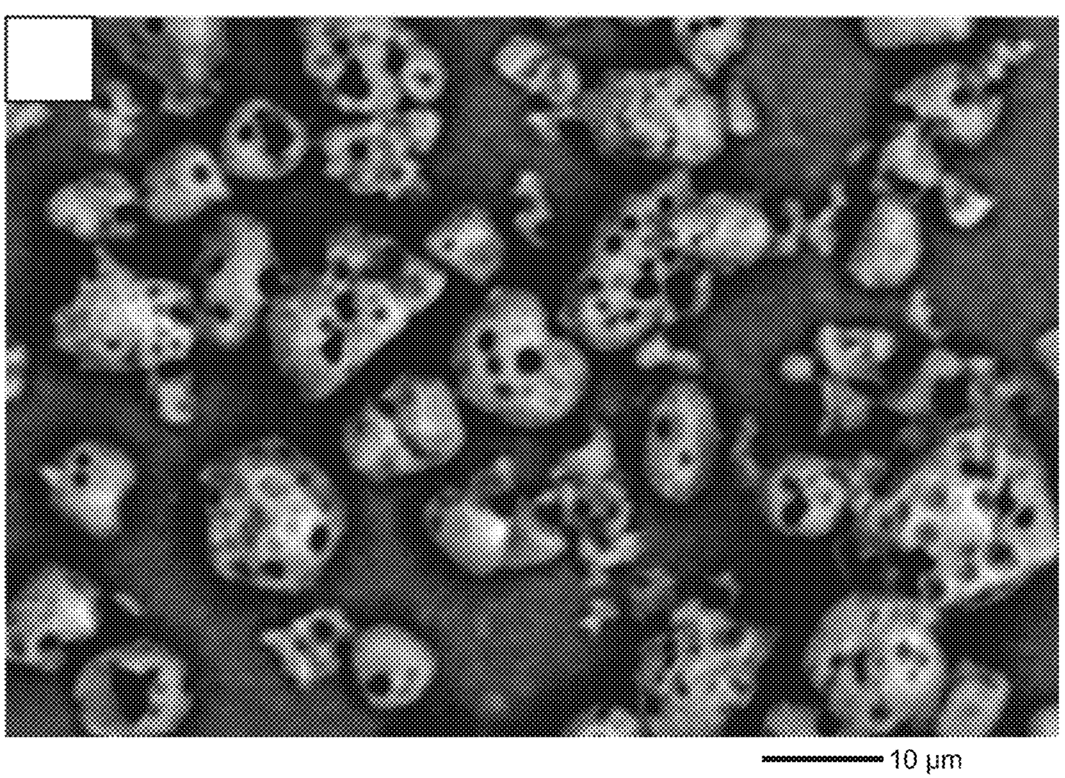
Figure 11:
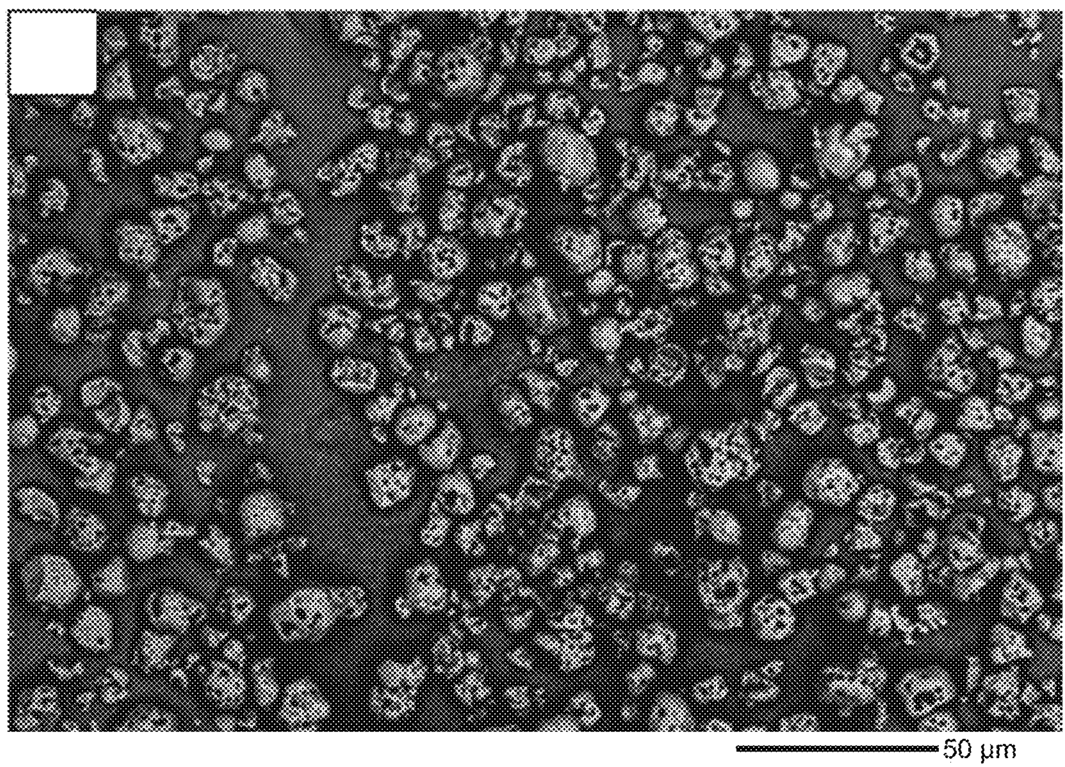
Figure 11:
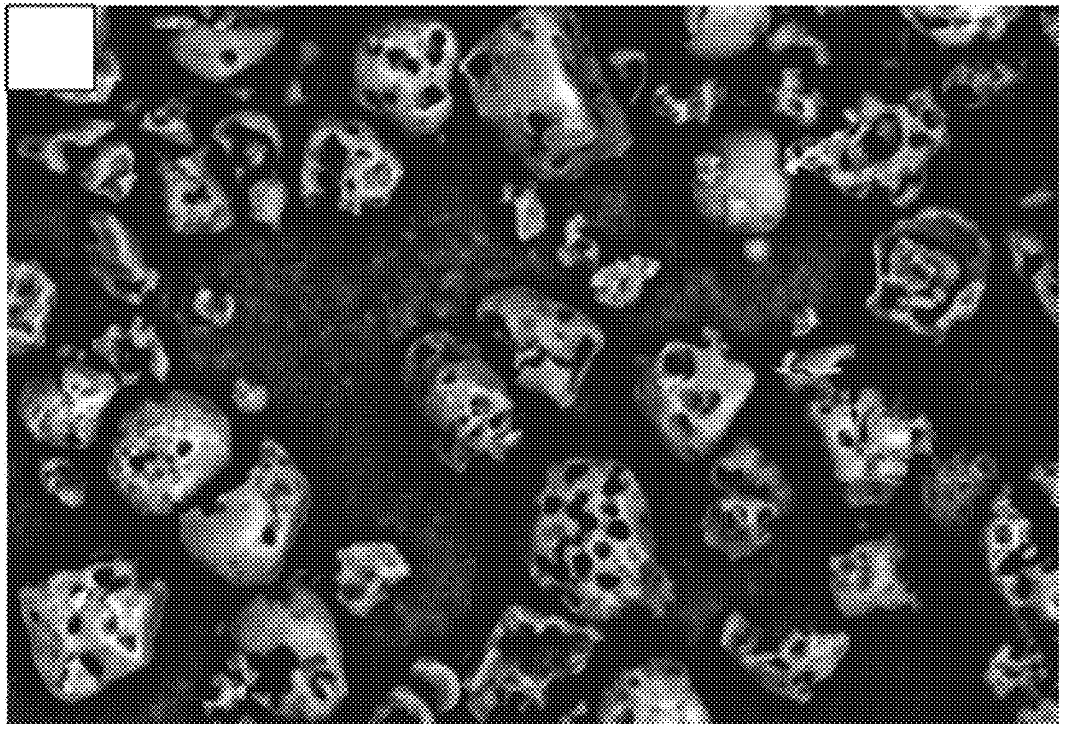
Figure 12:
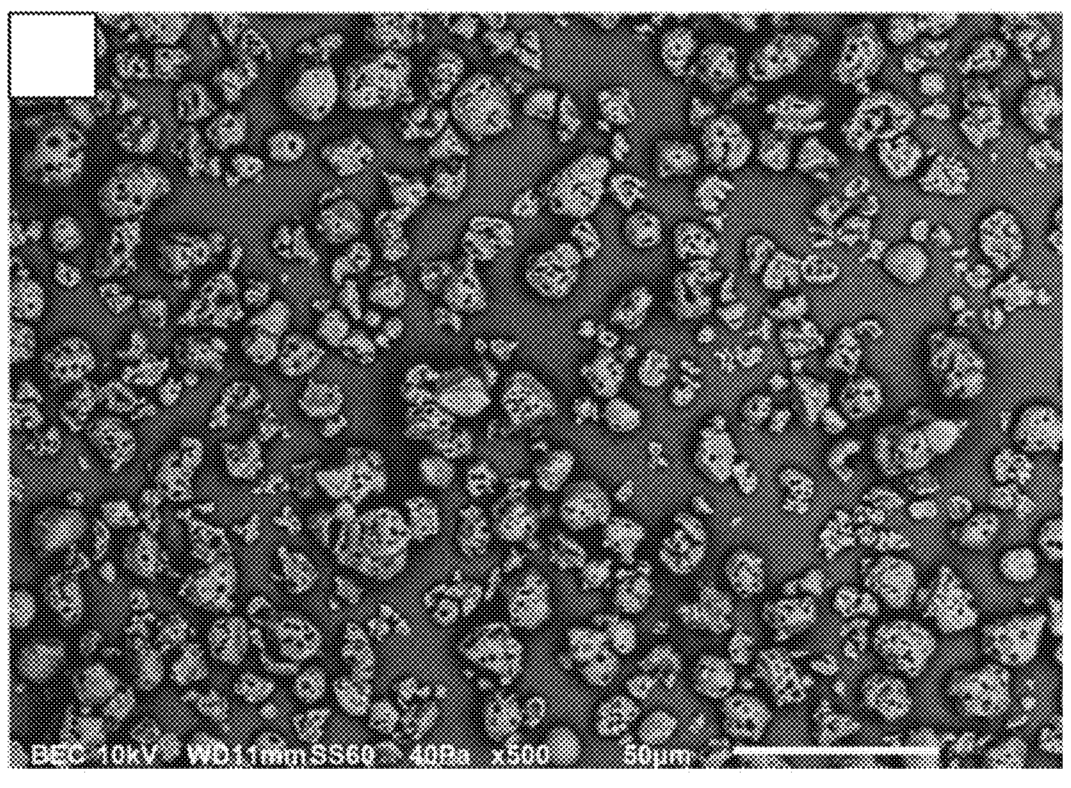
Figure 12:
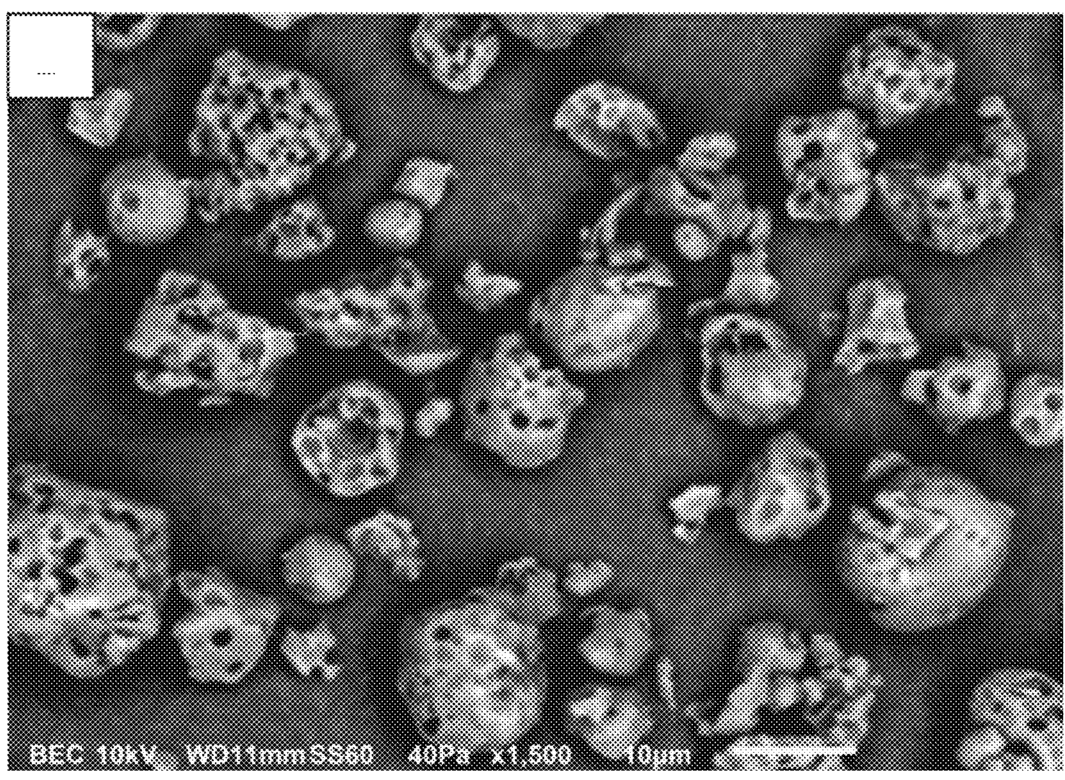
Figure 13:
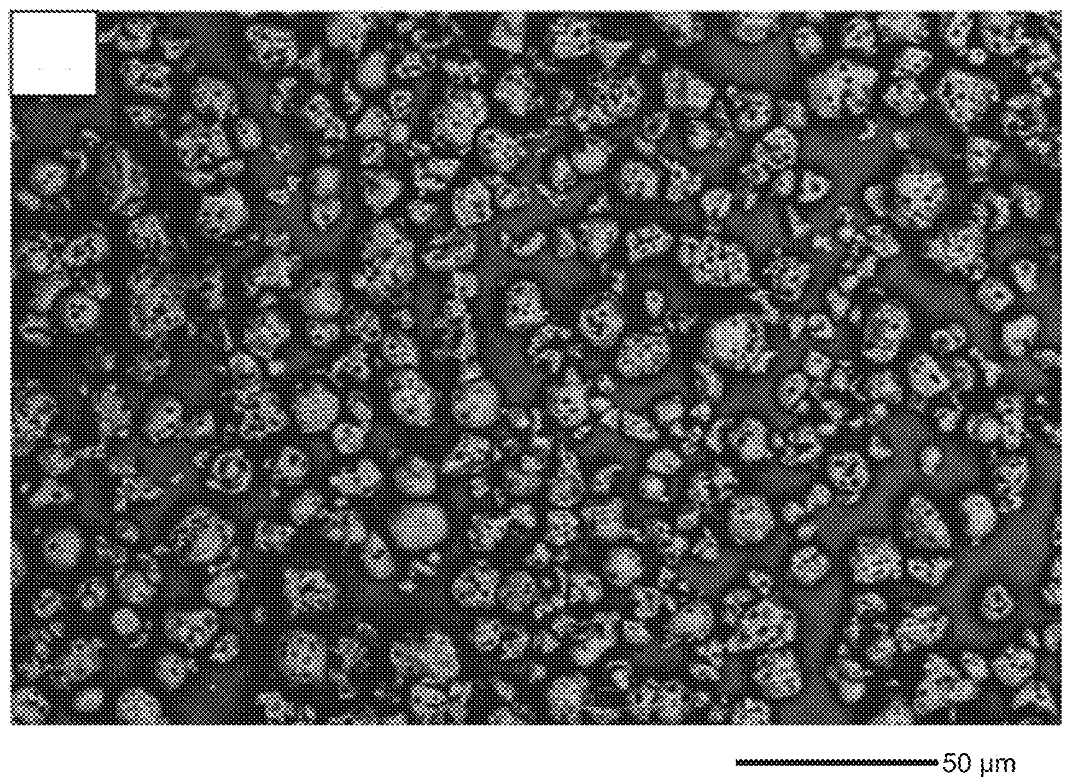
Figure 13:
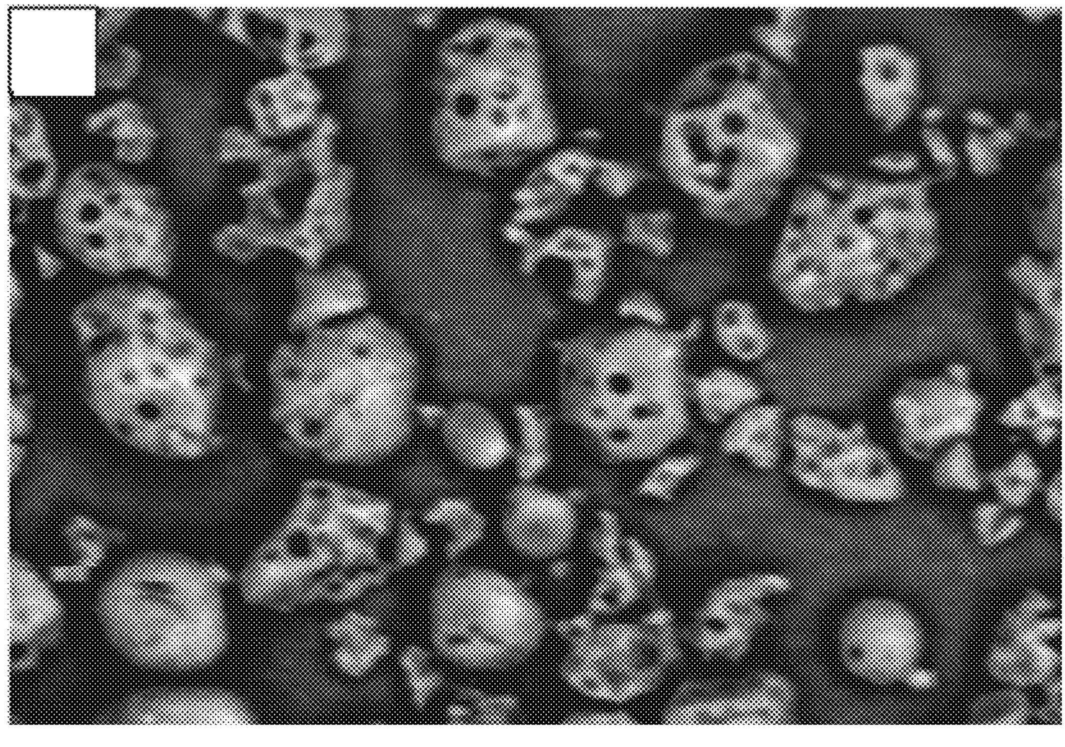
Figure 14:
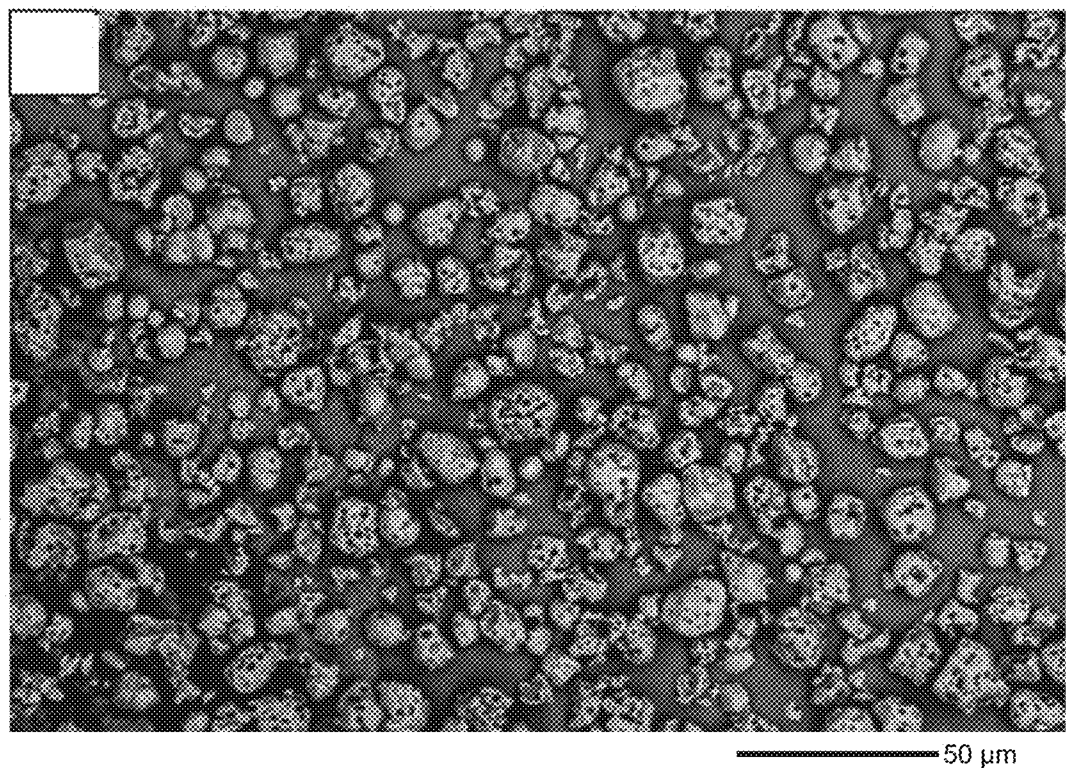
Figure 14:
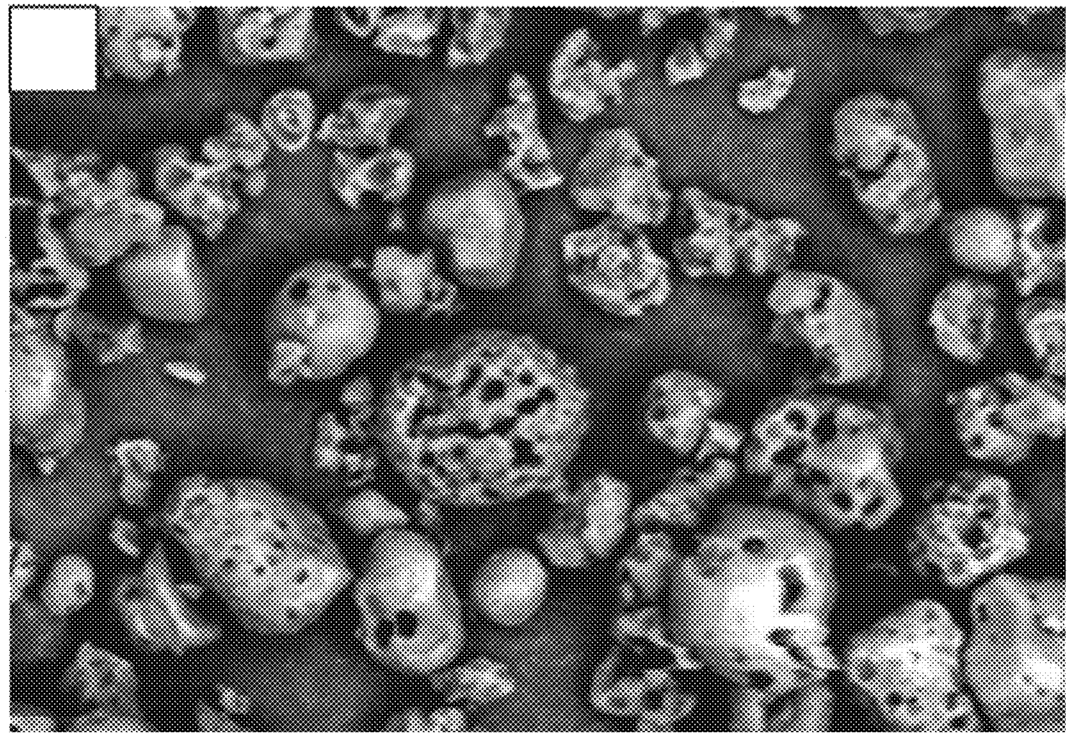

The granular starches were examined by SEM. The granular starch feed was the same as in Example 1, and can be seen in FIG. 2 as described above. FIG. 10 shows the porous granular starch at magnifications of 500× (top image) and 1500× (bottom image). FIG. 11 shows the inhibited porous granular starch after 0.5 h of heat treatment at magnifications of 500× (top image) and 1500× (bottom image). FIG. 12 shows the inhibited porous granular starch after 1 h of heat treatment at magnifications of 500× (top image) and 1500× (bottom image). FIG. 13 shows the inhibited porous granular starch after 2 h of heat treatment at magnifications of 500× (top image) and 1500× (bottom image). FIG. 14 shows the inhibited porous granular starch after 3 h of heat treatment at magnifications of 500× (top image) and 1500× (bottom image). All of the porous starches, inhibited or uninhibited, display clearly visible pores. Further, inhibition and heat treatment does not appear to visually affect the granule shape, size distribution, or appearance of the pores.

The sedimentation volume and percent solubles were measured for each of the inhibited porous granular starches after various heat treatment times. The table below summarizes the results:

| Sample | SV (mL/g) | Percent Solubles | Degree of Hydrolysis (%) |
|---|---|---|---|
| Inhibited porous granular starch - 0.5 h heat treatment | 68.0 | 23.1 | 57 |

-continued

| Sample | SV (mL/g) | Percent Solubles | Degree of Hydrolysis (%) |
|---|---|---|---|
| Inhibited porous granular starch - 1 h heat treatment | 47.0 | 19.7 | 57 |
| Inhibited porous granular starch - 2 h heat treatment | 34.0 | 17.5 | 57 |
| Inhibited porous granular starch - 3 h heat treatment | 30.0 | 17.6 | 57 |

Here, it is shown that the sedimentation volume is inversely related to heat treatment time, with the 0.5 h sample exhibiting a sedimentation volume of 68.0 mL/g. The degree of hydrolysis was unaffected by heat treatment.

Figure 15:
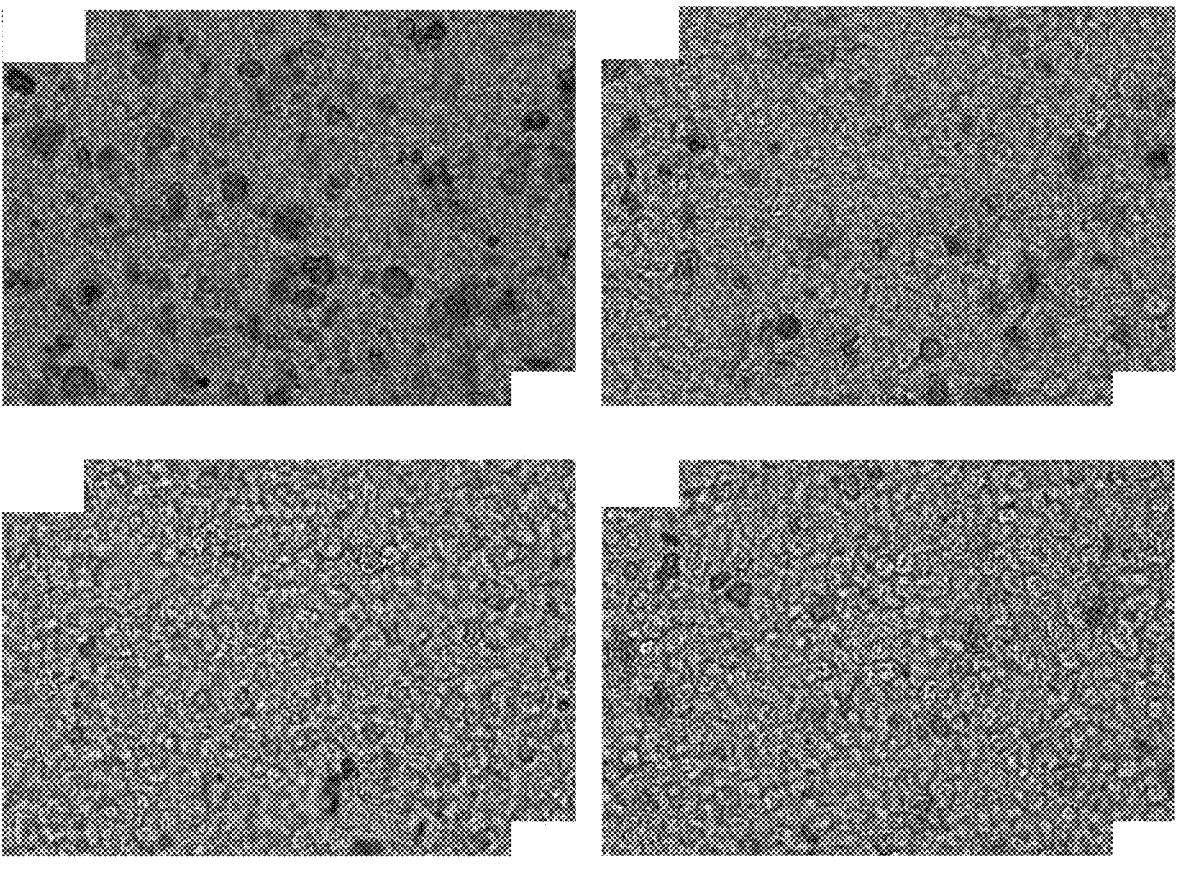
FIG. 15 is two optical micrographs of starches according to embodiments of the disclosure.

To analyze the thermal stability of the inhibited granular starch and inhibited porous granular starch, the starches were first cooked and then examined by optical microscopy. Cooking was performed in the 95° C. water bath with manual stirring by a glass rod for 6 min, followed by 20 min unstirred. FIG. 15 displays the resulting micrographs of the inhibited porous granular starch a 0.5 h heat treatment (top left image), 1 h heat treatment (top right image), 2 h heat treatment (bottom left image), and 3 h heat treatment (bottom right image), each at 200× magnification. The starches advantageously retain their granularity upon cooking, even after enzymatic hydrolysis.

Figure 16:
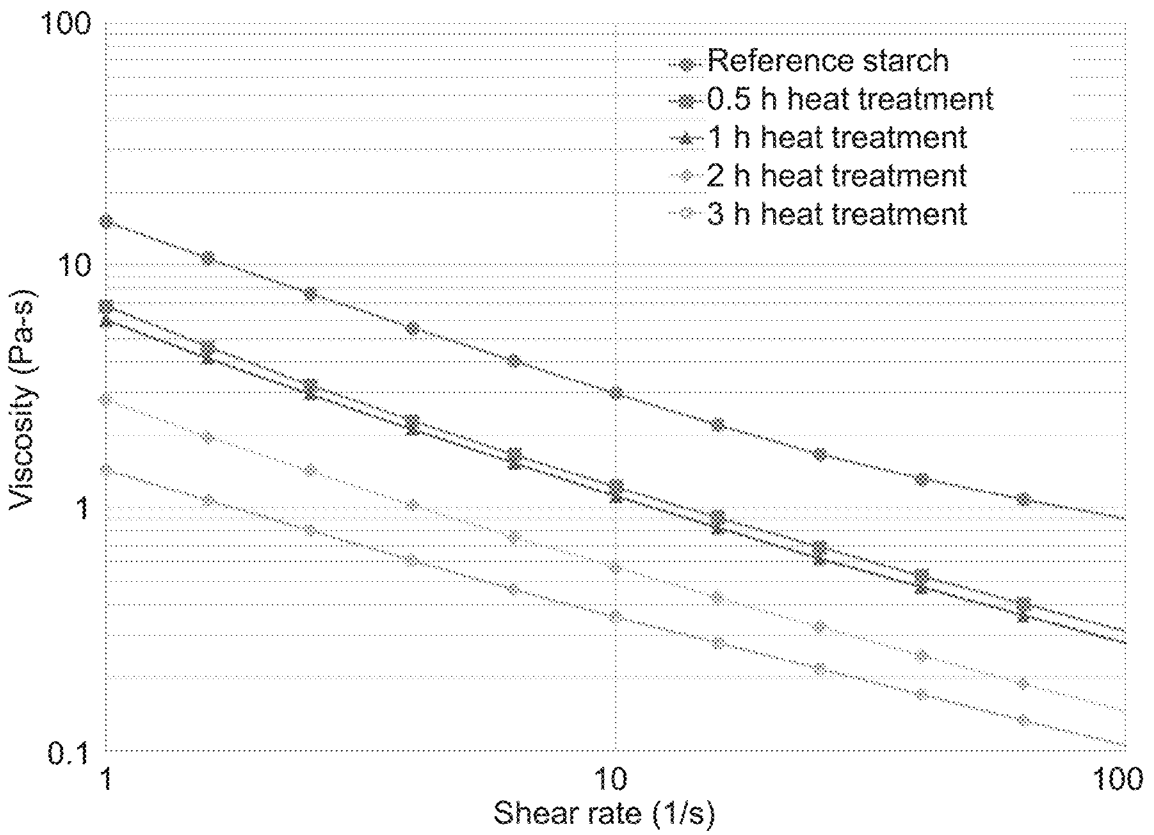
FIG. 16-18 are graphs with several viscosity profiles at various concentrations according to embodiments of the disclosure.
Figure 17:
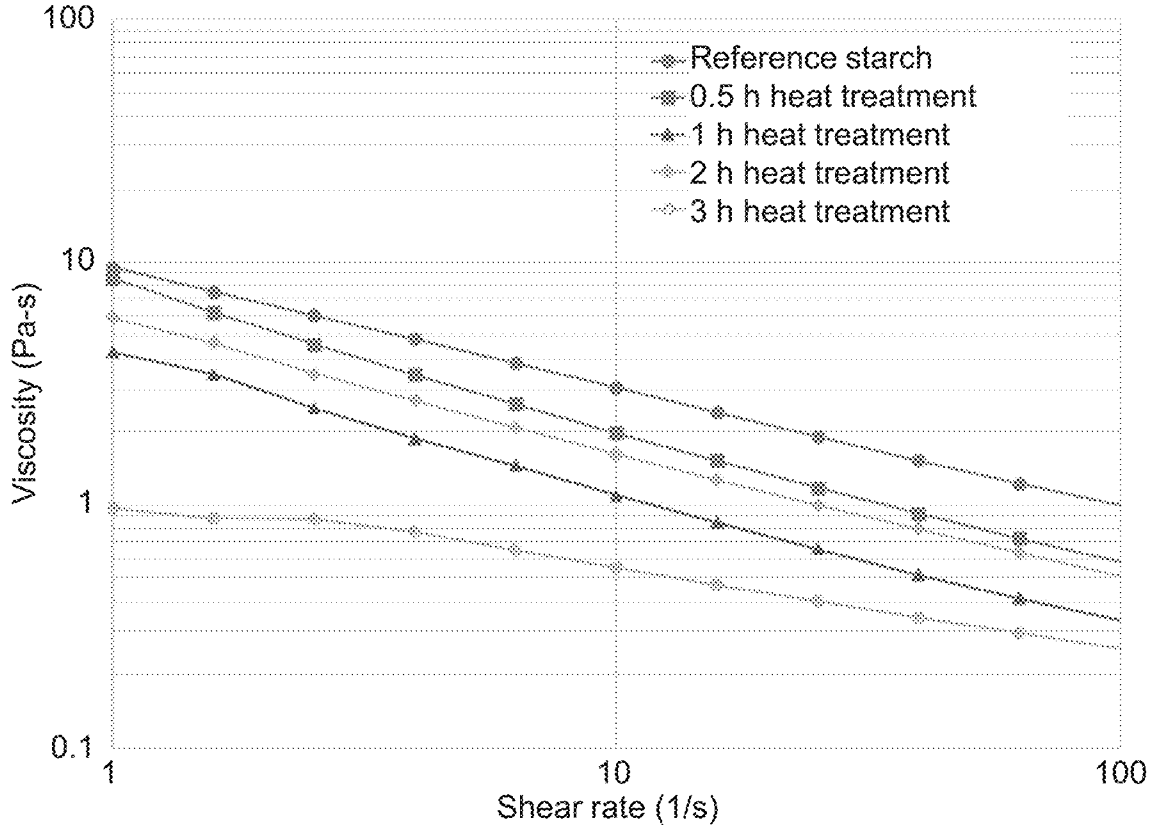
Figure 18:
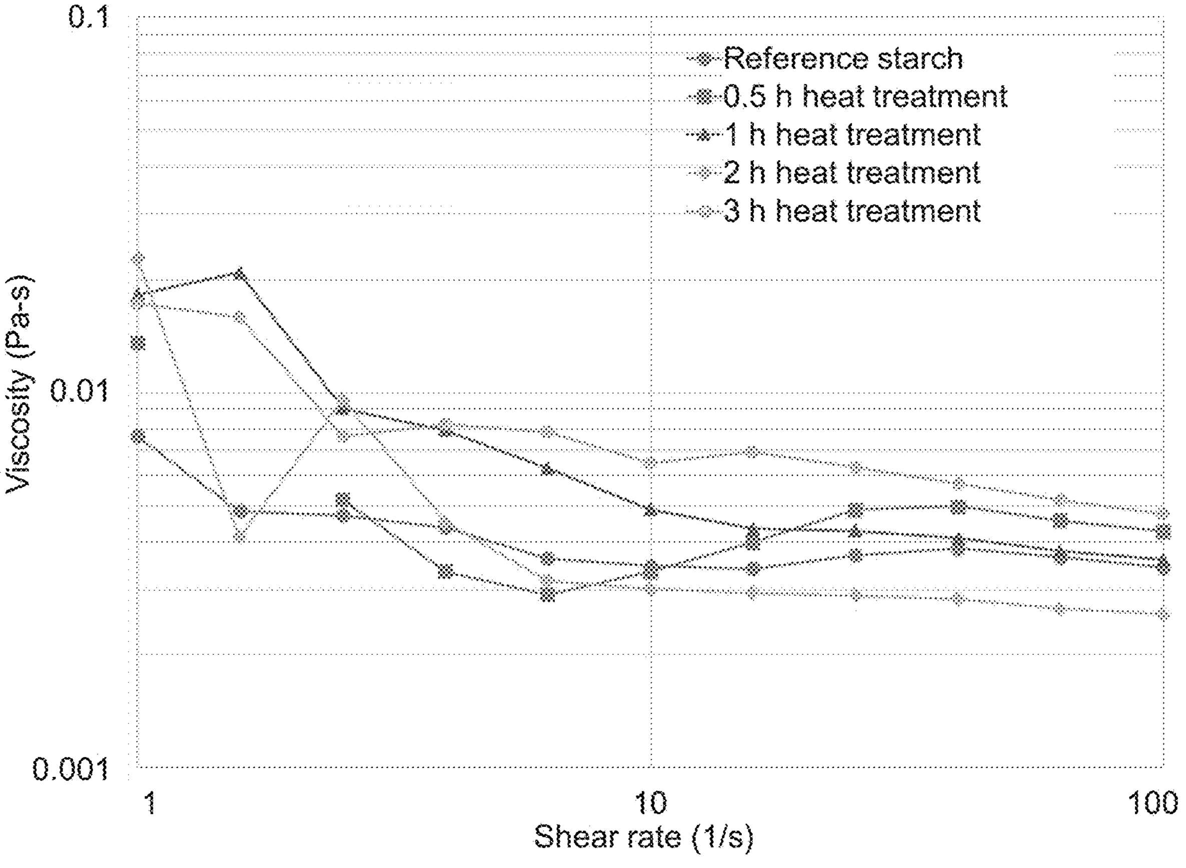

The viscosity profiles of each sample and a maize reference starch were measured at concentrations of 4.0% ds, 2.5% ds, and 1.0% ds with shear rates of $10^0$ to $10^2$ $s^{-1}$. FIGS. 16, 17, and 18 display the flow sweeps at 4.0% ds, 2.5% ds, and 1.0% ds, respectively. At loadings of 4.0% ds and 2.5% ds, the sample heat treated for just 0.5 h displays the highest viscosity at all shear rates, with only the reference starch being higher. At the lower loading of 1.0% ds, the trend is complex, with the 0.5 h sample exhibiting higher viscosity at high shear rates and lower viscosity at low shear rates. At the 1.0% ds loading level, the 1 h heat treated starch generally displays higher viscosity.

Example 3: Enzymatic Hydrolysis of an Inhibited Starch

To a 600 mL metal beaker was added 100 g of 100 mM citrate buffer at pH 4.5 and a further 100 g deionized water. 100 g (as-is) of a clean-label inhibited starch was added to the beaker and stirred to form a suspension. The beaker was placed in a water bath at 50° C. and stirred at 50 rpm for 20 min, after which no starch precipitate was observed on the bottom of the beaker. Higher stirring speeds were avoided to prevent enzyme denaturation. To this suspension was added 1.24 mL glucoamylase (141.9 mg protein/mL). After 7 h or 24 h, the reaction was quenched by adjusting the pH to 9.0 with a 1.0% NaOH solution and stirring for an additional 30 min, after which the pH was adjusted to 7.0 with HCl and the suspension filtered. A portion (30 mL) of the filtrate was heated at 95° C. for 10 min, and then the glucose concentrations of the unheated and heated filtrate portions were measured.

Figure 19:
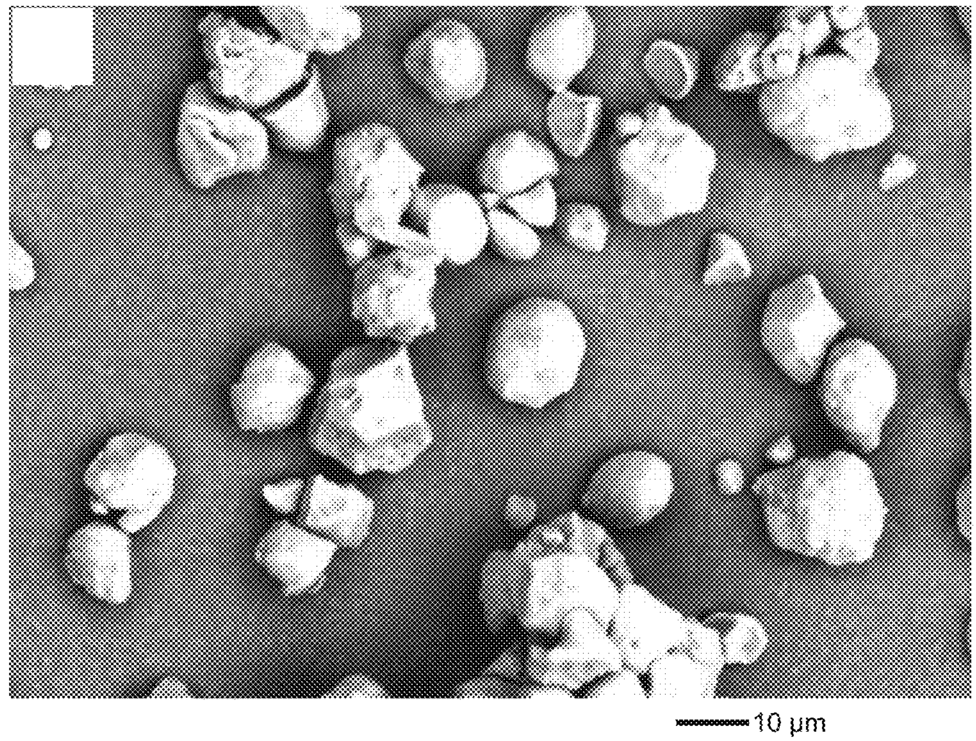
FIG. 19 is two SEM images of granular starches according to embodiments of the disclosure.
Figure 19:
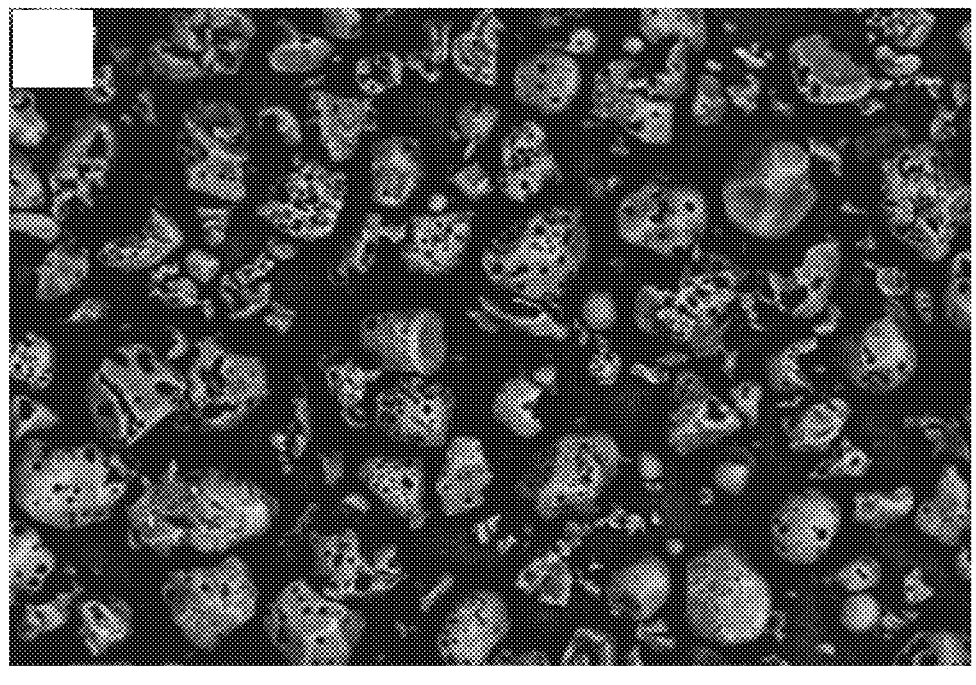

The inhibited granular starch starting material and 24 h reaction time porous granular starch were imaged using SEM. FIG. 19 shows that the inhibited starch starting material (top image) has no visible porosity while the inhibited porous granular starch (bottom image) shows obvious pores with a retention in general starch granule shape and size distribution. Each is shown at a magnification of 1000×.

Figure 20:
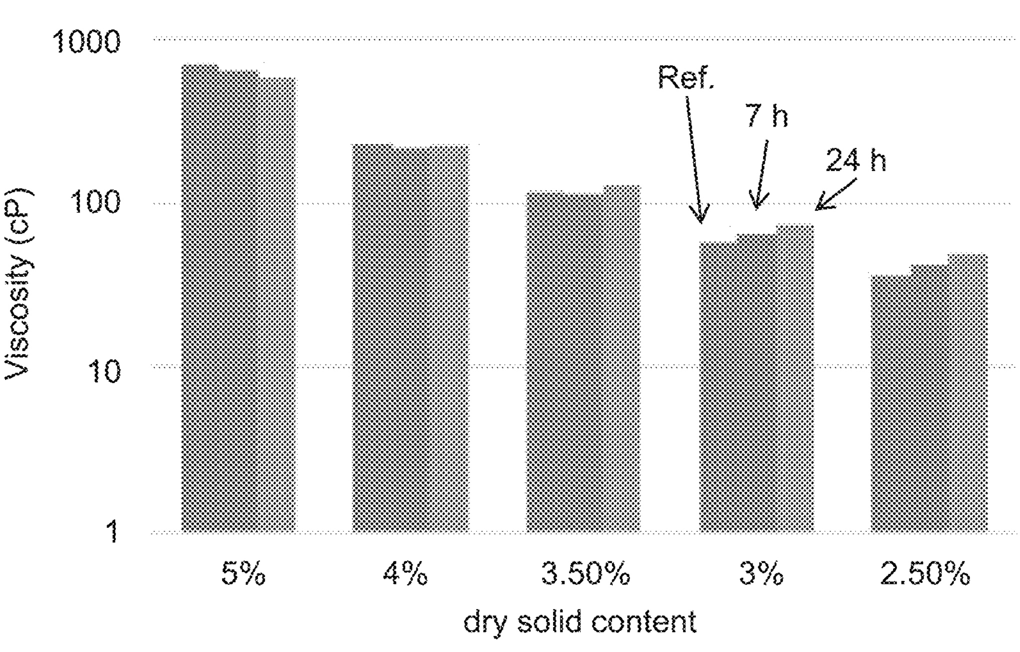
FIG. 20 is a graph with the viscosity profiles at various concentrations according to embodiments of the disclosure.

The degree of hydrolysis was measured for the 7 h and 24 h samples, yielding values of 24% and 34%, respectively. The sedimentation volume of each was determined to be 30 mL/g and 34 mL/g, higher than the 27 mL/g found for the inhibited starch starting material. The viscosity of each sample was measured on a Rapid Visco Analyzer at concentrations of 5% ds, 4% ds, 3.5% ds, 3% ds and 2.5% ds. The results are shown in FIG. 20 and also in the table below. In general, the viscosity of the inhibited porous granular starches is lower than the inhibited starch starting material at the higher solids content of 4%-5%, but is higher than the starting material at lower solids contents below 3.5%.

RVA viscosity (cP) at various ds

| | SV (ml/g) | 5% | 4% | 3.50% | 3% | 2.50% |
|---|---|---|---|---|---|---|
| Starting Material | 27 | 702 | 232 | 116 | 58 | 36 |
| 7 h | 30 | 634 | 214 | 115 | 65 | 42 |
| 24 h | 34 | 584 | 221 | 128 | 74 | 50 |

Figure 21:
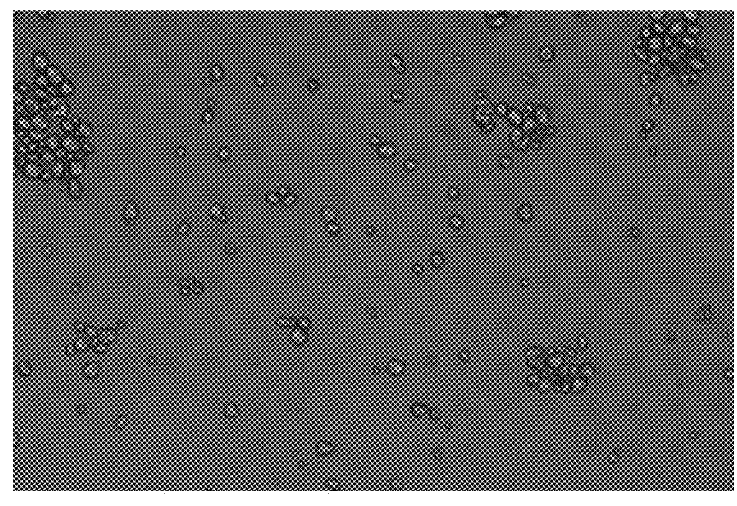
FIG. 21 is three optical micrographs of starches according to embodiments of the disclosure.
Figure 21:
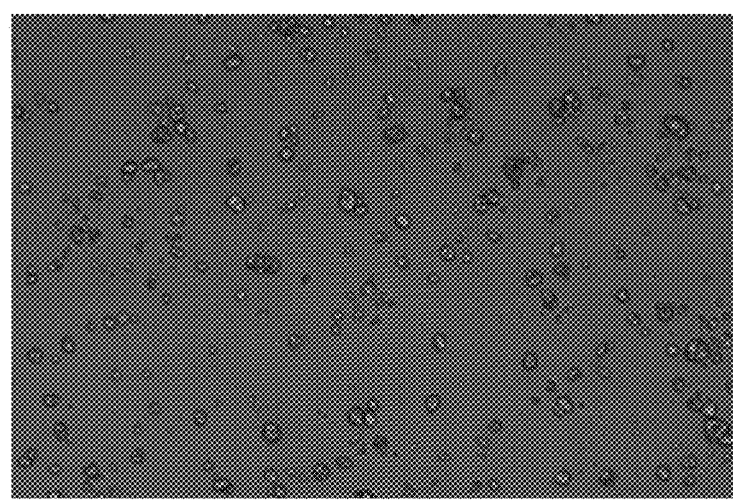
Figure 21:
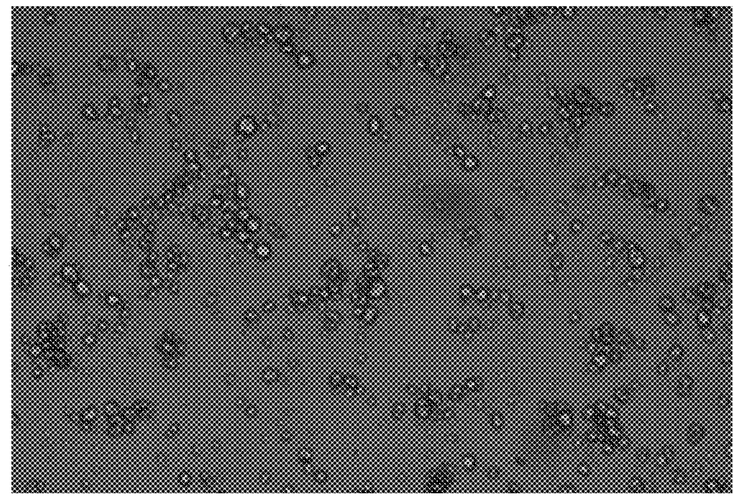

Polarized optical microscopy was used to evaluate the degree of crystallinity retained after the hydrolysis process. FIG. 21 shows the starting material (top image), the 7 h sample (center image), and the 24 h sample (bottom image), each at 200×. With increased hydrolysis treatment, there is a concomitant decrease in crystalline structures. However, some crystalline structures are observed in all samples.

Example 4: Investigation of Porosity and Degree of Hydrolysis

Enzymatic hydrolyses of a waxy maize starch (as in Example 1) was performed mM citrate buffer at pH 4.5 was prepared by dissolving 5.77 g of citric acid anhydrous in 1000 g Millipore® water, adjusting the pH to 4.5 with 10% NaOH. The final weight was brought up to 1500 g (1.5 L).

In Reaction 1, 110 g of waxy maize starch (as-is) was added to a 500-mL metal beaker. 200 g 20 mM citrate buffer pH 4.5 was added to the beaker, and stirred with a spatula until uniform suspension was formed (ds=32%). The beaker was placed in a 50° C. water bath equipped with a thermostat and overhead propellers (LAUDA® Proline P50) and stirred at 50 rpm for 20 min. The temperature was checked to be 119° F. after 20 min, and it was confirmed that no starch precipitate formed on the bottom of the beaker under this stirring speed. High speed was avoided to prevent the enzyme denaturation at high shear rate. 1.24 mL glucoamylase (AMG 300L) was added to the reaction. At 3 h, the beaker was removed from the water bath out and placed in ice water and the weight was recorded; the slurry was filtered through a small Buchner funnel, and sugar content was measured by Brix refractometer with detection range of 0-53% (ATAGO™, Pocket PAL-1, Japan). The cake was washed with 400 g Milli-Q® water and crumbled and dried at 50° C. overnight.

Five additional reactions were set up under similar conditions, except that 0.62 mL enzyme was added to each of the reaction instead of 1.24 mL. At 2 h, 12 h, 19 h, 43 h, and 67 h (Reactions 2-6, respectively) one beaker was taken out from the water bath and placed in ice water bath. The slurries were filtered and sugar content in the filtrate was measured on the Brix refractometer. Each cake was washed with 400 g Milli-Q water, crumbled on a piece of brown paper over a pan and dried at 50° C. overnight.

The degree of hydrolysis was measured for each reaction. Furthermore, the porosity was examined through the water holding capacity of the starch. The water holding capacity was determined by suspending 30 g (ds) of starch in 90 g of buffer. The mixture was stirred for 30 min and then filtered through a Buchner funnel unit no more water drops were observed in 5 min. The filtrate was weighed and the water retained in the starch, and the water holding capacity, calculated by:

$$\text{water retained } (g) = \text{slurry weight } (g) - \text{filtrate weight } (g) - \text{starch dry weight}(g)$$

$$\text{water holding capacity} = \text{water retained } (g)/\text{starch dry weight } (g)$$

Further, the water holding capacity of the unhydrolyzed starch was determined to be 1.1 g/g. Thus the porosity increase is calculated relative to that value. A plot of the water holding capacity compared to degree of hydrolysis is displayed in FIG. 34, top graph.

The results are shown in the table below:

| Sample | Degree of Hydrolysis | Water Holding Capacity | Porosity Increase |
|---|---|---|---|
| Reaction 1 | 42.7% | 1.28 g/g | 15.8% |
| Reaction 2 | 30.5% | 1.32 g/g | 19.9% |
| Reaction 3 | 49.0% | 1.40 g/g | 26.9% |
| Reaction 4 | 54.1% | 1.46 g/g | 32.3% |
| Reaction 5 | 58.7% | 1.52 g/g | 37.3% |
| Reaction 6 | 65.0% | 1.59 g/g | 44.5% |

Figure 22:
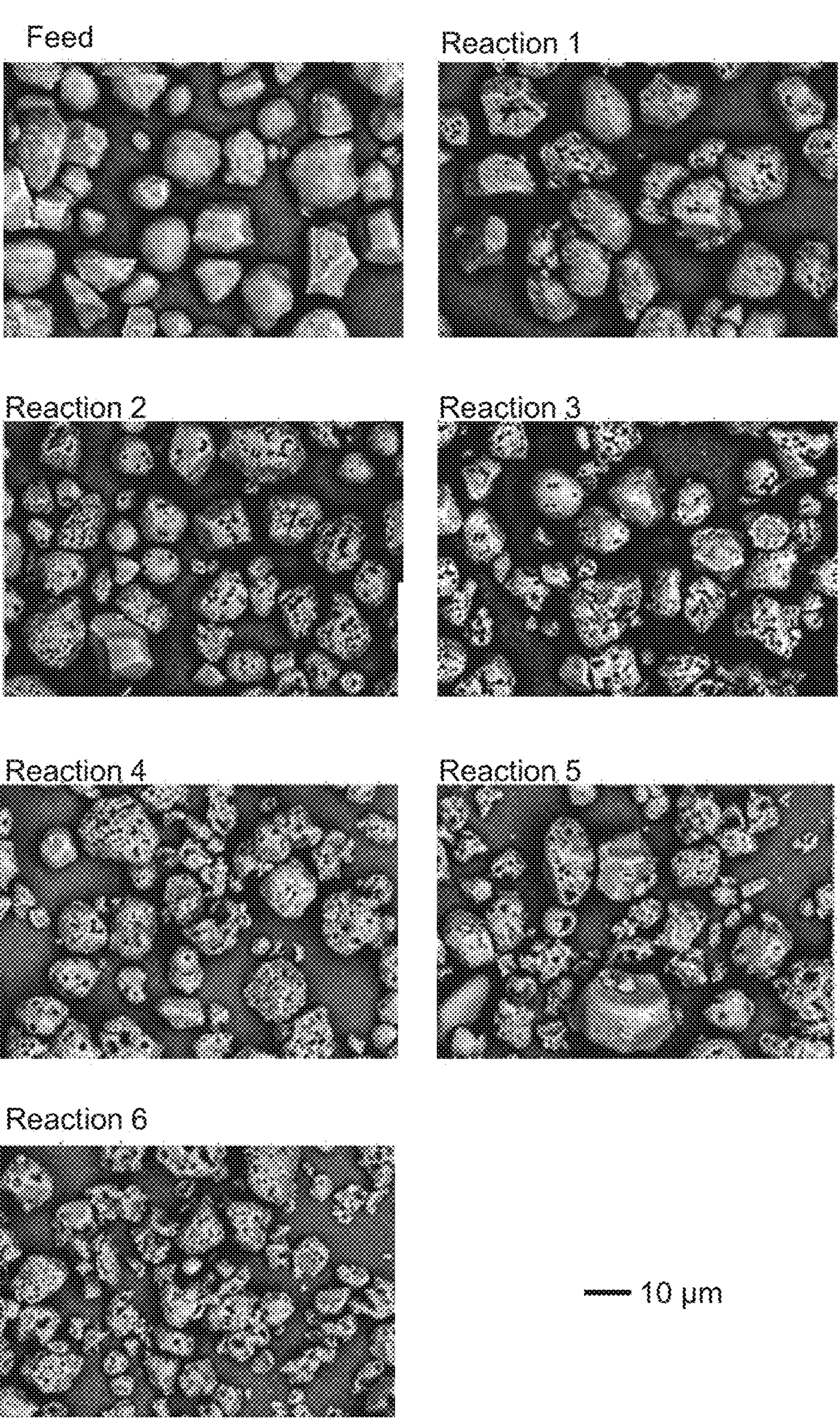
FIG. 22 is a set of SEM micrographs of starches according to embodiments of the disclosure.

SEM micrographs are provided in FIG. 22 for the feed material and the materials of the six reactions (i.e., in uninhibited state). Interestingly, Reaction 1, at double the enzyme concentration, did not exhibit double the reaction rate. This suggests that the reaction is not enzyme limited but rather substrate limited, likely by the availability or accessibility of non-reducing ends.

Clearly, and in accord with SEM measurements in previous Examples, the porosity is found to increase with increasing degree of hydrolysis. Indeed, an increase of over 44% was observed for the sample with the largest degree of hydrolysis. The sedimentation volume is not found to increase with increasing degree of hydrolysis.

Example 5: Enzymatic Hydrolysis of a Chemically-Modified Inhibited Starch

In this example, a phosphate-crosslinked inhibited maize starch was hydrolyzed to provide a porous structure.

Enzymatic hydrolyses were performed as follows: 100 g starch as-is (moisture content 10.57%) was added into each of five 600-mL metal beakers. 200 g of 20 mM citrate buffer at pH 4.5 was added into each beaker. The starch suspension was stirred with a spatula until lump free (ds=29.8%). The beakers were placed in a 50° C. water bath equipped with a thermostat and overhead propellers (LAUDA® Proline P50) and stirred at rpm for 20 min. The temperature was 119° F. after 20 min, and it was confirmed that no starch precipitate formed on the bottom of the beaker under this stirring speed. High speed was avoided to prevent the enzyme denaturation at high shear rate. Enzyme (AMG 300L, DuPont) was added to the five beakers following this order: Reaction 1: 120 μL; Reaction 2: 360 μL; Reaction 3: 1.0 mL; Reaction 4: 2.0 mL; Reaction 5: 3.0 mL. As a control sample, g of slurry was drawn from beaker 1 before adding enzyme, and filtered. The sugar content in the filtrate was measured by Brix refractometer; this value was used as the baseline for calculation of degree of hydrolysis. The Brix value of the buffer was also measured and used to correct the measurement of the sample Brix values by subtraction. At 2 hours of reaction time, 30 mL (33 g) slurry was withdrawn from each reaction into a 50 mL-centrifuge tube and placed immediately on ice. These samples were filtered in a Buchner funnel and the filtrate was saved; sugar content in the filtrate was measured on the Brix refractometer. At 5 h reaction time, another 30 mL sample from each reaction was collected and measured for sugar content. Reaction 5 conversion was already high at this point so it was quenched by raising the pH to 8.5, filtering and washing the filtrate with 300 g Millipore water. At 24 h, another 30 mL sample from each of Reactions 1-4 was collected and measured for sugar content. The remainder of Reactions 1-4 were cooled down to room temperature and pH adjusted to 8.5 with 5% NaOH. Each slurry was filtered and the resulting starch cake was washed with 300 g Milli-Q water. The starch cakes were crumbled and dried in the oven overnight at 50° C.

Figure 23:
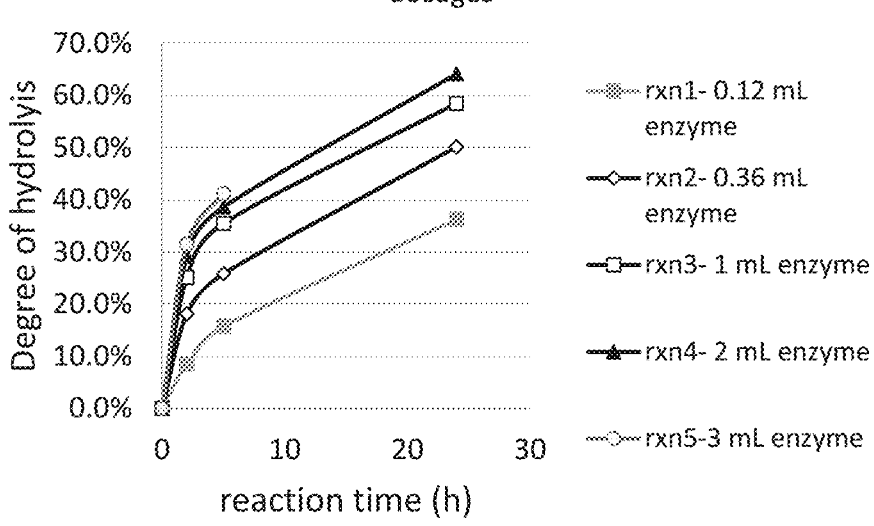
FIG. 23 is a graph showing the reaction time course of the experiment of Example 5.

Degree of hydrolysis data are shown in the Table below, and plotted in the graph of FIG. 23.

| | 0 hours | 2 hours | 5 hours | 24 hours |
|---|---|---|---|---|
| Reaction 1 | 0.1% | 8.5% | 15.7% | 36.3% |
| Reaction 2 | 0.1% | 18.1% | 25.8% | 50.2% |
| Reaction 3 | 0.1% | 25.1% | 35.9% | 58.5% |
| Reaction 4 | 0.1% | 29.2% | 38.6% | 64.2% |
| Reaction 5 | 0.1% | 31.5% | 41.2% | — |

Sedimentation volumes in 6.5 pH buffer with 1% NaCl were measured as otherwise described above. Each sample was weighed in a glass jar to mix with the RVA buffer with 1% NaCl at pH 6.5 to 5% ds. Cooking was performed in the 95° C. water bath with manual stirring by a glass rod for 6 min, followed by 20 min unstirred. The cooked paste was cooled down to room temperature with the lid loosely covered. The condensed moisture on the lid was wiped clean with a paper towel and deionized water was added back to the jar to the original weight. 20 g of the paste was mixed with 80 g of the same buffer in a graduated cylinder sealed with a piece of parafilm by inverting the cylinder carefully a few times. The starch suspension was placed on the bench and the sedimentation volume was recorded after 24 h. The supernatant from each cylinder was collected. The % solubles from the swelling volume graduated cylinders were also measured. Data are shown in the table below:

| name | SV (mL/g) | soluble | DH |
|---|---|---|---|
| Feed starch | 24 | | 0 |
| Reaction 1 | 27 | 3.3% | 36.3% |
| Reaction 5 | 30 | 4.6% | 41.2% |
| Reaction 2 | 31 | 4.5% | 50.2% |
| Reaction 3 | 34 | 7.0% | 58.5% |
| Reaction 4 | 35 | 11.1% | 64.2% |

Figure 24:
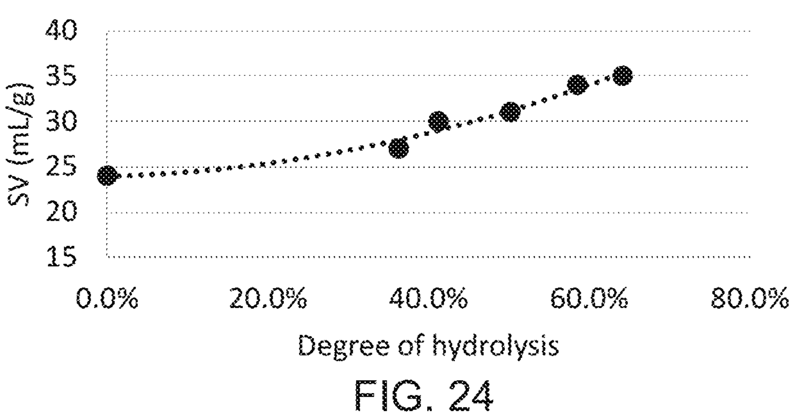
FIG. 24 is a graph showing the relationship between degree of hydrolysis and sedimentation volume in the experiment of Example 5.
Figure 25:
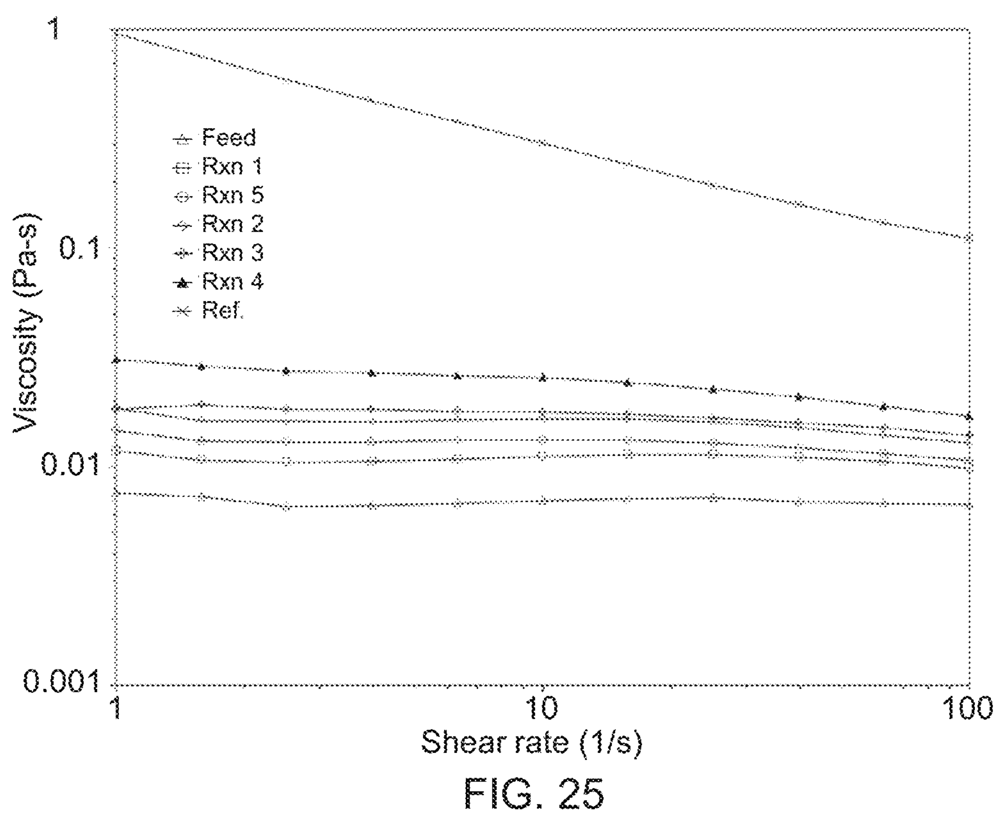
FIGS. 25 and 26 are rheology graphs as described in Example 5.

Sedimentation volume as a function of degree of hydrolysis is plotted in the graph of FIG. 24.

Rheology experiments were also performed. Aliquots of the cooked starch at 5% ds prepared above were diluted into the same salted RVA buffer to obtain 4% and 2.5% ds samples. Viscosities were measured using a stress control (DHR-3) rheometer from TA Instruments, equipped with a lower Peltier plate and an upper parallel plate (40 mm diameter). The upper parallel plate geometry was from previously-used rheometers (AR-2000). In order to make it compatible with the DHR-3 rheometer, a drawdown rod and an adaptor were used. All of the tests were carried out using the following procedure at 25° C.: Amplitude sweep test at 100 Rad/s from 0.1% to 100%; Frequency sweep from 100 Rad/s to 0.1 Rad/s; Flow curves at shear rates 0.01 to 100 $s^{-1}$.

The flow sweeps for the samples and a reference sample (SV 43 mL/g) at 2.5% solids are provided in FIG. 2527. Only the viscosities at higher shear rates ($10^0$-$10^2$ 1/s) were believed to be useful and compared. While the reference sample exhibited shear-thinning behavior, the experimental samples did not, with their dispersions exhibiting pretty constant viscosity along with shear rate from 1 1/s to 100 1/s, as is typical for a Newtonian fluid. −2.5% (DH=58.5%), 467511−2.5% (DH=64.2%)

Figure 26:
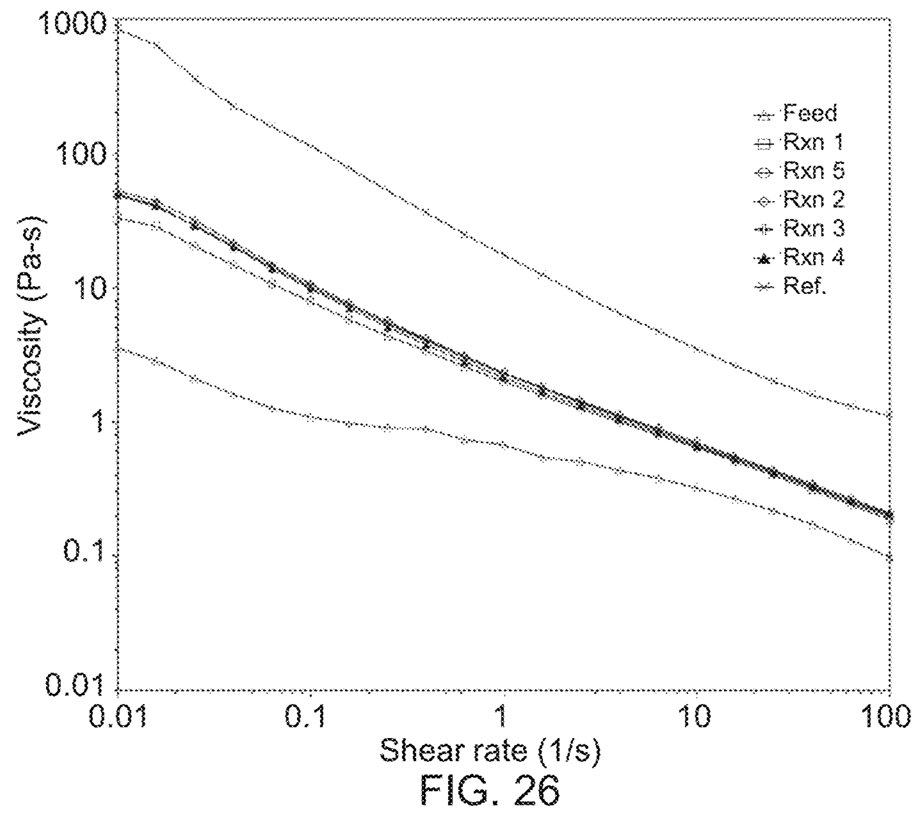

The flow sweeps at a concentration of 4.0% DS are compared in FIG. 26. Viscosity is very similar between the enzyme-treated starches at this solid content, all higher than the untreated. A clear shear thinning behavior was shown for all the enzyme-treated derivatives because at 4% DS they all reached beyond close packing.

Figure 27:
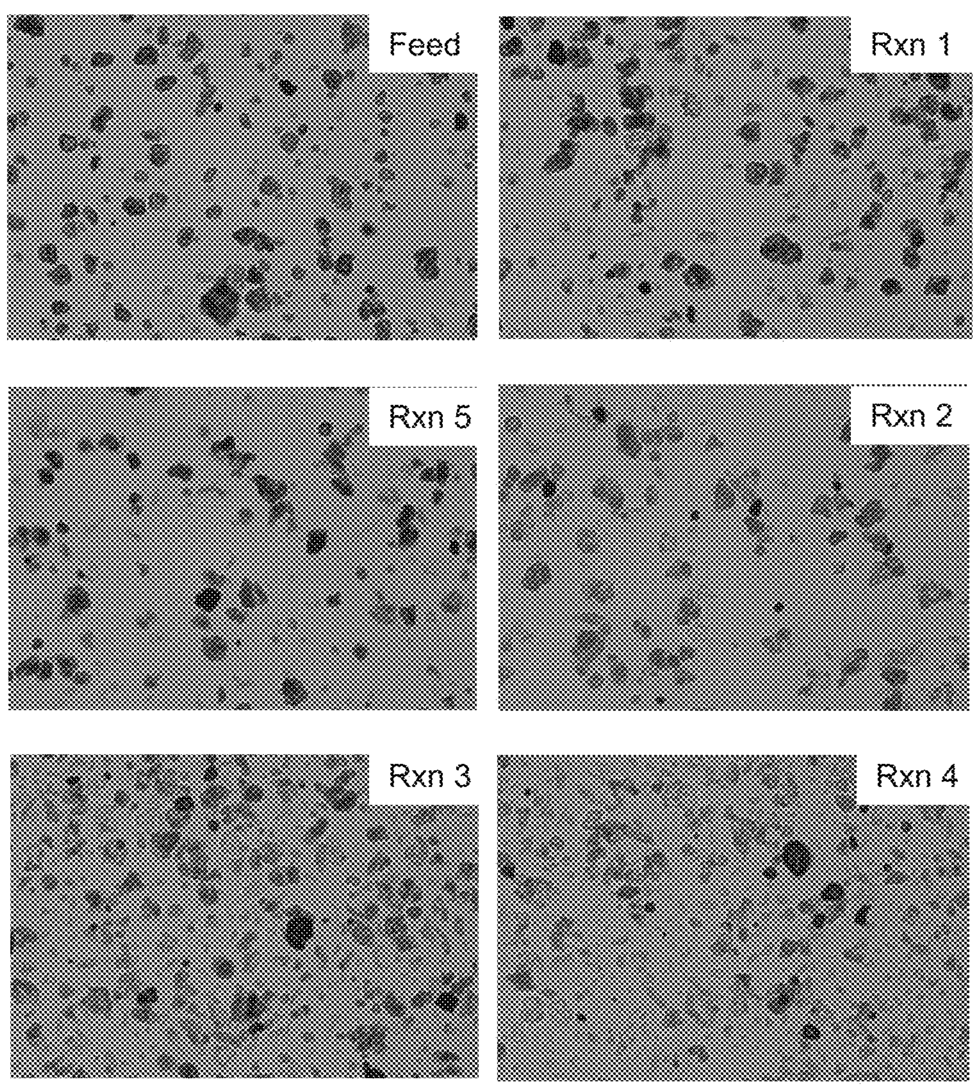
FIG. 27 is a set of optical microscopy images of materials of Example 5.

The cooked starch in the RVA buffer above was visualized under an Olympus BX51 microscope with PAXcam 2+ camera and PAX it! software under bright field without polarized light. 5% cooked starch paste in RVA buffer with 1% NaCl at pH 6.5 was diluted with an equal volume of the same buffer, and then mixed with a further volume of 0.02N iodine solution. A drop of this mixture is added to a standard microscope slide and covered with a cover slip. The magnification was 200× for all of the collected images. Images are shown in FIG. 27. With increase of degree of hydrolysis, more fragmented starch granules are present in the cooked starch samples.

Figure 28:
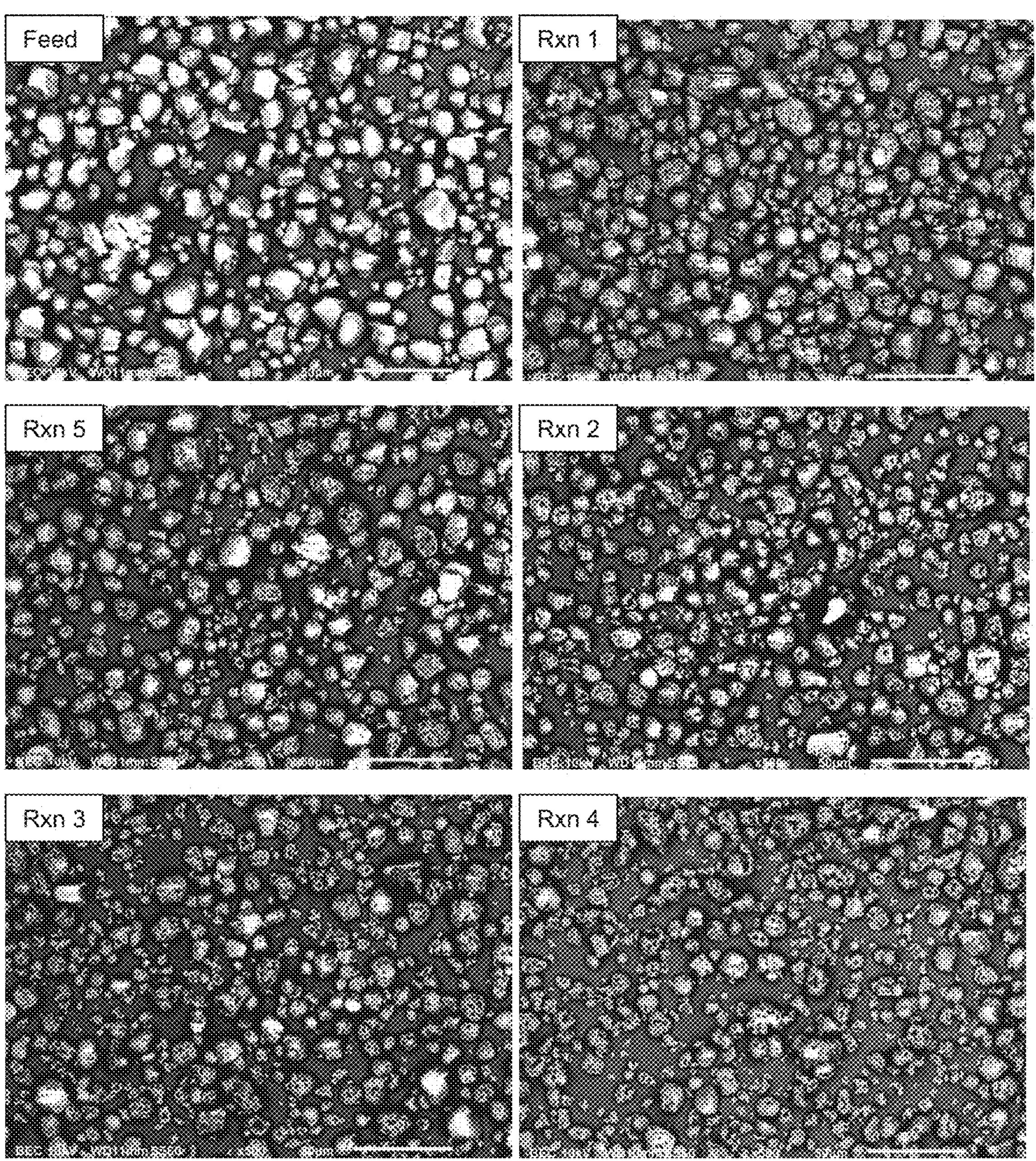
FIG. 28 is a set of SEM images of materials of Example 5.

SEM images were acquired using a scanning electron microscope (SEM) (JEOL 6010 LA) was used to take images. Backscattered imaging mode low vacuum (40 Pa) was used. A small amount of sample powder was put on the surface of a double sided adhesive pad mounted on a specimen stub. A dust remover (Super Friendly AIR'IT™, FisherBrand) was used to blow away excessive powder particles. The electron microscopy images were collected at 500× magnification. Images are shown in FIG. 28. Micropores are present in the treated starch granules, with porosity and number of broken granules increasing with degree of hydrolysis. When the degree of hydrolysis reached as high as 58.5% and 64.2% (Reactions 3 and 4), starch granules were severely fragmented.

Thus, these data demonstrate that starches with various degree of hydrolysis and porosity can be prepared from a chemically modified starch. The swelling volume and viscosity of the enzyme treated samples increases with the degree of hydrolysis.

Figure 29:
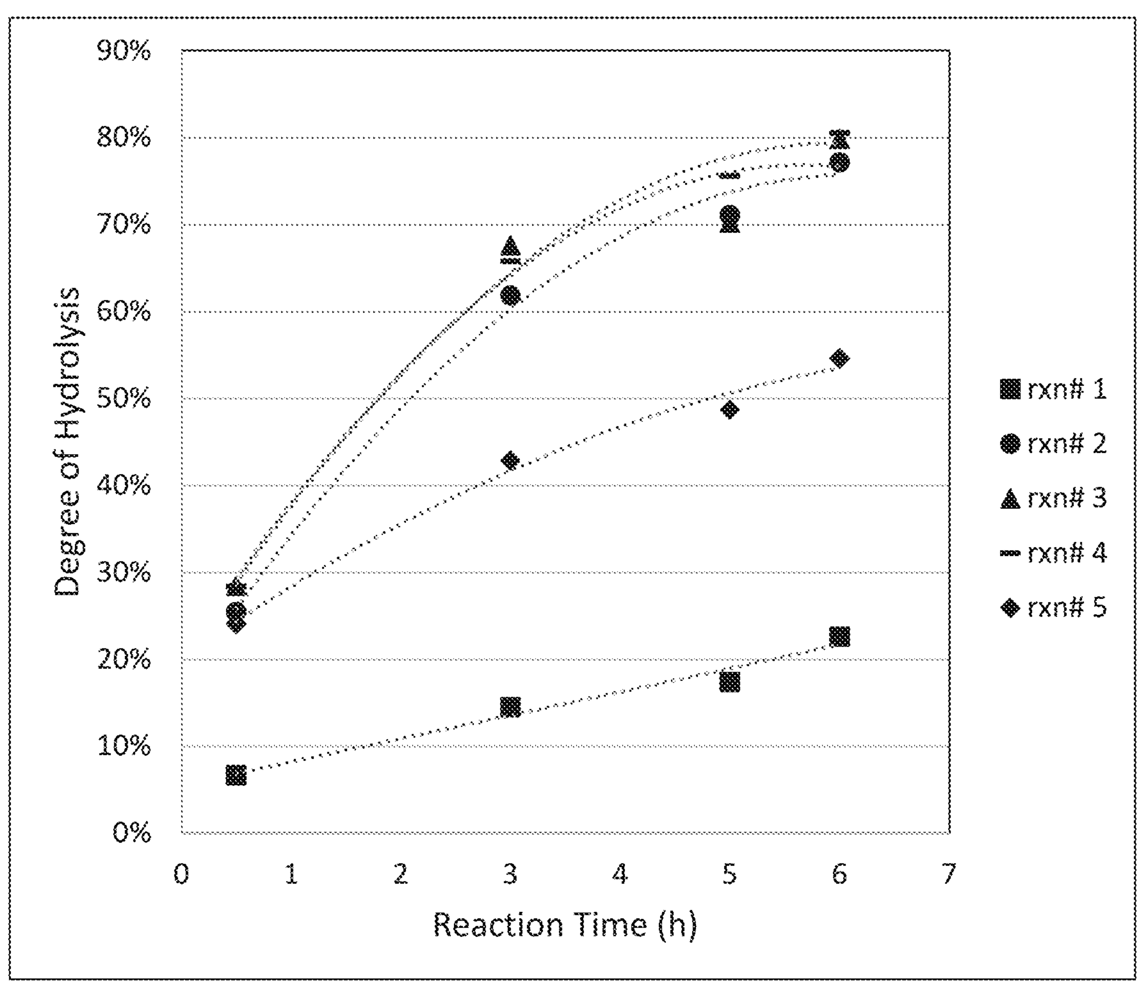
FIG. 29 is a graph showing the relationship between degree of hydrolysis and reaction time in Example 6.

Example 6: Hydrolysis of an Inhibited Clean-Label Starch with Ratios of Glucoamylase and Alpha-Amylase To each of five 500 mL metal beakers was added 135 g (as-is) of a clean-label inhibited starch and 250 g of 20 mM citrate buffer (pH 5.3) and the mixture stirred until uniform. The beakers were then placed in a 50° C. water bath and stirred at 50 rpm for 20 min. No starch precipitate formed after 20 min. High stirring speeds were avoided to prevent enzyme denaturation at high shear rate. Glucoamylase and alpha-amylase were pre-mixed at various ratios (see Table below) and diluted with 10 g 20 mM citrate buffer in individual 15 mL tubes and added to the starch mixture. At 0.5 h, 3 h, and 5 h, aliquots were withdrawn from each beaker and quickly placed in an ice bath. The resulting cold slurry was filtered and the sugar content of the filtrate measured by Brix refractometer. After 6 h, the remaining reaction contents of each beaker were similarly chilled and filtered, and the sugar content of the filtrate measured by the Brix refractometer. The starch cake from each time point was washed with Milli-Q® water and crumbled on a piece of paper and dried at 50° C. overnight. The degree of hydrolysis (DH) for each was calculated from the filtrate sugar content as in previous Examples. The data from the table below are also plotted in FIG. 29:

| Sample | Enzyme Proportions | 0.5 h | 3 h | 5 h | 6 h |
|---|---|---|---|---|---|
| Reaction 1 | 0 g alpha-amylase; 1.84 g glucoamylase | 6.7% DH | 14.5% DH | 17.4% DH | 22.6% DH |
| Reaction 2 | 0.3 g alpha-amylase; 1.51 g glucoamylase | 25.4% DH | 61.8% DH | 71.1% DH | 77.1% DH |
| Reaction 3 | 0.6 g alpha-amylase; 1.20 g glucoamylase | 28.4% DH | 67.6% DH | 70.2% DH | 79.8% DH |
| Reaction 4 | 1.21 g alpha-amylase; 0.61 g glucoamylase | 28.4% DH | 65.7% DH | 75.6% DH | 80.5% DH |
| Reaction 5 | 1.80 g alpha-amylase; 0 g glucoamylase | 24.1% DH | 42.8% DH | 48.7% DH | 54.6% DH |

Figure 30:
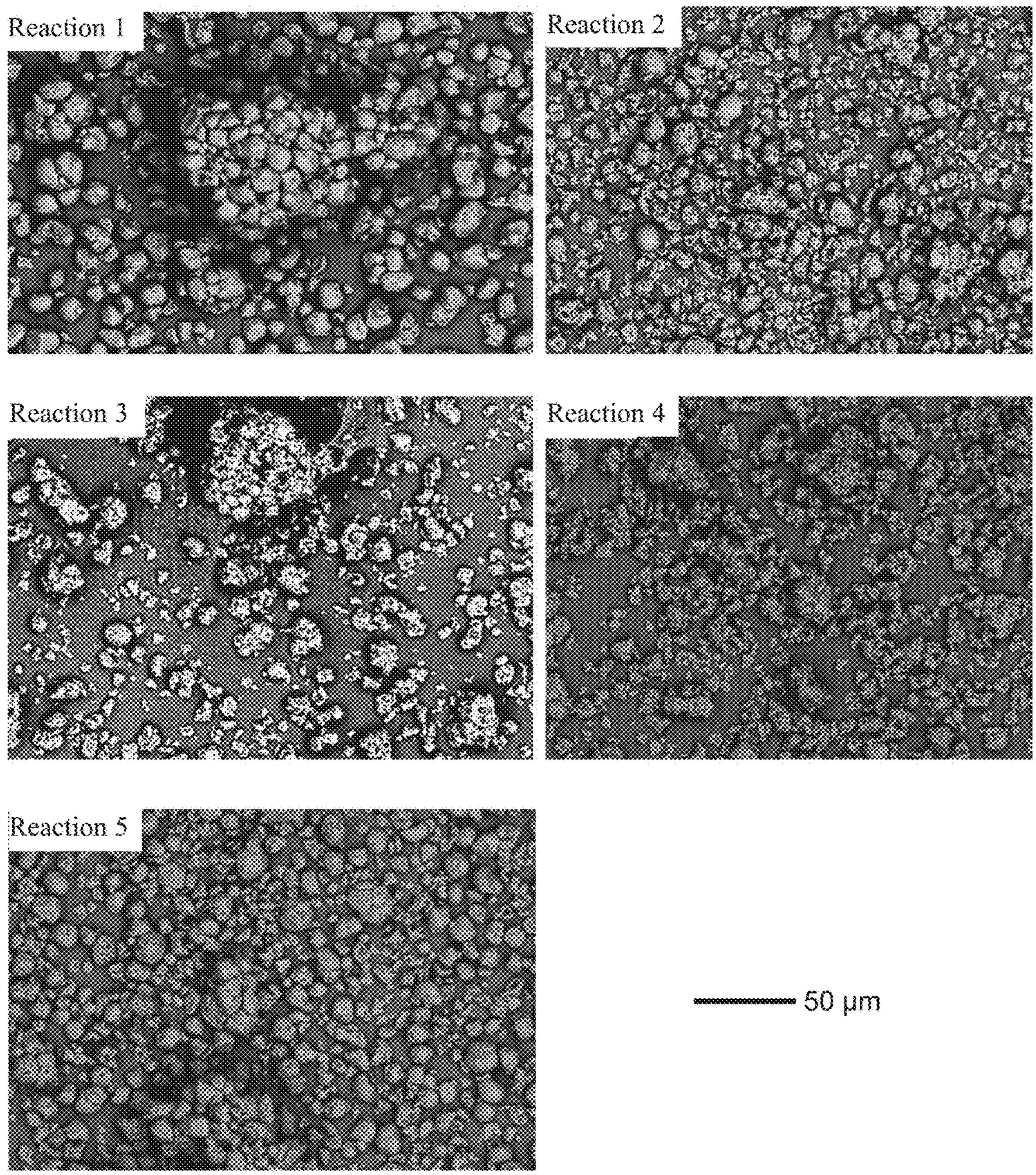
FIG. 30 is a set of SEM images of materials of Example 6.

The reaction rate was found to be slowest in Reaction 1 containing only glucoamylase, while the second slowest was Reaction 5, containing only alpha-amylase. Accordingly, Reactions 2, 3, and 4 which contained different ratios of both glucoamylase and alpha-amylase afforded much higher reaction rates and conversion levels. Notably, the reaction rates are not very different between these three conditions. Without wishing to be bound by theory, it is thought that the two enzymes may exhibit a synergistic hydrolysis effect. Alpha-amylase is known to be an endo starch, wherein it cleaves the glucosidic bonds between adjacent, non-terminal saccharides to form two smaller polysaccharides. In contrast, glucoamylase is known to be an exo starch, wherein terminal saccharides are progressively cleaved, producing a monosaccharide and the parent polysaccharide chain. This mechanistic difference has been exploited by the present inventors, whereby alpha-amylase produces additional terminal saccharide residues, effectively increasing the available substrate for glucoamylase hydrolysis and enhancing the reaction rate compared to the same amount of either enzyme acting alone SEM images were acquired using a scanning electron microscope (SEM) (JEOL 6010 LA) was used to take images of each reaction after 6 h of hydrolysis. Backscattered imaging mode low vacuum (40 Pa) was used. A small amount of sample powder was put on the surface of a double sided adhesive pad mounted on a specimen stub. A dust remover (Super Friendly AIR'IT™, FisherBrand) was used to blow away excessive powder particles. The electron microscopy images were collected at 500× magnification. Images are shown in FIG. 30. Micropores are present in the treated starch granules, with porosity and number of broken granules increasing with degree of hydrolysis.

Sedimentation volumes of uncooked starch was determined by dispersing 3.5 g (as-is) of each starch in Milli-Q® water to a total mixture weight of 100 g in a graduated cylinder. The cylinder was sealed with Parafilm® and inverted 3-4 times to mix the slurry. The graduated cylinders were placed on the bench and the volume of the sedimented starch recorded. Data are shown in the table below:

| | SV (mL/g) | % Change | DH |
|---|---|---|---|
| Feed starch | 2.5 | | 0 |
| Reaction 1 | 2.7 | 11.7% | 22.6% |
| Reaction 2 | 3.1 | 25.2% | 77.1% |
| Reaction 3 | 3.1 | 27.8% | 79.8% |
| Reaction 4 | 2.6 | 5.9% | 80.5% |
| Reaction 5 | 2.3 | −5.9% | 54.6% |

Figure 31:
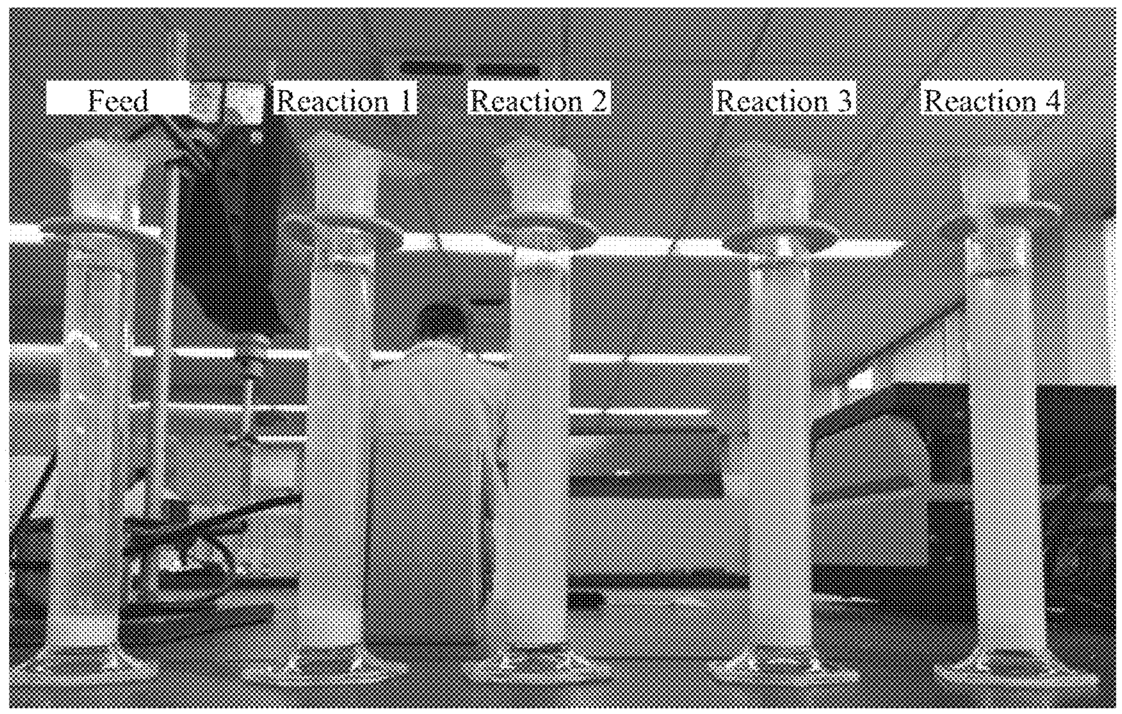
FIG. 31 is a photograph of sedimentation volumes of materials of Example 6.

A marked increase in the sedimentation volume for the uncooked starch was observed in Reactions 1, 2 and 3 with Reactions 2 and 3 having the largest increase. Reaction 4 exhibited a small increase in sedimentation volume and Reaction 5 decreased slightly. Further, Reactions 2, 3, 4, and 5 exhibited a large turbid middle phase layer, likely made up of small starch fragments and not included in the settling volume. FIG. 31 displays photographs of the uncooked starches from Reactions 1-4 (Reaction 5 not photographed). Consistent with the SEM images and turbid layer observed during the sedimentation volume experiments, the reactions with alpha-amylase exhibits large numbers of smaller, broken starch fragment.

Figure 32:
FIG. 32 is a photograph of materials after cooking in Example 6.
Figure 33:
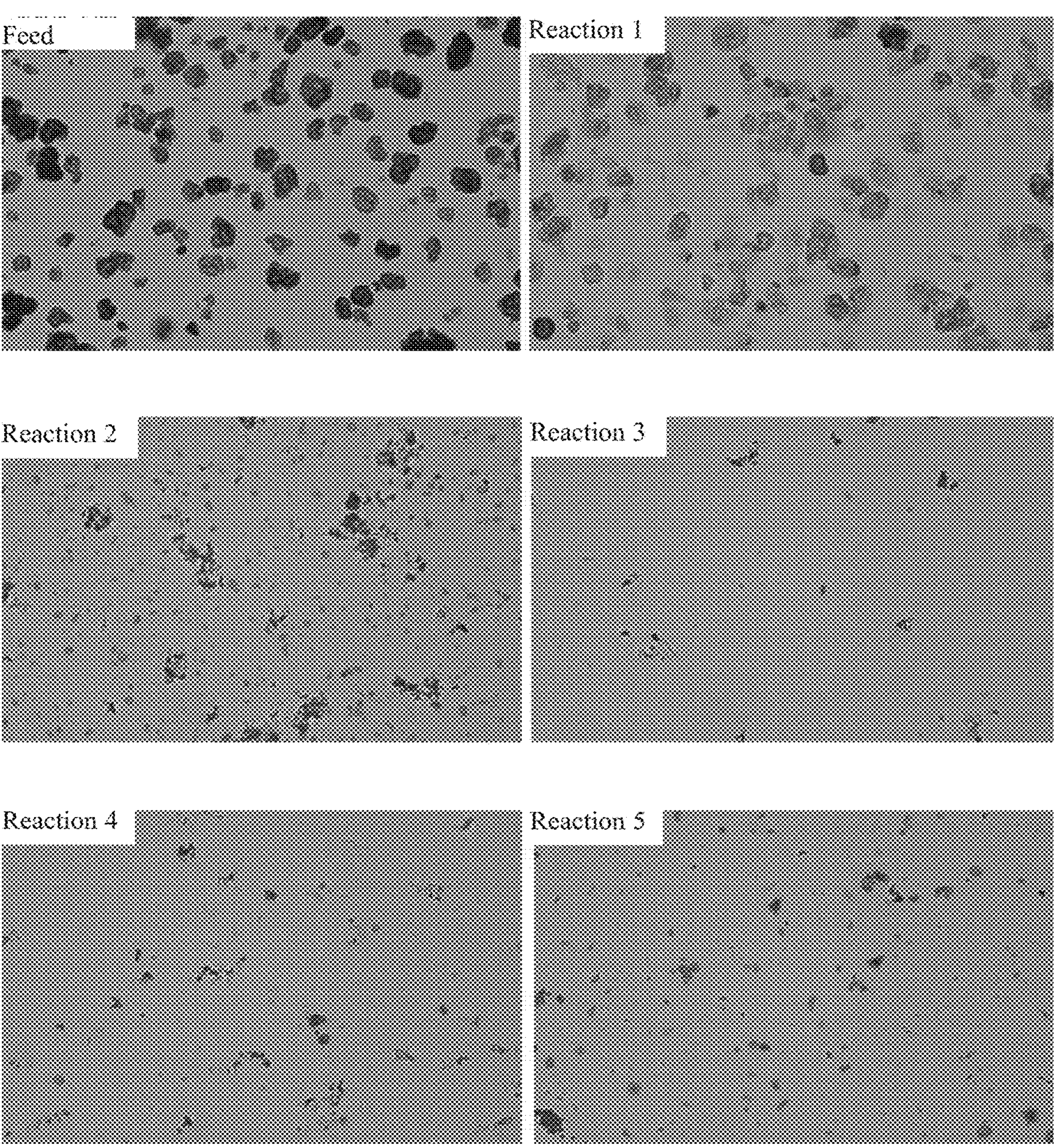
FIG. 33 is a set of optical microscopy images of materials of Example 6.
Figure 35:
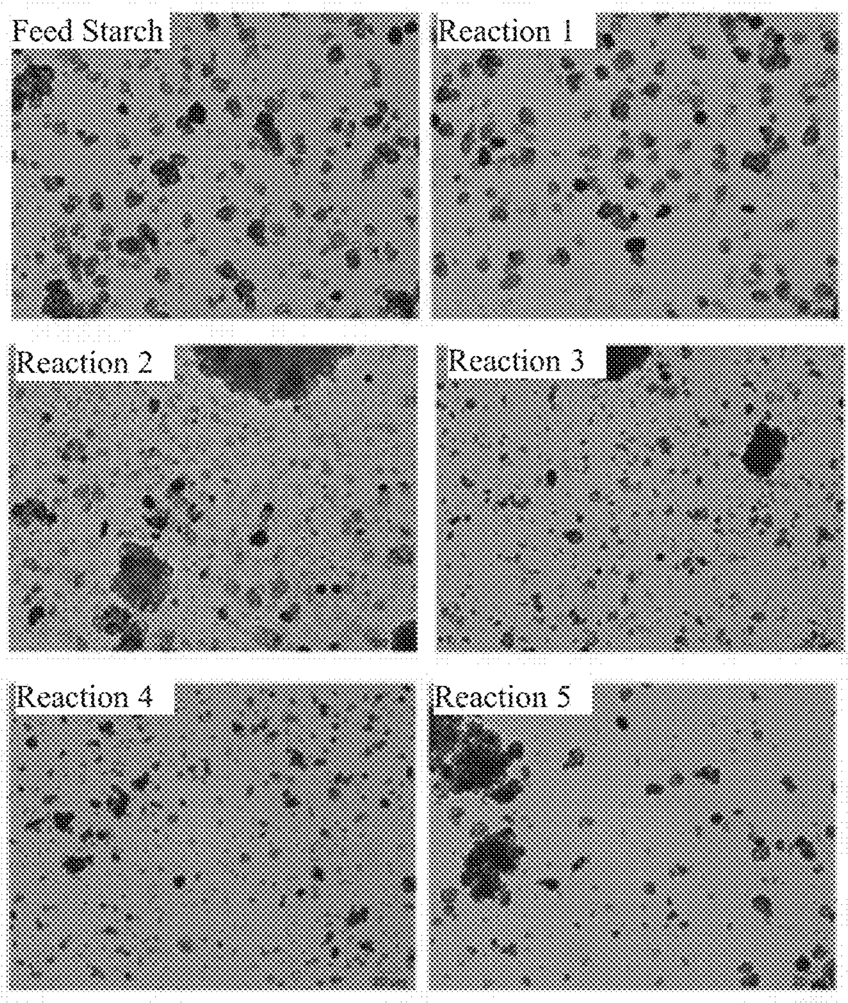
FIG. 35 is a set of optical microscopy images of materials of Example 6.

Portions of Reactions 1-5 and the feed starch were each cooked at 95° C. in a water bath with manual stirring by a glass rod for 6 min followed by 20 min unstirred. The cooked paste was cooled down to room temperature with the lid loosely covered. After cooking, Reactions 2-4 displayed a markedly different appearance than the cooked feed starch and Reaction 1. The Reactions treated with at least some alpha-amylase displayed various degrees of precipitation and a clear upper phase, although Reaction 5 did not precipitate until sitting for several hours. FIG. 32 displays photographs of the starches after cooking. Subsequently, the cooked starches were stained with iodine and studied under optical microscopy. FIG. 35 displays optical micrographs of the cooked feed starch and cooked Reactions 1-5. Consistent with their varied appearance after cooking, Reactions 2-5 do not display significant intact starch granules. Accordingly, the hydrolysis under these conditions appears to largely remove the effect of starch inhibition, leading to loss of starch granule integrity during cooking.

The porosity of the uncooked portions of Reactions 1-5 and the feed starch were investigated through their water holding capacities. To determine water holding capacity, 20 grams of each starch was slurried in citrate buffer to a total weight of 80 grams. The slurry was filtered and the weight of the filtrate recorded. The amount of water retained by the starch was calculated according to the following formulae:

water retained=slurry weight−filtrate weight−starch dry weight water holding capacity=water retained (*g*)/starch dry weight (*g*)

The water holding capacity of each starch and their relative porosity was calculated and is shown in the table below:

| | Water Holding Capacity (g/g) | Porosity Increase | DH |
|---|---|---|---|
| Feed Starch | 0.97 | — | 0 |
| Reaction 1 | 1.22 | 26% | 22.6% |
| Reaction 2 | 1.64 | 69% | 77.1% |
| Reaction 3 | 1.56 | 61% | 79.8% |
| Reaction 4 | 1.17 | 21% | 80.5% |
| Reaction 5 | 1.41 | 45% | 54.6% |

Figure 34:
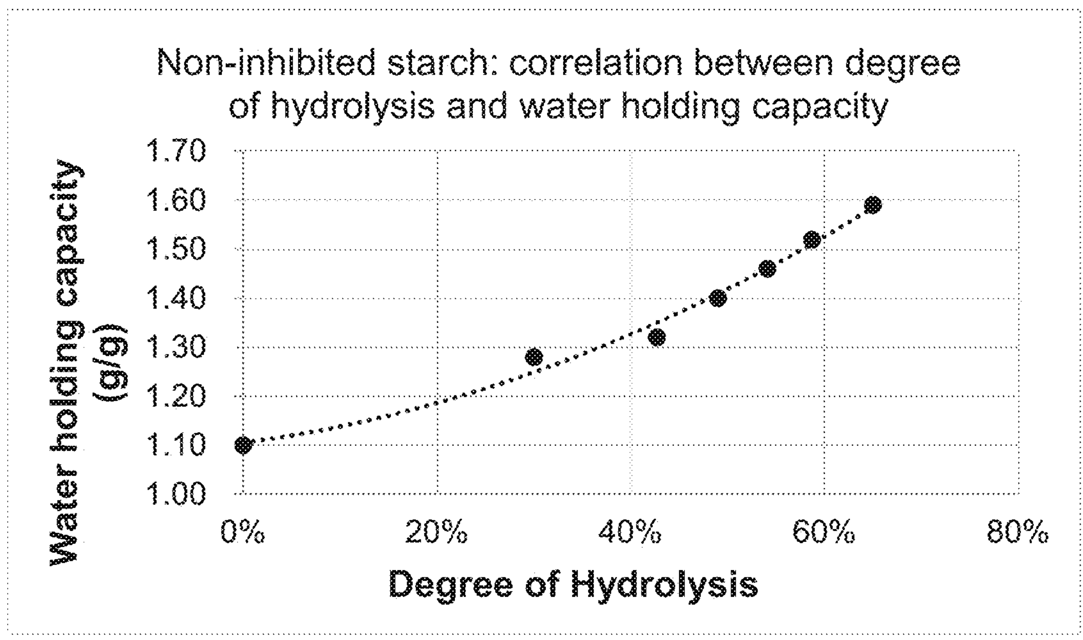
FIG. 34 is a graph showing the relationship between degree of hydrolysis and water holding capacity of materials of Example 4 (top image), and degree of hydrolysis and water holding capacity of materials of Example 6 (bottom image).
Figure 34:
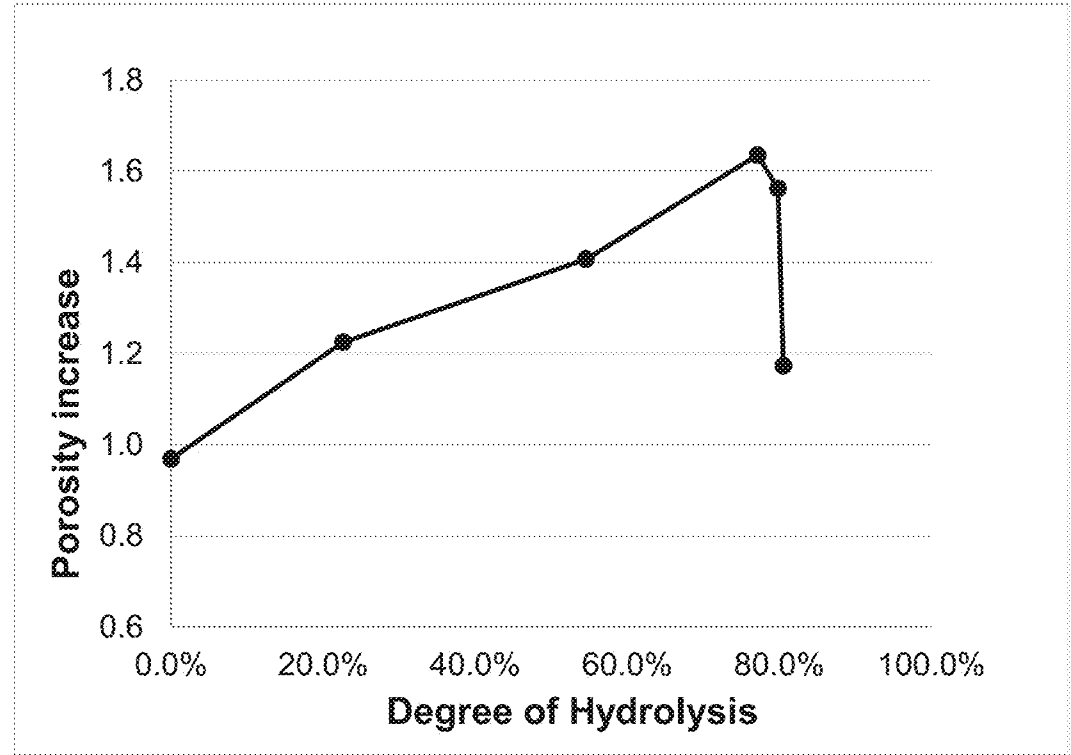

Accordingly, the porosity change with the enzyme treatment was not found to perfectly correlate with the degree of hydrolysis for samples treated with alpha-amylase. Including 17% alpha-amylase (e.g., Reaction 2) in the enzyme mixture was found to greatly enhance the degree of hydrolysis, but further increasing the proportion of alpha-amylase did not result in a significant increase in the hydrolysis rate or the level of hydrolysis, and was further found to negatively impact the porosity. FIG. 34, bottom graph is a plot of degree of hydrolysis and water holding capacity and clearly illustrates the degree of hydrolysis necessary to impart maximal porosity.

Due to the disruption of the starch granules of Reactions 2-5 upon cooking, it was hypothesized that additional inhibition may allow them to maintain their structure upon cooking. Accordingly, the starches isolated from Reactions 1-5 were inhibited, and then cooked as described above. As hypothesized, the starch granules upon cooking were observed to remain intact. FIG. 35 displays optical micrographs of iodine-stained, cooked, re-inhibited Reactions 1-5 as well as the feed starch. The swelling volumes of these starches was also investigated. The table below shows the results:

| | DH after enzymatic treatment | SV (mL/g) after re-inhibition and cooking |
|---|---|---|
| Feed Starch | — | 16 |
| Reaction 1 | 22.6% | 15 |
| Reaction 2 | 77.1% | 23 |
| Reaction 3 | 79.8% | 21 |
| Reaction 4 | 80.5% | 21 |
| Reaction 5 | 54.6% | 22 |

In general, samples with higher degrees of hydrolysis evidences larger swelling volumes. However, the effect was not found to correlate in a predictable manner, likely due to a complex interplay between porosity and particle size.

Various aspects of the disclosure are described by the following enumerated embodiments, which may be combined in any number and in any combination not logically or technically inconsistent.

Embodiment 1. A inhibited porous granular starch product having a water uptake of at least 1.0 g water/g starch and a sedimentation volume in the range of 20-80 mL/g.

Embodiment 2. The inhibited porous granular starch product of embodiment 1, wherein the inhibited porous granular starch product has a sedimentation volume in the range of 30-80 mL/g, e.g., 40-80 mL/g or 50-80 mL/g.

Embodiment 3. The inhibited porous granular starch product of embodiment 1, wherein the inhibited porous granular starch product has a sedimentation volume in the range of 30-70 mL/g, e.g., 40-70 mL/g or 50-70 mL/g.

Embodiment 4. The inhibited porous granular starch product of embodiment 1, wherein the inhibited porous granular starch product has a sedimentation volume in the range of 20-60 mL/g, e.g., 30-60 mL/g.

Embodiment 5. The inhibited porous granular starch product of embodiment 1, wherein the inhibited porous granular starch product has a sedimentation volume in the range of 20-50 mL/g, e.g., 30-50 mL/g, or 20-40 mL/g, or 25-35 mL/g.

Embodiment 6. The inhibited porous granular starch product of any of embodiments 1-5, wherein the inhibited porous granular starch has a water uptake of at least 1.2 g water/g starch, e.g., at least 1.3 g water/g starch, or at least 1.4 g water/g starch, or at least 1.5 g water/g starch.

Embodiment 7. The inhibited porous granular starch product of any of embodiments 1-5, wherein the inhibited porous granular starch has a water uptake in the range of 1.0-1.8 g water/g starch.

Embodiment 8. The inhibited porous granular starch product of any of embodiments 1-5, wherein the inhibited porous granular starch product has a water uptake in the range of 1.25-1.7 g water/g starch.

Embodiment 9. The inhibited porous granular starch product of any of embodiments 1-5, wherein the inhibited porous granular starch product has a water uptake in the range of 1.3-1.7 g water/g starch, e.g., 1.4-1.7 g water/g starch or 1.5-1.7 g water/g starch.

Embodiment 10. The inhibited porous granular starch product of any of embodiments 1-5, wherein the inhibited porous granular starch product has a water uptake in the range of 1.25-1.6 g water/g starch, e.g., 1.3-1.6 g water/g starch or 1.4-1.6 g water/g starch.

Embodiment 11. The inhibited porous granular starch product of any of embodiments 1-5, wherein the inhibited porous granular starch product has a water uptake in the range of 1.25-1.5 g water/g starch, e.g., 1.3-1.5 g water/g starch.

Embodiment 12. The inhibited porous granular starch product of any of embodiments 1-11, wherein the inhibited porous granular starch product is not gelatinized.

Embodiment 13. The inhibited porous granular starch product of any of embodiments 1-12, the inhibited porous granular starch product having substantially no fatty acid residues.

Embodiment 14. The inhibited porous granular starch product of any of embodiments 1-13, wherein the inhibited porous granular starch product is a chemically-modified inhibited starch (for example, inhibited via crosslinking, e.g., with acrolein, phosphate, adipate or epichlorohydrin).

Embodiment 15. The inhibited porous granular starch product of any of embodiments 1-13, wherein the inhibited granular starch product is inhibited by heat-treatment.

Embodiment 16. The inhibited porous granular starch product of any of embodiments 1-13, wherein the inhibited porous granular starch product is a maize starch.

Embodiment 17. The inhibited porous granular starch product of any of embodiments 1-13, wherein the inhibited porous granular starch product is a tapioca starch.

Embodiment 18. The inhibited porous granular starch product of any of embodiments 1-13, wherein the inhibited porous granular starch product is a wheat starch, a rice starch, a potato starch, potato starch, an oat starch, a barley starch or a sago starch.

Embodiment 19. The inhibited porous granular starch product of any of embodiments 1-18, wherein the inhibited porous granular starch product wherein the inhibited porous granular starch product is not hydroxypropylated.

Embodiment 20. The inhibited porous granular starch product of any of embodiments 1-19, wherein the inhibited porous granular starch product is not acetylated.

Embodiment 21. The inhibited porous granular starch product of any of embodiments 1-5, wherein the inhibited porous granular starch product has substantially no fatty acid residues.

Embodiment 22. The inhibited porous granular starch product of any of embodiments 1-21, wherein the inhibited porous granular starch product is not carboxymethylated.

Embodiment 23. The inhibited porous granular starch product of any of embodiments 1-22, wherein the inhibited porous granular starch product is not hydroxyethylated.

Embodiment 24. The inhibited porous granular starch product of any of embodiments 1-23, wherein the inhibited porous granular starch product is not phosphated.

Embodiment 25. The inhibited porous granular starch product of any of embodiments 1-24, wherein the inhibited porous granular starch product is not succinated (e.g., not octenylsuccinated).

Embodiment 26. The inhibited porous granular starch product of any of embodiments 1-5, wherein the inhibited porous granular starch product is not cationic or zwitterionic.

Embodiment 27. The inhibited porous granular starch product of any of embodiments 26, wherein the inhibited porous granular starch product is not crosslinked with phosphate.

Embodiment 28. The inhibited porous granular starch product of any of embodiments 1-27, wherein the inhibited porous granular starch product is not crosslinked with adipate.

Embodiment 29. The inhibited porous granular starch product of any of embodiments 1-28, wherein the inhibited porous granular starch product is not crosslinked with epichlorohydrin.

Embodiment 30. The inhibited porous granular starch product of any of embodiments 1-29, wherein the inhibited porous granular starch product is not crosslinked with acrolein.

Embodiment 31. The inhibited porous granular starch product of any of embodiments 1-5, wherein the inhibited porous granular starch product is not bleached or oxidized with peroxide or hypochlorite.

Embodiment 32. The inhibited porous granular starch product of any of embodiments 1-31, wherein the inhibited porous granular starch product has a viscosity at 5% solids in the range of 50-1500 cP in an RVA test.

Embodiment 33. The inhibited porous granular starch product of any of embodiments 1-32, wherein the inhibited porous granular starch product has a viscosity in the range of 50-1000 cP, 50-850 cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, 600-850 cP, 700-1500 cP, or 700-1300 cP in an RVA test at 5% solids.

Embodiment 34. The inhibited porous granular starch product of any of embodiments 39-96, having a viscosity in the range of 60-90 cP, e.g., in the range of 62-90 cP, or 64-90 cP, or 66-90 cP, or 68-90 cP, or 70-90 cP, or 60-85 cP, or 62-85 cP, or 64-85 cP, or 66-85 cP, or 68-85 cP, or 70-85 cP, or 60-80 cP, or 62-80 cP, or 64-80 cP, or 66-80 cP, or 68-80 cP, or 70-80 cP, or 60-75 cP, or 62-75 cP, or 64-75 cP, or 66-75 cP, or 68-75 cP, or 70-75 cP, in a RVA test at 3% solids.

Embodiment 35. The inhibited porous granular starch product of any of embodiments 39-96, having a viscosity in the range of 38-60 cP, e.g., in the range of 40-60 cP, or 42-60 cP, or 44-60 cP, or 46-60 cP, or 48-60 cP, or 50-60 cP, or 38-56 cP, or 40-56 cP, or 42-56 cP, or 44-56 cP, or 46-56 cP, or 48-56 cP, or 50-56 cP, or 38-54 cP, or 40-54 cP, or 42-54 cP, or 44-54 cP, or 46-54 cP, or 48-54 cP, or 50-54 cP, or 38-52 cP, or 40-52 cP, or 42-52 cP, or 44-52 cP, or 46-52 cP, or 48-52 cP, in a RVA test at 2.5% solids.

Embodiment 36. The inhibited porous granular starch product of any of embodiments 1-35, wherein the inhibited porous granular starch has a relatively low color, i.e., a Yellowness Index of no more than 10.

Embodiment 37. The inhibited porous granular starch product of any of embodiments 1-35, wherein the inhibited porous granular starch has a relatively low color, i.e., a Yellowness Index of 3-10 or 5-10.

Embodiment 38. The inhibited porous granular starch product of any of embodiments 1-35, wherein the inhibited porous granular starch has an especially low color, i.e., a Yellowness Index of no more than 8.

Embodiment 39. The inhibited porous granular starch product of any of embodiments 1-38, wherein the inhibited porous granular starch has no more than 15% solubles.

Embodiment 40. The inhibited porous granular starch product of any of embodiments 1-38, wherein the inhibited porous granular starch has no more than 12% solubles, no more than 10% solubles, no more than 8% solubles or no more than 5% solubles Embodiment 41. A method for making an inhibited porous granular starch product (e.g., according to any of embodiments 1-40), the method comprising providing a granular starch feed; and hydrolyzing the granular starch feed to a degree of hydrolysis in the range of 20-75% using one or more enzymes including one of a glucoamylase and an alpha-amylase, or both a glucoamylase and an alpha-amylase;

wherein the inhibited porous granular starch product has a porosity as measured by change in water uptake as compared to the granular starch feed in the range of 10%-50% and a sedimentation volume in the range of 20 mL/g to 70 mL/g.

Embodiment 42. A method for making an inhibited porous granular starch product (e.g., according to any of embodiments 1-40), the method comprising providing a granular starch feed; and hydrolyzing the granular starch feed to a degree of hydrolysis in the range of 20-75% using one or more enzymes including one of a glucoamylase and an alpha-amylase, or both a glucoamylase and an alpha-amylase;

wherein the inhibited porous granular starch product has a porosity as measured by water uptake in the range of 1.0 g water/g starch to 1.8 g water/g starch and a sedimentation volume in the range of 20 mL/g to 70 mL/g.

Embodiment 43. The method according to embodiment 42, wherein the inhibited porous granular starch product has a porosity as measured by change in water uptake as compared to the granular starch feed in the range of 10%-50%.

Embodiment 44. The method of any of embodiments 41-43, wherein the granular starch feed is hydrolyzed to a degree of hydrolysis in the range of 30-75%, e.g., in the range of 40-75% or 50-75%.

Embodiment 45. The method of any of embodiments 41-43, wherein the granular starch feed is hydrolyzed to a degree of hydrolysis in the range of 20-70%, e.g., in the range of 30-70% or 40-70%.

Embodiment 46. The method of any of embodiments 41-43, wherein the granular starch feed is hydrolyzed to a degree of hydrolysis in the range of 20-60%, e.g., in the range of 30-60% or 40-60%.

Embodiment 47. The method of any of embodiments 41-43, wherein the granular starch feed is hydrolyzed to a degree of hydrolysis of 20-50%, e.g., 30-50% or 40-50%.

Embodiment 48. The method of any of embodiments 41-47 wherein the hydrolysis is carried out with a glucoamylase, e.g., a glucoamylase alone.

Embodiment 49. The method of any of embodiments 41-47 wherein the hydrolysis is carried out with an alpha-amylase, e.g., an alpha amylase alone.

Embodiment 50. The method of any of embodiments 41-47, wherein the hydrolysis is carried out with a glucoamylase in combination with an alpha amylase.

Embodiment 51. The method of any of embodiments 41-47, wherein the hydrolysis is carried out with a combination of an alpha-amylase and a glucoamylase in a weight ratio in the range of less than about 1:5 (e.g., between 1 and 12 wt % alpha-amylase, or between 1 and 10 wt % alpha-amylase, or between 1 and 5 wt % alpha-amylase).

Embodiment 52. The method of any of embodiments 41-51, wherein the granular starch feed is an inhibited granular starch feed.

Embodiment 53. The method of embodiment 52, wherein the inhibited granular starch feed is a chemically-modified inhibited starch (for example, inhibited via crosslinking, e.g., with acrolein, phosphate, adipate or epichlorohydrin).

Embodiment 54. The method of embodiment 52, wherein the inhibited granular starch feed is inhibited by heat-treatment.

Embodiment 55. The method of any of embodiments 41-51, wherein the granular starch feed is not inhibited, and wherein the method further comprises, after the hydrolysis, inhibiting the starch.

Embodiment 56. The method of embodiment 55, wherein the inhibition is performed by heat-treatment.

Embodiment 57. The method of embodiment 54 or embodiment 56, wherein the inhibition comprises a) heating a non-pregelatinized granular starch in an alcoholic (e.g., ethanolic) medium in the presence of a base at a temperature of at least 35° C.;

b) neutralizing the base with an acid;

c) separating the inhibited starch from the alcoholic medium; and d) removing alcohol solvent from the inhibited starch, e.g., by heating or with steam.

Embodiment 58. The method of embodiment 54 or embodiment 56, wherein the inhibition comprises subjecting the starch to a pH adjustment then heating the starch.

Embodiment 59. The method of embodiment 5586, wherein the pH adjustment is performed by contacting a pH-adjusting agent with the starch.

Embodiment 60. The method of embodiment 59, wherein the pH-adjusting agent is selected from sulfuric acid, phosphoric acid, hydrochloric acid, itaconic acid, aconitic acid, malonic acid, lactic acid, tartaric acid, oxalic acid, fumaric acid, aconitic acid, succinic acid, acetic acid, oxalosuccinic acid, glutaric acid, ketoglutaric acid, malic acid, citric acid, fatty acids and carbonic acid, as well as salts thereof and combinations thereof.

Embodiment 61. The method of any of embodiments 58-60, wherein the pH-adjusting agent is performed to yield a pH in the range of 2-7, e.g., in the range of 2-6, or 2-5, or 2-4, or 2-3, or 3-7, or 3-6, or 3-5, or 3-4, or 4-7, or 4-6, or 4.5-7, or 4.5-6, or 5-7, or 5-6, or about 2.5, or about 3, or about 3.5, or about 4, or about 4.5, or about 5, or about 5.5, or about 6, or about 6.5, or about 7.

Embodiment 62. The method of any of embodiments 58-61, wherein the heat treatment is performed with the starch in alcohol or non-aqueous solvent slurry; as a dough of starch, water, and non-water solvent to suppress granular swelling; or in a substantially dry state.

Embodiment 63. The method of any of embodiments 58-61, wherein the heat treatment is performed at a moisture level of less than 5%.

Embodiment 64. The method of any of embodiments 58-63, wherein the heat treatment is performed at a temperature in the range of 100-200° C.

Embodiment 65. The method of any of embodiments 58-63, wherein the heat treatment is performed at a temperature is 120-200° C., 120-180° C., or 120-160° C., or 120-140° C., or 140-200° C., or 140-180° C., or 140-160° C., or 160-200° C., or 160-180° C., or 180-200° C.

Embodiment 66. The method of any of embodiments 58-65, wherein the heat treatment is performed for a time in the range of 20 seconds to 20 hours.

Embodiment 67. The method of any of embodiments 58-65, wherein the heat treatment is performed for a time in the range of 10 minutes to 2 hours.

Embodiment 68. The method of any of embodiments 54 and 56-67, wherein the starch product is not crosslinked with acrolein, phosphate, adipate or epichlorohydrin.

Embodiment 69. The method of embodiment 55, wherein the granular starch feed is not inhibited, and wherein the method further comprises, after the hydrolysis, crosslinking the starch, e.g., with acrolein, phosphate, adipate or epichlorohydrin.

Embodiment 70. The method of any of embodiments 41-69 wherein the starch feed is not substantially gelatinized.

Embodiment 71. The method of any of embodiments 41-70, wherein the starch feed is a maize starch.

Embodiment 72. The method of any of embodiments 41-70, wherein the starch feed is a tapioca starch.

Embodiment 73. The method of any of embodiments 41-70, wherein the starch feed is a wheat starch, a rice starch, a potato starch, potato starch, an oat starch, a barley starch or a sago starch.

Embodiment 74. The inhibited porous granular starch product of any of embodiments 1-made by a process according to any of embodiments 41-73.

Embodiment 75. An inhibited porous granular starch product made by a process according to any of embodiments 41-73.

Embodiment 76. A method for making a food product comprising providing a inhibited porous granular starch product of any of embodiments 1-40, 74 and 75 and including the inhibited porous granular starch product in the food product.

Embodiment 77. A method of embodiment 75, wherein the including the inhibited porous granular starch product in the food product includes cooking the inhibited porous granular starch product in the food product.

Embodiment 78. A food product comprising the inhibited porous granular starch product according to any of embodiments 1-40, 74 and 75.

Embodiment 79. The food product comprising the inhibited porous granular starch product according to any of embodiments 1-11, 13-40, 74 and 75, wherein the inhibited porous granular starch is in cooked form in the food product.

Embodiment 80. The method or food product according to any of embodiments 76-79, wherein the food product has a viscosity of at least 100 cP, e.g., at least 200 cP, or at least 500 cP, measured at 25° C.

Embodiment 81. The method or food product according to any of embodiments 76-79, wherein the food product has a viscosity of at least 1000 cP, e.g., at least 2000 cP, or at least 5000 cP, measured at 25° C.

Embodiment 82. The method or food product according to any of embodiments 76-81, wherein the food product has a viscosity of at least 50 cP greater than the viscosity of an otherwise identically-prepared food product lacking the inhibited porous granular starch, e.g., at least 75 cP greater or at least 100 cP greater, measured at 25° C.

Embodiment 83. The method or food product according to any of embodiments 76-81, wherein the food product has a viscosity of at least 200 cP greater than the viscosity of an otherwise identically-prepared food product lacking the inhibited porous granular starch, e.g., at least at least 500 cP greater, measured at 25° C.

Embodiment 84. The method or food product according to any of embodiments 76-83, wherein the food product is a gravy, a sauce, a soup, or a stew.

Embodiment 85. The method or food product according to any of embodiments 76-83, wherein the food product is a dressing.

Embodiment 86. The method or food product according to any of embodiments 76-83, wherein the food product is a dairy product, e.g. a yogurt.

Embodiment 87. The method or food product according to any of embodiments 76-83, wherein the food product is a tomato-based product, a gravy, a sauce such as a white sauce or a cheese sauce, a soup, a pudding, a salad dressing (e.g., pourable or spoonable), a yogurt, a sour cream, a pudding, a custard, a cheese product, a fruit filling or topping, a cream filling or topping, a syrup (e.g., a lite syrup), a beverage (e.g., a dairy-based beverage), a glaze, a condiment, a confectionary, a pasta, a frozen food, a cereal, or a soup.

Embodiment 88. The method or food product of any of embodiments 76-83, wherein the food product is a baked good, e.g., a bread, a pastry, a pie crust, a donut, a cake, a biscuit, a cookie, a cracker, or a muffin.

Embodiment 89. The method or food product of any of embodiments 76-83, wherein the food product is selected from thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity.

Embodiment 90. The method or food product of any of embodiments 76-83, wherein the food product is selected from high acid foods (pH<3.7) such as fruit-based pie fillings, baby foods, and the like; acid foods (pH 3.7-4.5) such as tomato-based products; low acid foods (pH >4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods.

Embodiment 91. The method or food product of any of embodiments 76-83, wherein the food product is selected from baked foods, breakfast cereal, anhydrous coatings (e.g., ice cream compound coating, chocolate), dairy products, confections, jams and jellies, beverages, fillings, extruded and sheeted snacks, gelatin desserts, snack bars, cheese and cheese sauces, edible and water-soluble films, soups, syrups, sauces, dressings, creamers, icings, frostings, glazes, tortillas, meat and fish, dried fruit, infant and toddler food, and batters and breadings.

Embodiment 92. The method or food product of any of embodiments 76-83, wherein the food product is a medical food.

Embodiment 93. The method or food product of any of embodiments 76-83, wherein the food product is a pet food.

Embodiment 94. The method or food product of any of embodiments 76-93, wherein the inhibited porous granular starch is present in the food product in an amount in the range of 0.1-10 wt %, e.g., 0.1-8 wt %, or 0.1-5 wt %, or 0.5-10 wt %, or 0.5-8 wt %, or 0.5-5 wt %, or 1-10 wt %, or 1-8 wt %, or 1-5 wt %.

Embodiment 95. The method or food product of any of embodiments 76-93, wherein the inhibited porous granular starch is present in the food product in an amount in the range of 0.1-4 wt %, e.g., 0.1-3 wt %, or 0.1-2.5 wt %, or 0.5-4 wt %, or 0.5-3 wt %, or 0.5-2.5 wt %, or 1-4 wt %, or 1-3 wt %, or 1-2.5 wt %.

Embodiment 96. A dry mix comprising an inhibited porous starch product of any of embodiments 1-40, 74 and 75, in admixture with one or more additional dry food ingredients.

Embodiment 97. The dry mix of embodiment 96, wherein the dry mix is a dry mix for preparing a product selected from baked goods, gravies, sauces, puddings, baby foods, hot cereals; or is a dry mix for predusting foods prior to batter cooking and frying.

What is claimed is:

1. A inhibited porous granular starch product having a water uptake in the range of 1.0-1.8 g water/g starch and a sedimentation volume in the range of 20-50 ml/g, wherein the inhibited porous granular starch product is not chemically modified.

2. The inhibited porous granular starch product of claim 1, wherein the inhibited porous granular starch product has a sedimentation volume in the range of 20-40 mL/g.

3. The inhibited porous granular starch product of claim 1, wherein the inhibited porous granular starch has a water uptake of in the range of 1.2-1.8 g water/g starch.

4. The inhibited porous granular starch product of claim 1, wherein the inhibited porous granular starch product is not gelatinized.

5. The inhibited porous granular starch product of claim 1, wherein the inhibited granular starch product is inhibited by heat-treatment.

6. The inhibited porous granular starch product of claim 1, wherein the inhibited porous granular starch product is not hydroxypropylated, is not acetylated, has substantially no fatty acid residues, is not carboxymethylated, is not hydroxyethylated, is not phosphate, is not succinated.

7. The inhibited porous granular starch product of claim 1, wherein the inhibited porous granular starch product has a viscosity at 5% solids in the range of 50-1500 cP in an RVA test.

8. The inhibited porous granular starch product of claim 1, wherein the inhibited porous granular starch has a relatively low color.

9. The inhibited porous granular starch product of claim 1, wherein the inhibited porous granular starch has no more than 15% solubles.

10. The inhibited porous granular starch product of claim 1, wherein the inhibited granular starch product is made by a method comprising providing a granular starch feed; and hydrolyzing the granular starch feed to a degree of hydrolysis in the range of 20-75% using one or more enzymes including one of a glucoamylase and an alpha-amylase, or both a glucoamylase and an alpha-amylase;

wherein the inhibited porous granular starch product has a sedimentation volume in the range of 20 mL/g to 50 mL/g and a porosity as measured by change in water uptake as compared to the granular starch feed in the range of 10%-50%, and/or a porosity as measured by water uptake in the range of 1.0 g water/g starch to 1.8 g water/g starch and a sedimentation volume in the range of 20 mL/g to 50 mL/g.

11. The inhibited porous granular starch product of claim 10, wherein the hydrolysis is carried out with a glucoamylase, or a glucoamylase in combination with an alpha amylase.

12. The inhibited porous granular starch product of claim 10, wherein the granular starch feed is an inhibited granular starch feed.

13. The inhibited porous granular starch product of claim 12, wherein the inhibited granular starch feed is inhibited by heat-treatment.

14. The inhibited porous granular starch product of claim 10, wherein the granular starch feed is not inhibited, and wherein the method further comprises, after the hydrolysis, inhibiting the starch.

15. The inhibited porous granular starch product of claim 14, wherein the inhibition is performed by heat-treatment.

16. A method for making a food product comprising providing a inhibited porous granular starch product of claim 1 and including the inhibited porous granular starch product in the food product.

17. A food product comprising the inhibited porous granular starch product according to claim 1.

18. A method for making an inhibited granular starch product according to claim 1, the method comprising providing a granular starch feed; and hydrolyzing the granular starch feed to a degree of hydrolysis in the range of 20-75% using one or more enzymes including one of a glucoamylase and an alpha-amylase, or both a glucoamylase and an alpha-amylase;

wherein the inhibited porous granular starch product has a sedimentation volume in the range of 20 mL/g to 50 mL/g and a porosity as measured by change in water uptake as compared to the granular starch feed in the range of 10%-50%, and/or a porosity as measured by water uptake in the range of 1.0 g water/g starch to 1.8 g water/g starch and a sedimentation volume in the range of 20 mL/g to 50 mL/g wherein the granular starch feed is a non-chemically inhibited starch.

19. The method of claim 18, wherein the hydrolysis is carried out with a glucoamylase, or a glucoamylase in combination with an alpha amylase.

* * * * *